(12) United States Patent
Tajima et al.

(10) Patent No.: US 11,075,387 B2
(45) Date of Patent: Jul. 27, 2021

(54) POWER STORAGE DEVICE AND ELECTRONIC DEVICE

(71) Applicant: SEMICONDUCTOR ENERGY LABORATORY CO., LTD., Atsugi (JP)

(72) Inventors: Ryota Tajima, Kanagawa (JP); Junpei Momo, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 505 days.

(21) Appl. No.: 15/015,374

(22) Filed: Feb. 4, 2016

(65) Prior Publication Data

US 2016/0240325 A1  Aug. 18, 2016

(30) Foreign Application Priority Data

Feb. 12, 2015  (JP) .............................. JP2015-025644

(51) Int. Cl.
*H01M 4/70* (2006.01)
*H01M 10/05* (2010.01)
(Continued)

(52) U.S. Cl.
CPC .............. *H01M 4/70* (2013.01); *H01G 11/26* (2013.01); *H01G 11/66* (2013.01); *H01G 11/72* (2013.01); *H01G 11/76* (2013.01); *H01G 11/82* (2013.01); *H01M 10/045* (2013.01); *H01M 10/0459* (2013.01); *H01M 10/0587* (2013.01);
(Continued)

(58) Field of Classification Search
CPC .. H01M 4/70; H01M 10/045; H01M 10/0459; H01M 10/0587
See application file for complete search history.

(56) References Cited

U.S. PATENT DOCUMENTS 5,498,489 A * 3/1996 Dasgupta .......... H01M 10/0413
429/152
6,287,721 B1 9/2001 Xie et al.
(Continued)

FOREIGN PATENT DOCUMENTS

| CN | 103579683 A | 2/2014 |
| JP | 2002-525823 | 8/2002 |

(Continued)

*Primary Examiner* — Maria Laios
*Assistant Examiner* — Angela J Martin
(74) *Attorney, Agent, or Firm* — Nixon Peabody LLP; Jeffrey L. Costellia

(57) ABSTRACT

A power storage device having flexibility is provided. A power storage device of which the capacity is not likely to deteriorate even when being curved is provided. A power storage device includes a first electrode, a second electrode, and an electrolytic solution. The first electrode and the second electrode overlap with each other. The first electrode includes a first current collector and a first active material layer. The first current collector has a first surface and a second surface. The first active material layer is provided on the first surface. The first current collector has a first bent portion with the second surface inside. The second surface includes a first region and a second region. The first region overlaps with the second region. The first region is connected to the second region at a portion different from the first bent portion.

11 Claims, 42 Drawing Sheets

(51) Int. Cl.

| | | |
|---|---|---|
| *H01M 10/50* | (2006.01) | |
| *H01M 50/54* | (2021.01) | |
| *H01M 50/11* | (2021.01) | |
| *H01M 50/10* | (2021.01) | |
| *H01M 10/04* | (2006.01) | |
| *H01G 11/66* | (2013.01) | |
| *H01M 10/0587* | (2010.01) | |
| *H01G 11/72* | (2013.01) | |
| *H01G 11/76* | (2013.01) | |
| *H01G 11/26* | (2013.01) | |
| *H01G 11/82* | (2013.01) | |
| *H01G 11/56* | (2013.01) | |
| *H01M 10/0525* | (2010.01) | |
| *H01M 10/0565* | (2010.01) | |
| *H01M 50/116* | (2021.01) | |
| *H01M 50/543* | (2021.01) | |

(52) U.S. Cl.
CPC ......... *H01G 11/56* (2013.01); *H01M 10/0525* (2013.01); *H01M 10/0565* (2013.01); *H01M 50/10* (2021.01); *H01M 50/116* (2021.01); *H01M 50/54* (2021.01); *H01M 50/543* (2021.01); *H01M 2220/20* (2013.01); *H01M 2220/30* (2013.01); *H01M 2300/0085* (2013.01); *Y02E 60/10* (2013.01); *Y02E 60/13* (2013.01)

(56) References Cited

U.S. PATENT DOCUMENTS

| | | | | |
|---|---|---|---|---|
| 6,461,762 B1* | 10/2002 | Yang | ................ | H01M 10/0431 429/127 |
| 6,617,074 B1* | 9/2003 | Watarai | ................ | H01M 2/18 429/127 |
| 6,679,926 B1* | 1/2004 | Kajiura | ................ | H01M 4/0402 264/614 |
| 7,794,873 B2 | 9/2010 | Mino et al. | | |
| 8,440,356 B2 | 5/2013 | Kim et al. | | |
| 8,785,030 B2 | 7/2014 | Ueda | | |
| 2009/0053592 A1* | 2/2009 | Mino | ................ | H01M 2/263 429/161 |
| 2011/0143189 A1* | 6/2011 | Kim | ................ | H01M 2/1646 429/160 |
| 2012/0048729 A1 | 3/2012 | Mikhaylik et al. | | |
| 2012/0058387 A1 | 3/2012 | Ahn | | |
| 2013/0224562 A1* | 8/2013 | Momo | ................ | H01M 10/0436 429/149 |
| 2013/0273405 A1* | 10/2013 | Takahashi | ................ | H01M 10/0436 429/127 |
| 2015/0111088 A1* | 4/2015 | Hiroki | ................ | H01M 10/0436 429/149 |
| 2015/0147626 A1 | 5/2015 | Tajima et al. | | |
| 2015/0188194 A1 | 7/2015 | Mikhaylik et al. | | |
| 2016/0204437 A1 | 7/2016 | Tajima et al. | | |

FOREIGN PATENT DOCUMENTS

| | | |
|---|---|---|
| JP | 2003-092145 A | 3/2003 |
| JP | 2008-287925 A | 11/2008 |
| JP | 2009/537947 | 10/2009 |
| JP | 2010-232574 A | 10/2010 |
| JP | 2013/211262 | 10/2013 |
| JP | 2013-538429 | 10/2013 |
| JP | 2014-078470 A | 5/2014 |
| WO | WO-2000/017950 | 3/2000 |
| WO | WO-2006/118053 | 11/2006 |
| WO | WO-2012/027457 | 3/2012 |

\* cited by examiner

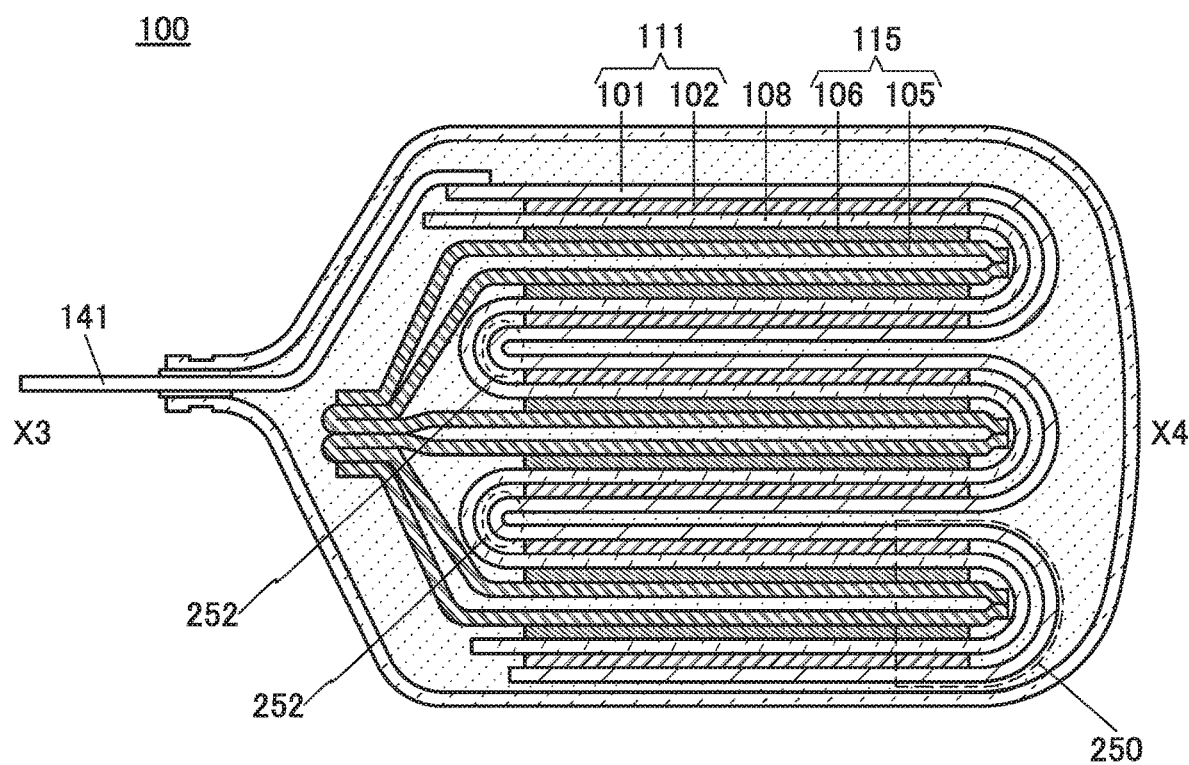

FIG. 26A
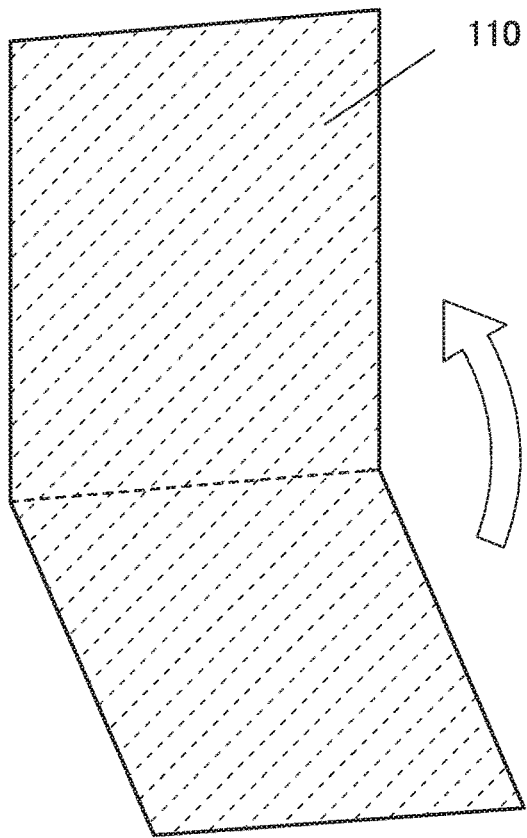
FIG. 26B
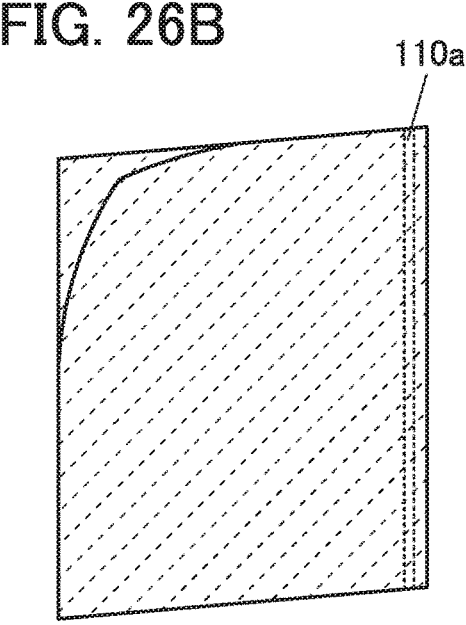
FIG. 26C
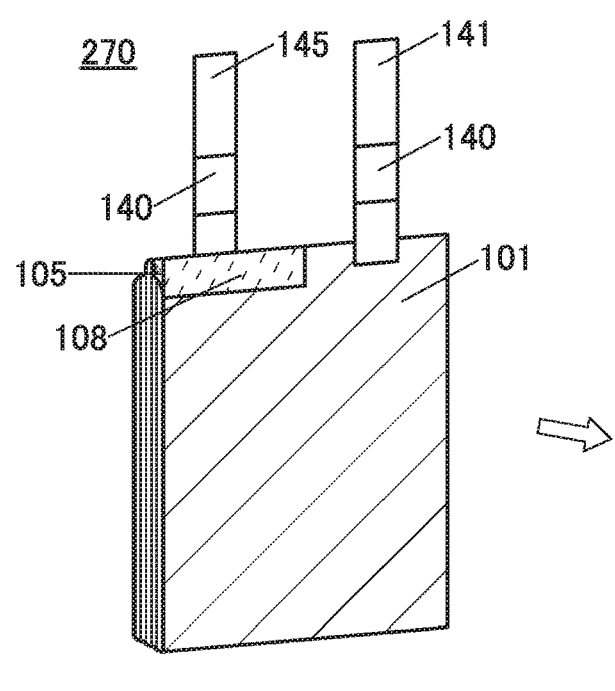
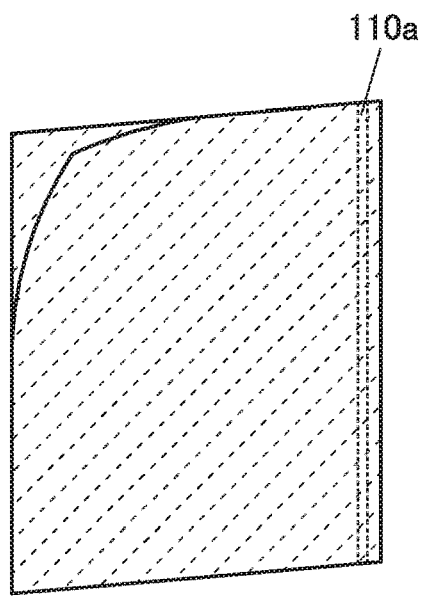

FIG. 32A
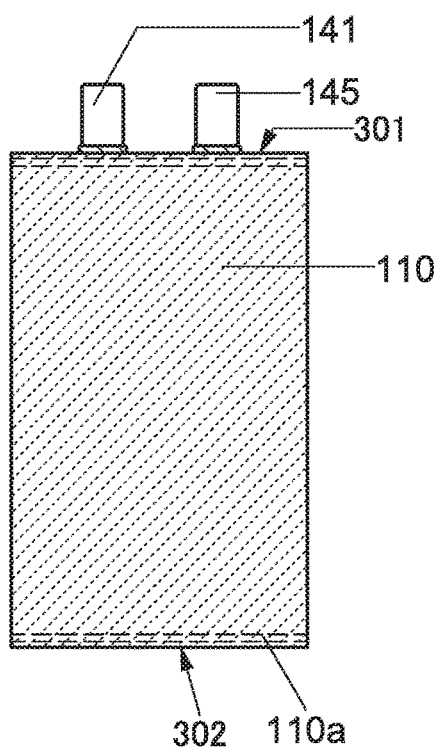
FIG. 32B
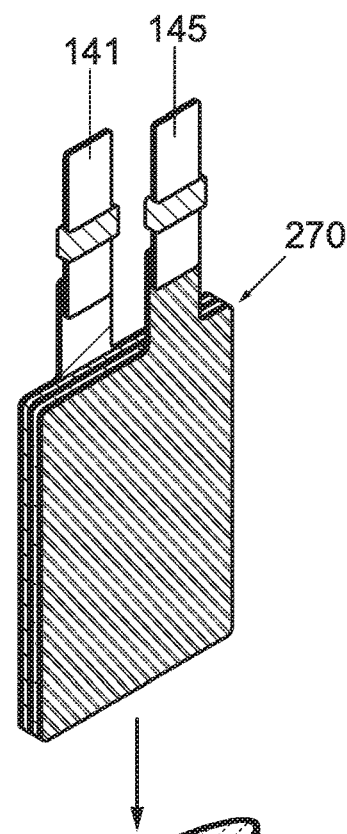
FIG. 32C
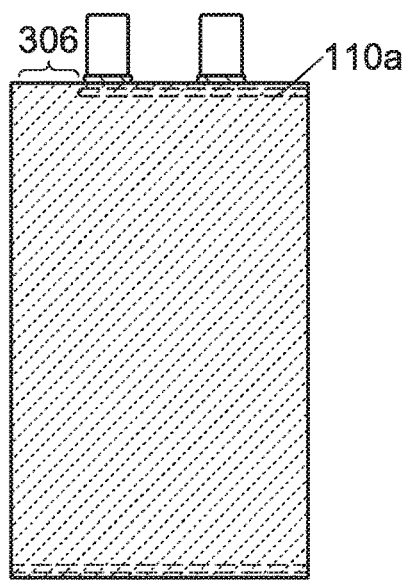
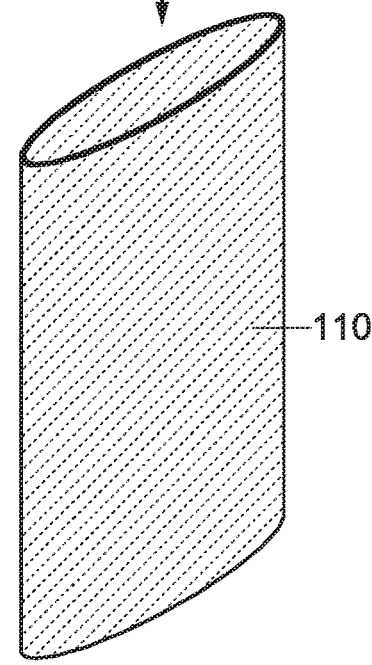

POWER STORAGE DEVICE AND ELECTRONIC DEVICE

BACKGROUND OF THE INVENTION

1. Field of the Invention

One embodiment of the present invention relates to a power storage device and an electronic device.

Note that one embodiment of the present invention is not limited to the above technical field. One embodiment of the invention disclosed in this specification and the like relates to an object, a method, and a manufacturing method. One embodiment of the invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

Note that electronic devices in this specification generally mean electrically driven devices, and electro-optical devices, information terminal devices, and the like are all electronic devices. Electronic devices incorporate power storage devices in some cases. Note that "incorporate" in this specification refers not only to incorporation of a battery in a manner that the battery cannot be detached for replacement, but also to incorporation of a battery in a manner that the battery as a form of battery pack or the like can be freely detached.

2. Description of the Related Art

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for the uses of electronic devices, for example, portable information terminals such as mobile phones, smartphones, and laptop computers, portable music players, and digital cameras; medical equipment; and next-generation clean energy vehicles such as hybrid electric vehicles (HEVs), electric vehicles (EVs), full-cell hybrid vehicles, and plug-in hybrid electric vehicles (PHEVs). The lithium-ion secondary batteries are essential for today's information society as rechargeable energy supply sources.

Also, wearable devices that are used while being worn on the users have been actively developed. In order to be used more comfortably by the users, the wearable devices often have curved shapes or have flexibility. In addition, power storage devices with curved shapes or flexibility to be incorporated in such wearable devices have been developed.

For example, Patent Document 1 discloses a sheet-like power storage device which can be curved in at least one axis direction, and electronic devices including the power storage device.

REFERENCE

[Patent Document]
[Patent Document 1] Japanese Published Patent Application No. 2013-211262

SUMMARY OF THE INVENTION

In the development of power storage devices used in wearable devices and the like, power storage devices having high capacity and flexibility are demanded. Furthermore, development of power storage devices of which the capacity and cycle characteristics are not likely to deteriorate even when the power storage devices are curved is demanded. Furthermore, development of power storage devices having high capacity in a small size is demanded.

It is an object of one embodiment of the present invention to provide a power storage device having flexibility. Another object of one embodiment of the present invention is to suppress deterioration in capacity and cycle characteristics when a power storage device is curved. Another object of one embodiment of the present invention is to provide an electronic device including a power storage device which can be curved.

Another object of one embodiment of the present invention is to provide a power storage device having high capacity. Another object of one embodiment of the present invention is to increase the capacity per volume or weight of a power storage device. Another object of one embodiment of the present invention is to downsize a power storage device.

An object of one embodiment of the present invention is to provide a novel electrode, a novel secondary battery, a novel power storage device, a novel electronic device, or the like. Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a power storage device including a first electrode, a second electrode, and an electrolytic solution. The first electrode functions as one of a positive electrode and a negative electrode. The second electrode functions as the other of the positive electrode and the negative electrode. The first electrode and the second electrode overlap with each other. The first electrode includes a first current collector and a first active material layer. The first current collector has a first surface and a second surface. The first active material layer is provided on the first surface. The first current collector has a first bent portion with the second surface inside. The second surface includes a first region and a second region. The first region overlaps with the second region. The first region is connected to the second region at a portion different from the first bent portion.

Another embodiment of the present invention is the power storage device with the above structure, in which the first current collector includes a second bent portion with the first surface inside, and the first active material layer is not provided on the second bent portion.

Another embodiment of the present invention is the power storage device with any of the above structures, in which the second electrode includes a second current collector and a second active material layer, the second current collector includes a third bent portion, and the third bent portion is substantially parallel to the first bent portion.

The power storage devices with any of the above structures may further include an exterior body surrounding the first electrode, the second electrode, and the electrolytic solution. The exterior body preferably includes a film. The electrolytic solution is preferably a gel. The first electrode preferably includes a friction layer. The friction layer is preferably provided on the second surface.

Another embodiment of the present invention is a power storage device including a first electrode, a second electrode, a first lead, a second lead, and an exterior body. The first electrode functions as one of a positive electrode and a negative electrode. The second electrode functions as the other of the positive electrode and the negative electrode. The first lead is electrically connected to the first electrode. The second lead is electrically connected to the second electrode. The exterior body has a first side, a second side, a third side, and a fourth side. The first side is not adjacent to the second side. The exterior body includes a bent portion. The bent portion includes the first side and the second side. The first electrode and the second electrode are surrounded by the exterior body. The first lead and the second lead overlap with the first side.

Another embodiment of the present invention is the power storage device with the above structure, in which when lengths of the first side and the third side are denoted by W and L, respectively, L is greater than or equal to W.

Another embodiment of the present invention is the power storage device with any of the above structures, in which the first electrode and the second electrode overlap with each other, the first electrode includes a first current collector and a first active material layer, the first current collector has a first surface and a second surface, the first active material layer is provided on the first surface, the first current collector has a first bent portion with the second surface inside, the second surface includes a first region and a second region, the first region overlaps with the second region, and the first region is connected to the second region at a portion different from the first bent portion.

Another embodiment of the present invention is the power storage device with any of the above structures, in which the first current collector includes the second bent portion with the first surface inside, and the first active material layer is not necessarily provided on the second bent portion.

In one embodiment of the present invention, the power storage device with the above structure preferably has flexibility, and is preferably curved.

Another embodiment of the present invention is an electronic device comprising the power storage device with any of the above structures and a housing having flexibility. Another embodiment of the present invention is an electronic device comprising the power storage device with any of the above structures and a housing which has a curved portion.

According to one embodiment of the present invention, in the current collectors including the bent portions, friction between contact surfaces can be reduced. Accordingly, stress caused by the difference between the inner diameter and outer diameter of the curved power storage device can be easily relieved because the electrodes are easily deformed when the power storage device is curved. Furthermore, damage to the positive electrode and the negative electrode can be prevented. According to one embodiment of the present invention, hindrance of cell reaction due to excessive positional deviation between the positive electrode and the negative electrode that is caused when the power storage device is curved can be prevented. Thus, a power storage device having flexibility can be provided. Furthermore, a power storage device of which the capacity and cycle characteristics are not likely to deteriorate even when the power storage device is curved can be provided. Furthermore, an electronic device including the power storage device having flexibility can be provided.

According to one embodiment of the present invention, a power storage device which have high capacity can be provided. According to one embodiment of the present invention, the capacity per volume or weight of a power storage device can be increased. According to one embodiment of the present invention, a power storage device can be downsized.

According to one embodiment of the present invention, a small power storage device that can be easily mass-produced and can be curved is provided. Thus, according to one embodiment of the present invention, a power storage device that is easily mounted on a small and curved wearable device or the like can be provided. Furthermore, in the case where a curved wearable device or the like needs to be mass-produced, a power storage device can be stably supplied.

A novel electrode, a novel secondary battery, a novel power storage device, or a novel electronic device can be provided. Note that the description of these effects does not disturb the existence of other effects. One embodiment of the present invention need not necessarily achieve all the effects listed above. Other effects will be apparent from and can be derived from the description of the specification, the drawings, the claims, and the like.

BRIEF DESCRIPTION OF THE DRAWINGS

In the accompanying drawings:
FIG. 14 illustrate a power storage device;
FIGS. 26A to 26C illustrate a method for fabricating a power storage device;
FIGS. 32A to 32C illustrate a power storage device.

DETAILED DESCRIPTION OF THE INVENTION

Figure 1A:
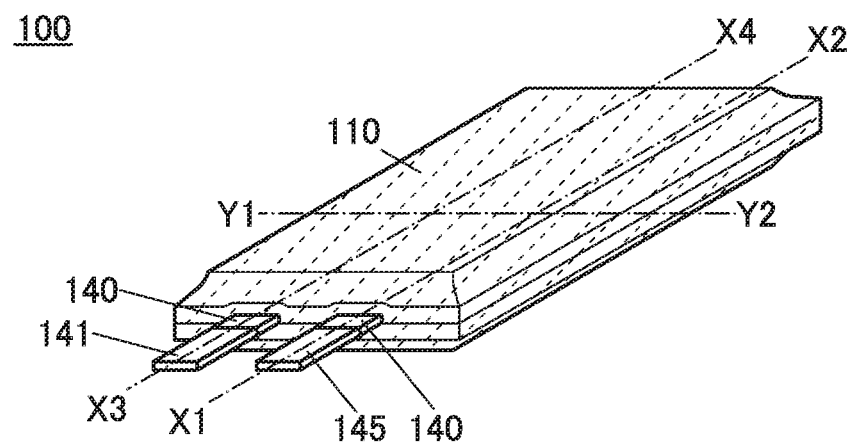
FIGS. 1A and 1B illustrate a power storage device.

Embodiments of the present invention will be described below in detail with reference to the drawings. Note that the present invention is not limited to the following description. However, the present invention is not limited to the description below, and it is easily understood by those skilled in the art that modes and details disclosed herein can be modified in various ways. Further, the present invention is not construed as being limited to description of the embodiments and the examples.

Note that the term "electrically connected" in this specification and the like includes the case where components are connected through an "object having any electric function". There is no particular limitation on the "object having any electric function" as long as electric signals can be transmitted and received between the components connected through the object.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

The position, size, range, or the like of each component illustrated in drawings and the like is not accurately represented in some cases for easy understanding. Therefore, the disclosed invention is not necessarily limited to the position, the size, the range, or the like disclosed in the drawings and the like.

In this specification and the like, ordinal numbers such as "first", "second", and "third" are used in order to avoid confusion among components, and the terms do not mean limitation of the number of components.

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "substantially parallel" indicates that the angle formed between two straight lines is greater than or equal to −30° and less than or equal to 30°. In addition, the term "perpendicular" indicates that the angle formed between two straight lines is greater than or equal to 80° and less than or equal to 100°, and accordingly also includes the case where the angle is greater than or equal to 85° and less than or equal to 95°. The term "substantially perpendicular" indicates that the angle formed between two straight lines is greater than or equal to 60° and less than or equal to 120°.

Embodiment 1

In this embodiment, a power storage device of one embodiment of the present invention is described using a secondary battery 100 as an example. In this embodiment, the secondary battery 100 is described with reference to FIGS. 1A and 1B, FIGS. 2A to 2E, FIGS. 3A to 3D, FIG. 4, FIG. 5, FIGS. 6A and 6B, FIG. 7, FIGS. 8A to 8C, FIGS. 9A to 9D, FIG. 10, FIGS. 11A and 11B, FIGS. 12A and 12B, FIGS. 13A and 13B, FIG. 14, FIGS. 15A and 15B, FIGS. 16A and 16B, FIG. 17, FIG. 18, FIG. 19, FIG. 20, FIG. 21, FIG. 22, and FIG. 23.

1. Basic Structure

Figure 1B:
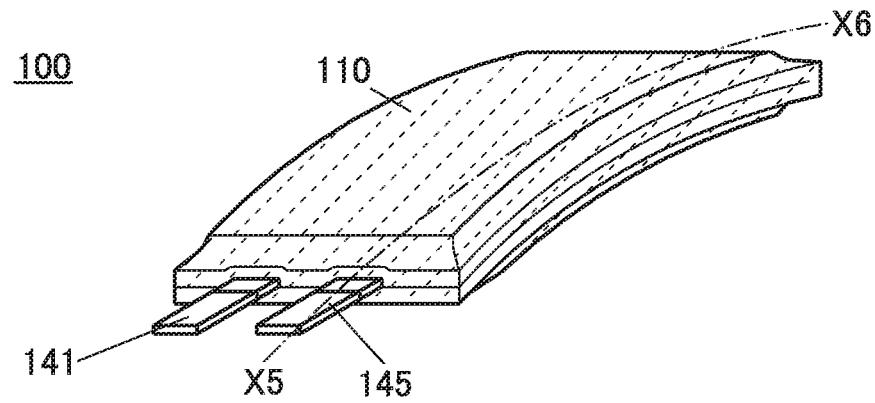

FIG. 1A shows a perspective view of the secondary battery 100. The secondary battery 100 includes an exterior body 110 having flexibility, a positive electrode lead 141, a negative electrode lead 145, and a sealing layer 140. The secondary battery 100 can be curved as shown in FIG. 1B.

Figure 2A:
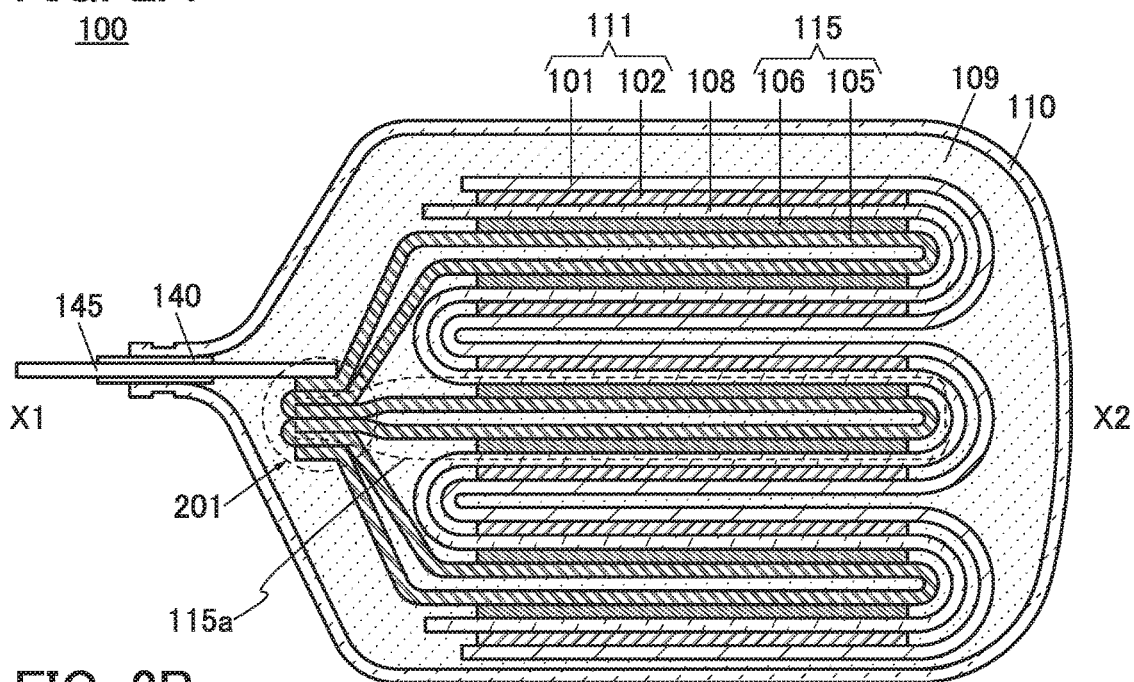
FIGS. 2A to 2E illustrate a power storage device.
Figure 3A:
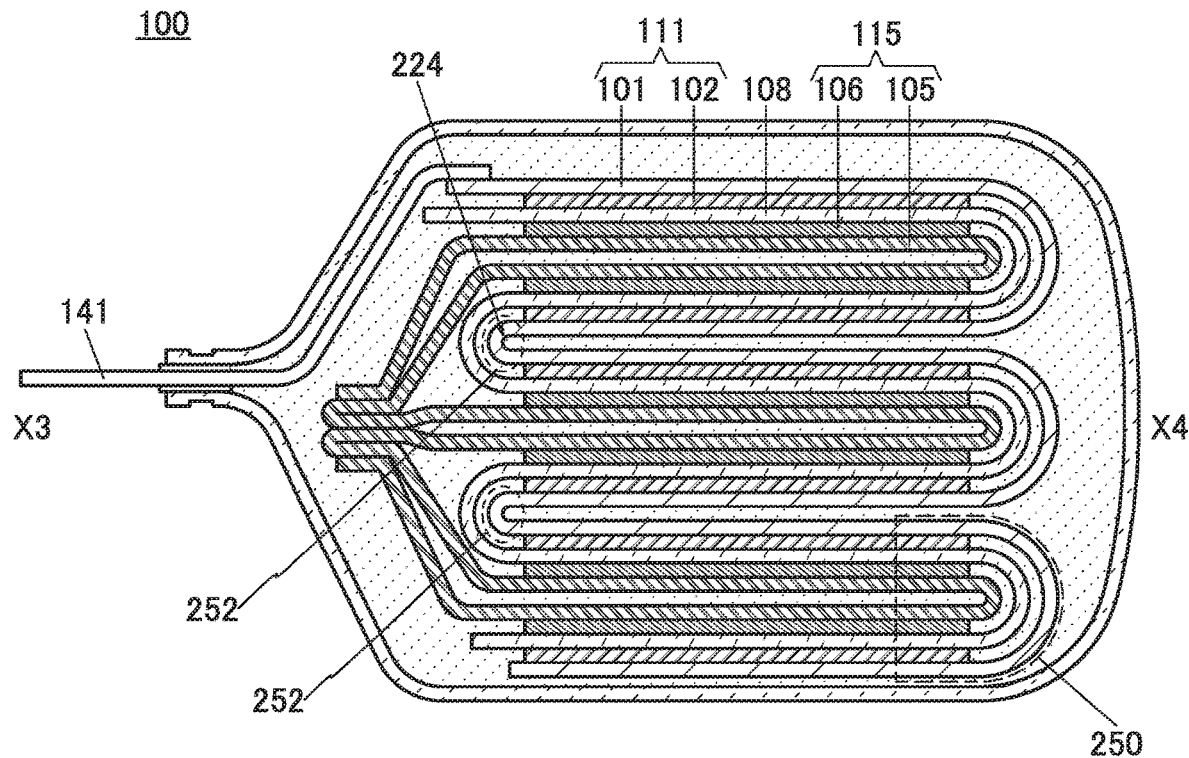
FIGS. 3A to 3D illustrate a power storage device.
Figure 4:
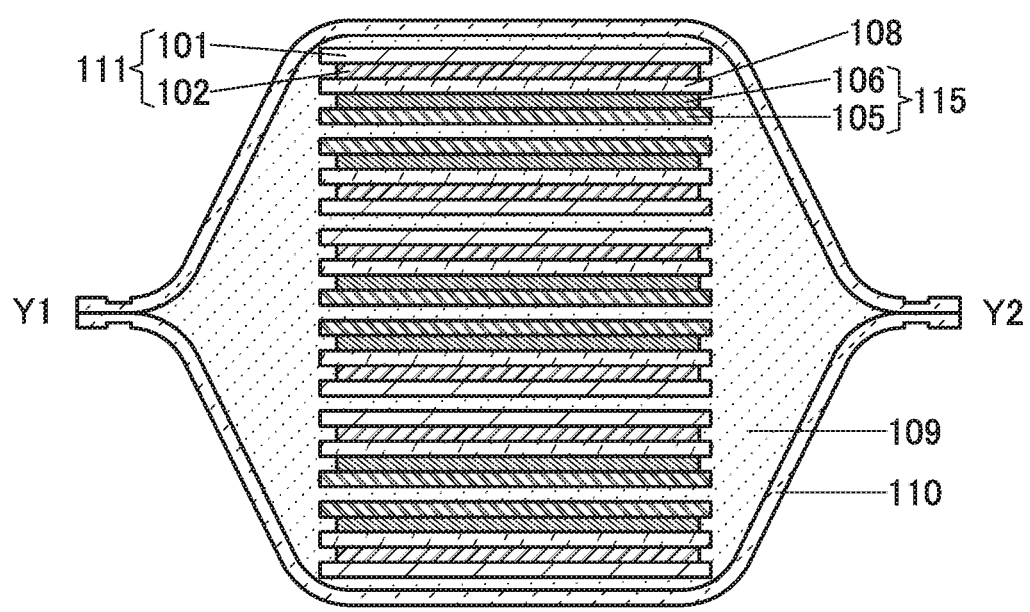
FIG. 4 illustrates a power storage device.
Figure 5:
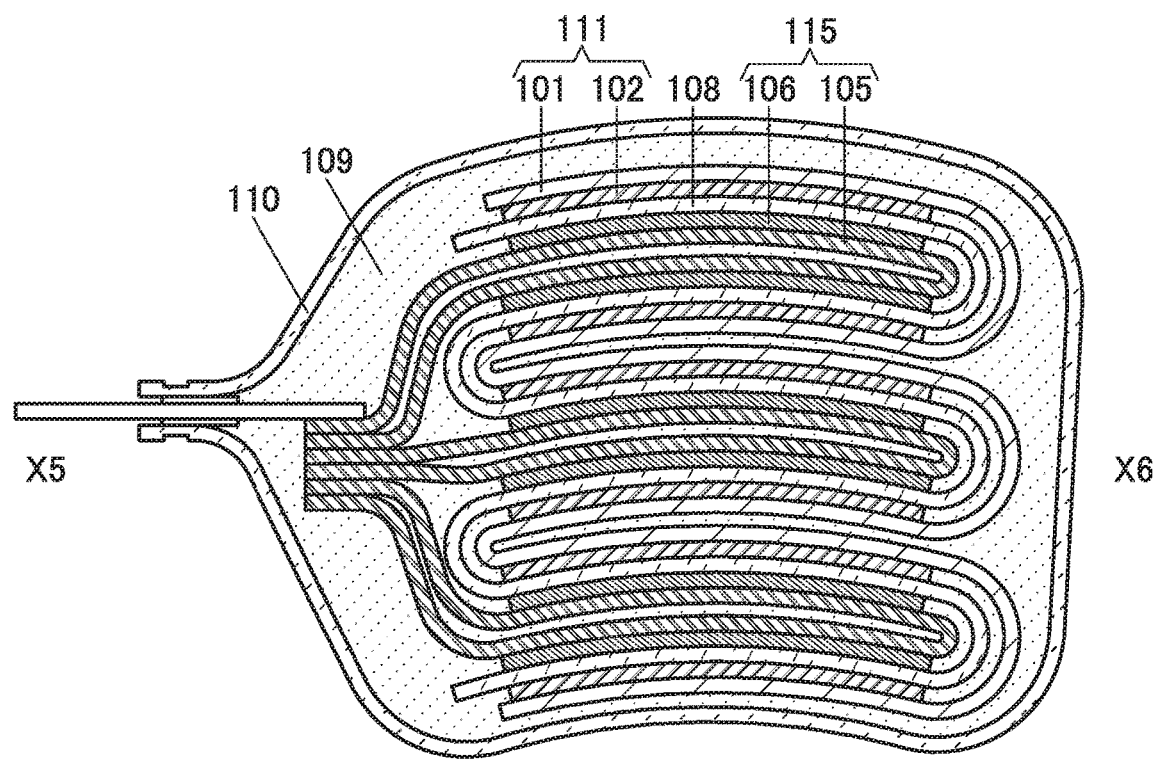
FIG. 5 illustrates a power storage device.

FIG. 2A shows a cross-sectional view of the secondary battery 100 along the line X1-X2. FIG. 3A shows a cross-sectional view of the secondary battery 100 along the line X3-X4. FIG. 4 shows a cross-sectional view of the secondary battery 100 along the line Y1-Y2. FIG. 5 shows a cross-sectional view of the curved secondary battery 100 in FIG. 1B along the line X5-X6.

The secondary battery 100 includes a positive electrode 111, a negative electrode 115, a separator 108, and an electrolytic solution 109 in a position surrounded by the exterior body 110. The positive electrode 111 includes a positive electrode current collector 101 and a positive electrode active material layer 102. The negative electrode 115 includes a negative electrode current collector 105 and a negative electrode active material layer 106. The positive electrode current collector 101, the negative electrode current collector 105, and the separator 108 overlap one another and are bent in zigzag. Furthermore, the positive electrode active material layer 102 and the negative electrode active material layer 106 face each other with the separator 108 therebetween.

In the secondary battery 100, the positive electrode current collector 101 and the negative electrode current collector 105 are bent in zigzag, whereby the positive electrode 111 and the negative electrode 115 can be folded into a small shape even in the case where the areas of these electrodes are large. Thus, the secondary battery 100 having high capacity can be downsized.

Note that in this specification and the like, the term "zigzag" means a structure in which a plate-like member is repeatedly mountain-folded and valley-folded.

Note that in this specification and the like, a "bent portion" means a locally-bent portion formed by bending a plate-like member or a portion located between two flat-plate like portions divided by bending the plate-like member.

In this specification and the like, a "flat-plate like" means a state where the plate-like member does not include the bent portion. Furthermore, in this specification and the like, the flat-plate like portion may be curved.

Next, a structure of the negative electrode 115 is described with reference to FIGS. 2A to 2E and FIG. 3D.

Figure 2B:
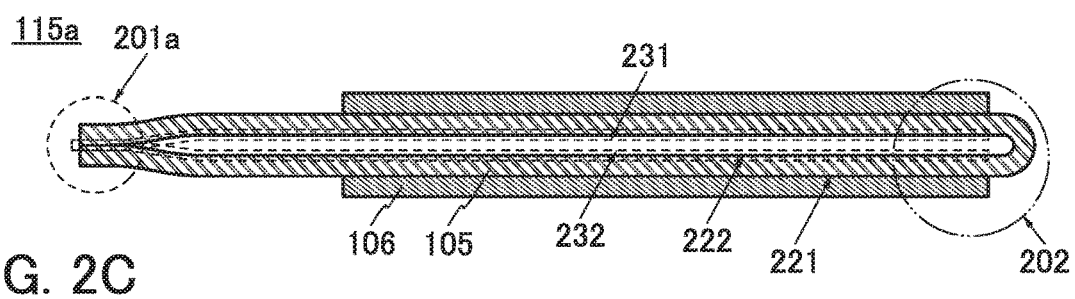
Figure 2C:
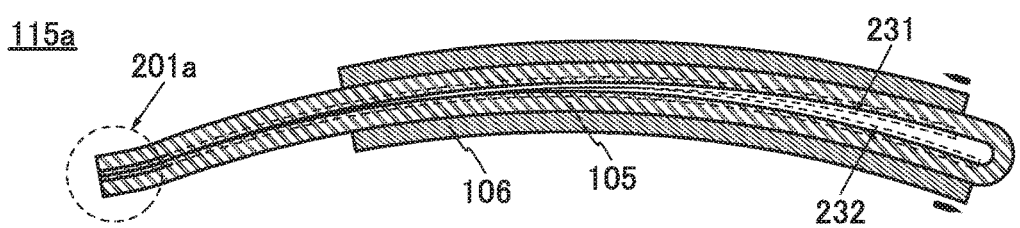

FIG. 2B shows an enlarged view of a portion 115a surrounded by a dotted line in the negative electrode 115 included in the secondary battery 100 in FIG. 2A, and FIG. 2C shows the state where the portion 115a is curved. FIG. 2E shows an enlarged view of a portion 202 surrounded by a dotted line in the portion 115a in FIG. 2B. As shown in FIGS. 2B and 2E, the negative electrode current collector 105 includes a first surface 221, a second surface 222, and a bent portion 211 with the second surface 222 inside. The negative electrode active material layer 106 is provided on the first surface 221 and is not provided on the second surface 222. The second surface 222 is divided into a first region 231 and a second region 232 which face each other with the bent portion 211 provided therebetween as a boundary.

Although not shown in FIG. 2B for simplicity, with the above structure, the first region 231 and the second region 232 are in contact with each other. Because the first region 231 and the second region 232 are metal surfaces of the negative electrode current collector 105, contact surfaces exert little friction on each other. For example, the coefficient of static friction between the first region 231 and the second region 232 is lower than the coefficient of static friction between the negative electrode active material layer 106 and the separator 108. Thus, by shifting the positions of the first region 231 and the second region 232 from each other, the negative electrode current collector 105 can be deformed as shown in FIG. 2C.

As shown in FIGS. 2B and 2C, end portions of the first region 231 and the second region 232 are connected to each other not at the bent portion 211 but at a welded portion 201a. Thus, a change in the distance between the positive electrode active material layer 102 and the negative electrode active material layer 106 caused by excessive deformation of the negative electrode current collector 105 and even the negative electrode 115, generation of a short circuit caused by contact between the negative electrode 115 and the positive electrode 111, and the like can be prevented.

Furthermore, it is preferable that the negative electrode 115 not include the negative electrode active material layer 106 around the bent portion 211. In this manner, the negative electrode active material layer 106 can be prevented from obstructing deformation of the negative electrode current collector 105 around the bent portion 211. In addition, in the fabrication process of the secondary battery 100, separation of the negative electrode active material layer 106 from the negative electrode current collector 105 can be prevented when the negative electrode current collector 105 is bent to form the bent portion 211.

With the above structure, when the secondary battery 100 is curved, the negative electrode 115 can be deformed according to deformation of the whole secondary battery 100. Thus, the secondary battery 100 can be a secondary battery having flexibility. Furthermore, with the above-described structure, the first region 231 and the second region 232 are easily shifted from each other and the negative electrode current collector 105 can be easily deformed. Thus, generation of wrinkles in the negative electrode 115, locally strong curvature of the negative electrode 115, and the like can be prevented. Thus, in the negative electrode 115, damage to the negative electrode active material layer 106, a break in the negative electrode current collector 105, and the like can be prevented. Accordingly, deterioration in capacity and cycle characteristics when the secondary battery 100 is curved can be suppressed.

Figure 2D:
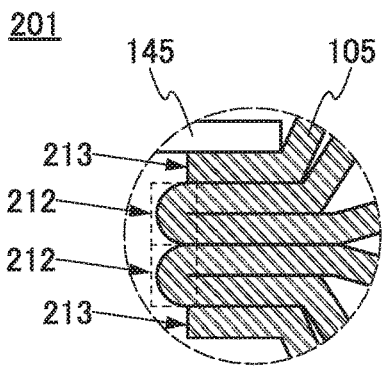
Figure 2E:
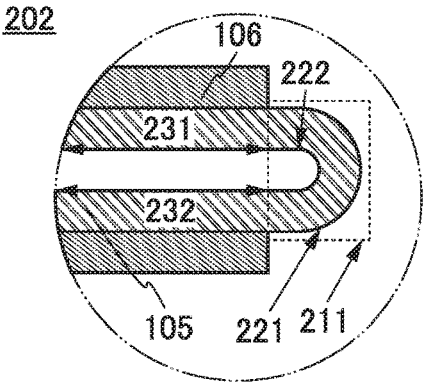

FIG. 2D shows an enlarged view of a welded portion 201 in FIG. 2A. The negative electrode current collector 105 includes a bent portion 212 with the first surface 221 inside.

As shown in FIG. 2D, the negative electrode active material layer 106 is not provided on the bent portion 212 bent with the first surface 221 inside, whereby the bent portion 212 and its vicinity of the negative current collector 105 and an edge 213 of the negative electrode current collector 105 are stacked and welded, so that the welded portion 201 can be formed. Furthermore, formation of the welded portion 201 can suppress a change in the zigzag structure of the negative electrode current collector 105. Furthermore, connection of the negative electrode lead 145 to the welded portion 201 can reduce internal resistance of the negative electrode 115. Thus, cycle characteristics of the secondary battery 100 can be improved and charge and discharge capacity can be increased.

In the negative electrode current collector 105 included in the negative electrode 115, the bent portion 212 and the bent portion 211 are preferably parallel or substantially parallel to each other, so that the secondary battery 100 can be easily bent at least in an axis direction perpendicular to the bent portion 212 or the bent portion 211.

Note that, for example, when a plate-like member A is observed from a direction perpendicular to a flat-plate like portion (hereinafter referred to as a flat-plate like portion A) adjacent to a bent portion (hereinafter referred to as a bent portion A) included in the plate-like member A, part of the bent portion A can be recognized as a side (hereinafter referred to as a side A) included in the plate-like member A. Furthermore, for example, when a plate-like member B is observed from a direction perpendicular to a flat-plate like portion (hereinafter referred to as a flat-plate like portion B) adjacent to a bent portion (hereinafter referred to as a bent portion B) included in the plate-like member B, part of the bent portion B can be recognized as a side (hereinafter referred to as a side B) included in the plate-like member B. In this specification, the expression "the bent portion A and the bent portion B are parallel to each other" means that the side A and the side B are parallel to each other. Note that the plate-like member B may be the same as or different from the plate-like member A.

As described above, the term "parallel" in this specification indicates that the angle formed between two straight lines is greater than or equal to −10° and less than or equal to 10°, and accordingly "the bent portion A and the bent portion B are parallel to each other" means that the side A and the side B are placed at an angle greater than or equal to −10° and less than or equal to 10°.

Furthermore, as described above, the term "substantially parallel" in this specification indicates that the angle formed between two straight lines is greater than or equal to −30° and less than or equal to 30°, and accordingly "the bent portion A and the bent portion B are substantially parallel to each other" means that the side A and the side B are placed at an angle greater than or equal to −30° and less than or equal to 30°.

Figure 3B:
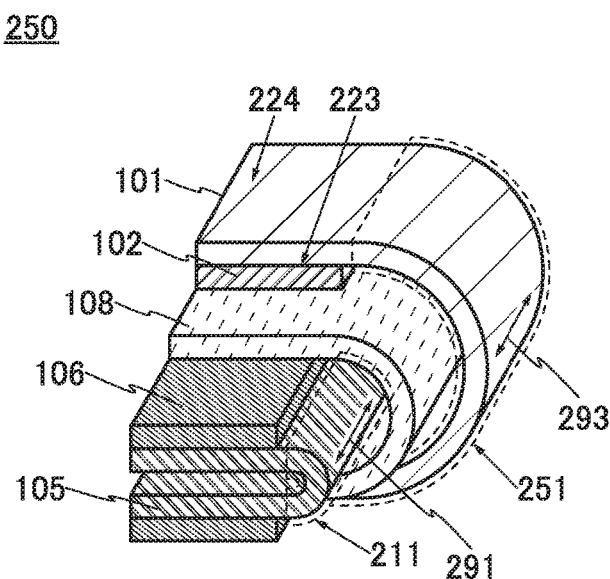
Figure 3C:
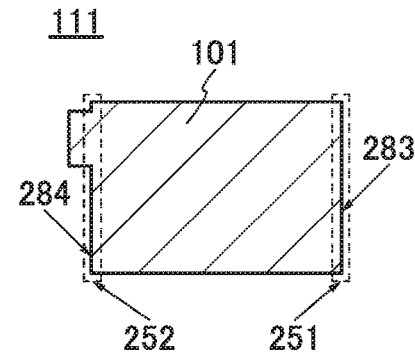
Figure 3D:
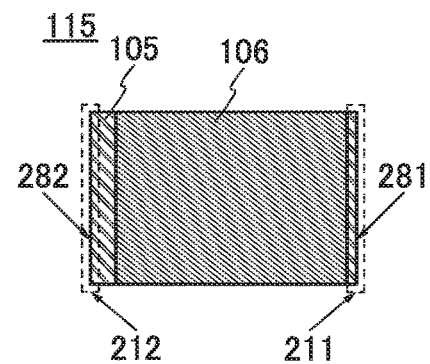

FIG. 3D shows the appearance of the negative electrode 115 observed from a direction perpendicular to a flat-plate like portion of the zigzag negative electrode current collector 105. In FIG. 3D, part of the bent portion 211 can be recognized as a side 281 of the negative electrode current collector 105. In FIG. 3D, part of the bent portion 212 can also be recognized as a side 282 of the negative electrode current collector 105.

Next, the positive electrode 111 is described with reference to FIGS. 3A and 3B.

In the positive electrode 111, the positive electrode active material layer 102 is provided only on one surface of the positive electrode current collector 101. The positive electrode current collector 101 is bent in zigzag like the negative electrode current collector 105 and the separator 108, and includes a plurality of bent portions.

As shown in FIG. 3A, the positive electrode current collector 101 includes a bent portion 252 with a fourth surface 224 inside. When the positive electrode current collector 101 includes the bent portion 252, the bent portion 252 is preferably parallel or substantially parallel to the bent portion 211 included in the negative electrode current collector 105. Furthermore, the bent portion 252 is preferably parallel to a bent portion 251. With this structure, the secondary battery 100 can be easily bent.

In the positive electrode current collector 101 included in the positive electrode 111, the bent portion 252 and the bent portion 251 are preferably parallel or substantially parallel to each other, so that the secondary battery 100 can be easily bent in the axis direction perpendicular to the bent portion 251 or the bent portion 252.

FIG. 3C shows a state in which the positive electrode 111 is observed from a direction perpendicular to the flat-plate like portion of the zigzag positive electrode current collector 101. In FIG. 3C, part of the bent portion 251 can be recognized as a side 283 of the positive electrode current collector 101. Also in FIG. 3C, part of the bent portion 252 can be recognized as a side 284 of the positive electrode current collector 101.

FIG. 3B shows a cross-sectional perspective view of a part surrounded by a dotted line 250 in FIG. 3A. The positive electrode current collector 101 includes a third surface 223 on which the positive electrode active material layer 102 is provided, the fourth surface 224 on which the positive electrode active material layer 102 is not provided, and the bent portion 251 with the third surface 223 inside. In FIG. 3B, the side 281 described with reference to FIG. 3D is denoted by a double-headed arrow 291, and the side 283 described with reference to FIG. 3C is denoted by a double-headed arrow 293.

As shown in FIG. 3B, the double-headed arrow 291 and the double-headed arrow 293 are parallel or substantially parallel to each other. That is, the bent portion 251 of the positive electrode current collector 101 is parallel or substantially parallel to the bent portion 211 of the negative electrode current collector 105. Thus, as shown in FIG. 5, the secondary battery 100 can be bent at least in an axis direction perpendicular to the bent portion 251 of the positive electrode current collector 101 or at least in an axis direction perpendicular to the bent portion 211 of the negative electrode current collector 105.

The positive electrode current collector 101 is connected to the positive electrode lead 141 at its end.

As shown in FIGS. 2A to 2E and FIGS. 3A to 3D, it is preferable that, in the negative electrode 115, a plurality of negative electrode active material layers 106 be provided on one surface of the negative electrode current collector 105, and the bent portion be provided between the plurality of negative electrode active material layers 106. Furthermore, it is preferable that, in the positive electrode 111, a plurality of positive electrode active material layers 102 be provided on one surface of the positive electrode current collector 101, and the bent portion be provided between the plurality of positive electrode active material layers 102.

In this embodiment, although an example is described in which the number of the bent portions included in each of the positive electrode current collector 101, the negative electrode current collector 105, and the separator 108 is five, the number of the bent portions is not limited to this. The number of the bent portions included in each of the positive electrode current collector 101, the negative electrode current collector 105, and the separator 108 may be greater than or equal to 1 and less than or equal to 4, or greater than or equal to 6.

As the areas of the positive electrode active material layer 102 in the positive electrode 111 and the negative electrode active material layer 106 in the negative electrode 115 are larger, the capacity of the secondary battery 100 can be increased, which is preferable. Furthermore, as the number of the bent portions included in the positive electrode current collector 101 or the negative electrode current collector 105 increases, the secondary battery 100 can be downsized, which is preferable.

With the above-described structure, the number of components of the secondary battery 100 can be reduced compared to a secondary battery having a structure in which a plurality of electrodes each including an active material layer in contact with a current collector is stacked; thus, fabrication can be facilitated. Furthermore, a positive electrode and a negative electrode can be easily aligned. Thus, when a secondary battery needs to be downsized, for example, when a secondary battery that is too small to be easily produced by human hands is fabricated, the secondary battery 100 can be easily fabricated. Thus, it can also be said that the secondary battery 100 is a secondary battery that can be easily mass-produced.

In FIGS. 2A to 2E, FIGS. 3A to 3D, FIG. 4, and FIG. 5, although an example is illustrated in which in the negative electrode current collector 105 in the negative electrode 115, the first region 231 and the second region 232 which are divided by the bent portion 211 with the second surface 222 inside are connected to each other, this embodiment is not limited to this. Two regions divided by the bent portion 212 with the first surface 221 inside may be connected to each other. Alternatively, in the positive electrode current collector 101 included in the positive electrode 111, two regions divided by the bent portion 251 with the third surface 223 inside may be connected to each other. Alternatively, in the positive electrode current collector 101, two regions divided by the bent portion 252 with the fourth surface 224 inside may be connected to each other.

Note that in this specification, the positive and negative electrodes may be reversed as appropriate as needed.

2. Modification Example 1

Another structure of the positive electrode 111 is described with reference to FIGS. 6A and 6B. The description of the secondary battery 100 which has the above-described basic structure can be referred to for the negative electrode 115, the separator 108, the exterior body 110, and the electrolytic solution 109.

Figure 6A:
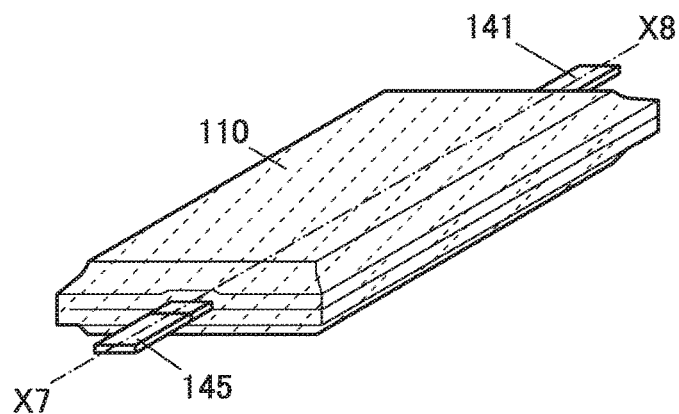
FIGS. 6A and 6B illustrate a power storage device.
Figure 6B:
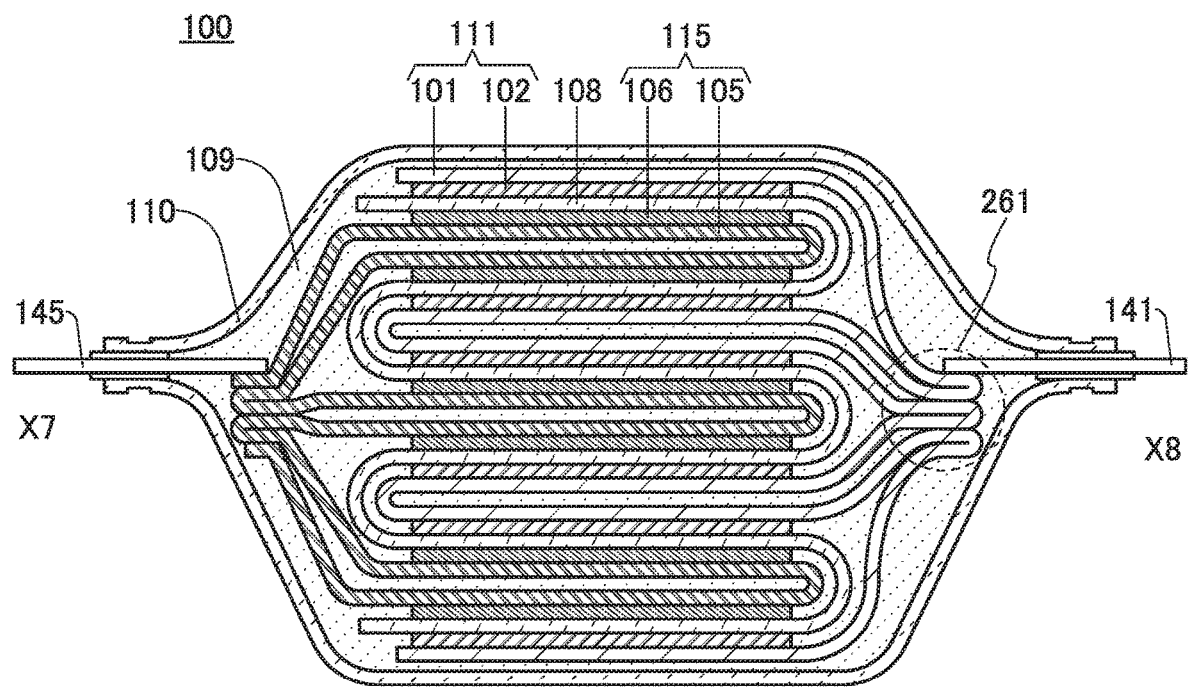
Figure 7:
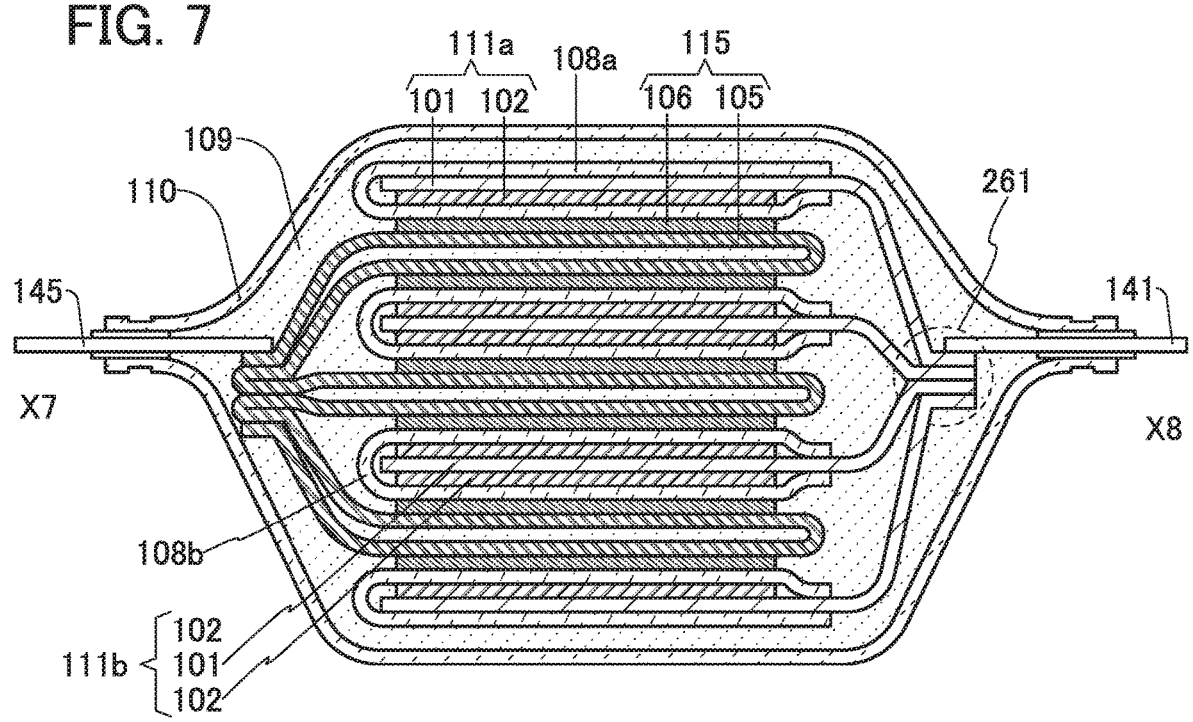
FIG. 7 illustrates a power storage device.

FIG. 6A shows a perspective view of the secondary battery 100. FIG. 6B shows a cross-sectional view of the secondary battery 100 along the line X7-X8.

In the case where the positive electrode lead 141 and the negative electrode lead 145 are attached to opposite sides of the exterior body 110 as shown in the secondary battery 100 in FIG. 6A, the positive electrode lead 141 is connected to the positive electrode 111 in a manner similar to that of the negative electrode lead 145 and the negative electrode 115. That is, as shown in FIG. 6B, the bent portions of the positive electrode current collector 101 may be connected at a welded portion 261. Thus, a change in the zigzag structure of the positive electrode current collector 101 can be suppressed.

Furthermore, the positive electrode lead 141 may be connected to the welded portion 261. Accordingly, internal resistance of the positive electrode 111 can be reduced. Thus, cycle characteristics of the secondary battery 100 can be improved and charge and discharge capacity can be increased.

Thus, the lead electrodes of the secondary battery 100 of one embodiment of the present invention can be freely positioned, and accordingly the degree of freedom in design is high. Accordingly, a product including the secondary battery of one embodiment of the present invention can have a high degree of freedom in design. Furthermore, a yield of products each including the secondary battery of one embodiment of the present invention can be increased.

Either the positive electrode 111 or the negative electrode 115 is not necessarily bent in zigzag as illustrated in FIGS. 2A to 2E, FIGS. 3A to 3D, FIG. 4, FIG. 5, and FIGS. 6A and 6B. For example, either the positive electrode 111 or the negative electrode 115 may have a flat plate shape like a positive electrode 111a and a positive electrode 111b included in the secondary battery 100 in FIG. 7. The positive electrode 111a includes a positive electrode active material layer 102 provided on one surface of the positive electrode current collector 101, and the positive electrode active material layer 102 and the negative electrode active material layer 106 face each other with a separator 108a provided therebetween. The positive electrode 111b includes the positive electrode active material layers 102 provided on both surfaces of the positive electrode current collector 101, and the positive electrode active material layers 102 and the negative electrode active material layers 106 face each other with a separator 108b provided therebetween.

The separator 108 is not necessarily bent in zigzag. For example, as in the case of the separators 108a and 108b included in the secondary battery 100 in FIG. 7, the positive electrode may be sandwiched between facing parts of the separators. The positive electrode 111a is sandwiched between facing parts of the separator 108a and the positive electrode 111b is sandwiched between facing parts of the separator 108b. The positive electrode 111a is sandwiched between facing parts of the separator 108a, whereby an internal short-circuit can be surely prevented from occurring in the secondary battery 100.

3. Modification Example 2

Next, another structure of the negative electrode 115 is described with reference to FIGS. 8A to 8C and FIGS. 9A to 9D. The above description can be referred to for the positive electrode 111, the separator 108, the exterior body 110, and the electrolytic solution 109.

Figure 8A:
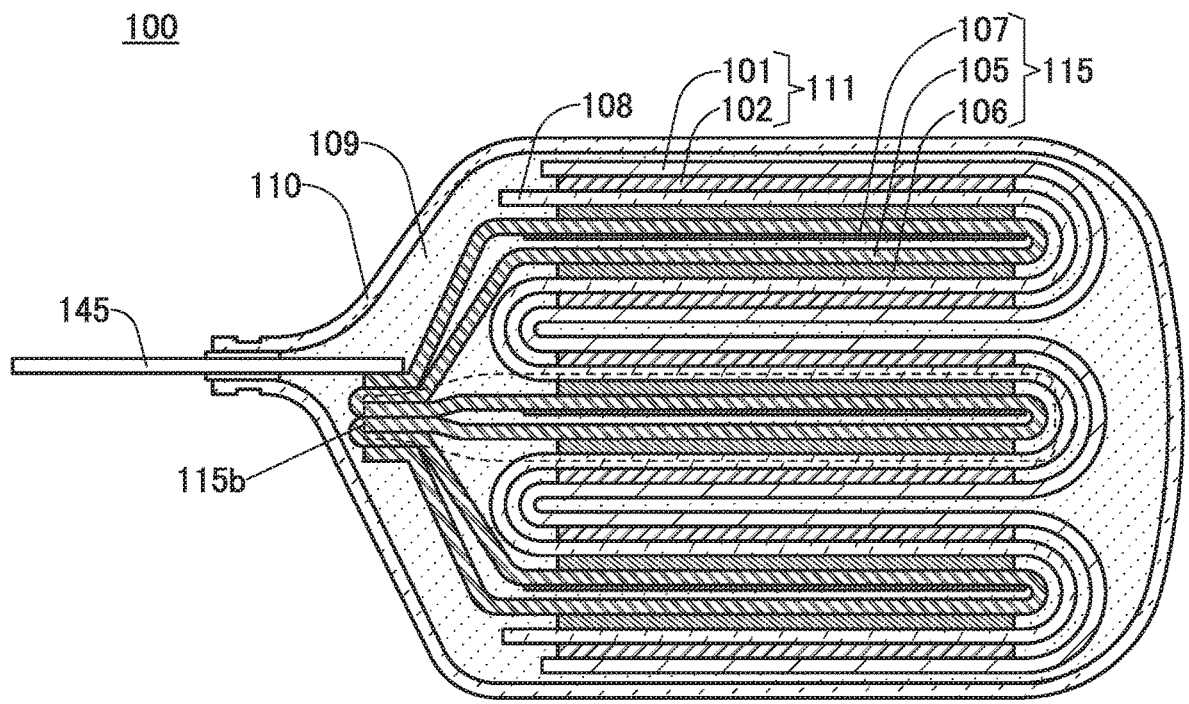
FIGS. 8A to 8C illustrate a power storage device.

FIG. 8A shows a cross-sectional view of the secondary battery 100. In the secondary battery 100, the negative electrode 115 includes the negative electrode current collector 105, the negative electrode active material layer 106, and a friction layer 107. The negative electrode current collector 105 is bent in zigzag and includes a plurality of bent portions.

Figure 8B:
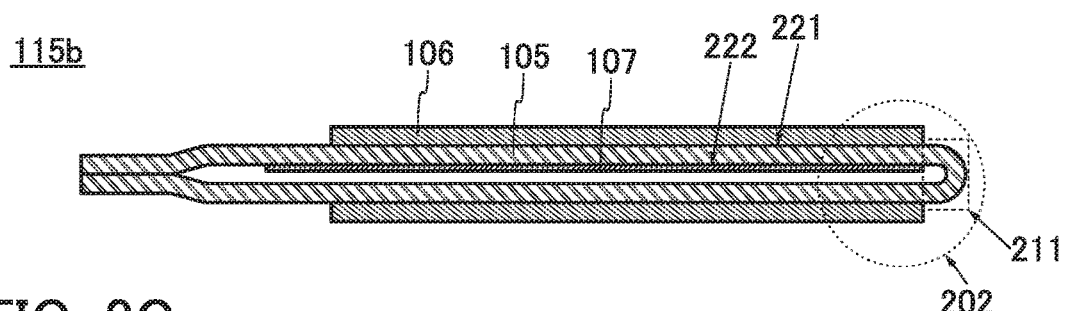

FIG. 8B shows an enlarged view of a portion 115b surrounded by a dotted line in the negative electrode 115 in FIG. 8A. The negative electrode current collector 105 has the first surface 221 and the second surface 222, and is bent with the second surface 222 inside to form the bent portion 211. The negative electrode active material layer 106 is provided on the first surface 221 and the friction layer 107 is provided on the second surface 222.

Figure 8C:
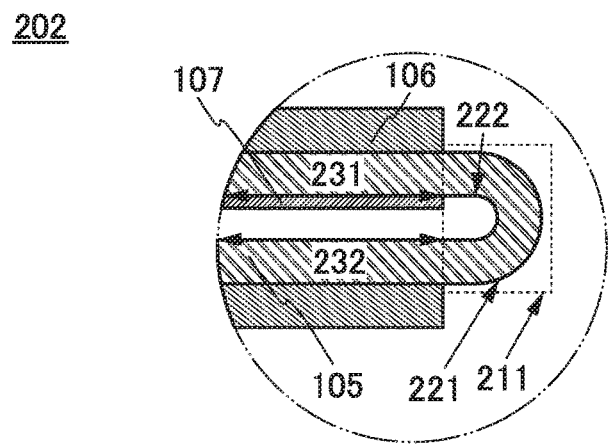

FIG. 8C shows an enlarged view of the portion 202 surrounded by a dotted line in the portion 115b in FIG. 8B. The second surface 222 of the negative electrode current collector 105 includes the first region 231 and the second region 232 which are divided with the bent portion 211 therebetween as a boundary. Furthermore, the first region 231 and the second region 232 face each other. The friction layer 107 is provided only on the first region 231 and not provided on the second region 232.

With this structure, the friction layer 107 provided on the first region 231 may come in contact with the second region 232. Although description will be made later, the friction layer 107 is formed using a material having a low-friction contact surface with other components; thus, the structure in which the friction layer 107 may come in contact with the second region 232 enables the negative electrode current collector 105 to be deformed more easily.

When the coefficient of static friction between the friction layer 107 and the second region 232 is lower than the coefficient of static friction between the first region 231 and the second region 232, the above-described structure is preferably employed because the negative electrode current collector 105 can be deformed more easily.

The coefficient of static friction in this specification and the like can be determined by measurement by means of an inclined plane method, measurement using a linear slide type tester, or the like.

The coefficient of static friction in this specification and the like can be obtained as follows. First, a sample A and a sample B are put on a horizontally-placed glass plate with a flat surface. A flat plate and a weight are put on the samples. The sample A is fixed, and a load testing machine is connected to the sample B, and the load testing machine is pulled horizontally at approximately 1 mm per second, for example. The maximum value of the load is measured until the sample B moves 1 cm. The measurement value is referred to as the maximum friction force. The coefficient of static friction $\mu$ between the sample A and the sample B can be obtained from the following equation: $\mu=N/F$, where F is the maximum static friction force, and N is the normal force on the sample A due to the loads on the flat plate, the weight, and the sample B.

Note that the coefficient of static friction in this specification and the like can also be measured by putting a measurement electrode on a horizontally-placed glass plate with a flat surface and vertically holding the sample B between the sample A.

Note that the coefficient of static friction may be reduced when a liquid exists between the sample A and the sample B. In the case where the coefficient of static friction of a friction surface where an electrolytic solution may exist at the time of practical use as a secondary battery is measured, it is preferable that the measurement be performed after the electrolytic solution is supplied between the sample A and the sample B. In the case of using a gelled electrolytic solution in the secondary battery, for example, the electrolytic solution may be hard to supply the friction surface. In the case where the coefficient of static friction of a surface of an electrode included in such a secondary battery is measured, the electrolytic solution need not be supplied between the sample A and the sample B.

Although FIGS. 8A, 8B, and 8C illustrate an example in which the negative electrode 115 include the friction layer 107, one embodiment of the present invention is not limited thereto, and the positive electrode 111 may include the friction layer 107.

FIGS. 8A, 8B, and 8C also illustrate an example in which the friction layer 107 is provided only on the first region 231 that is part of the second surface 222 of the negative electrode current collector 105; however, one embodiment of the present invention is not limited thereto. For example, the friction layer 107 may be provided on the entire second surface 222 of the negative electrode current collector 105, or the entire fourth surface 224 of the positive electrode current collector 101 on which the positive electrode active material layer 102 is not provided.

Figure 9A:
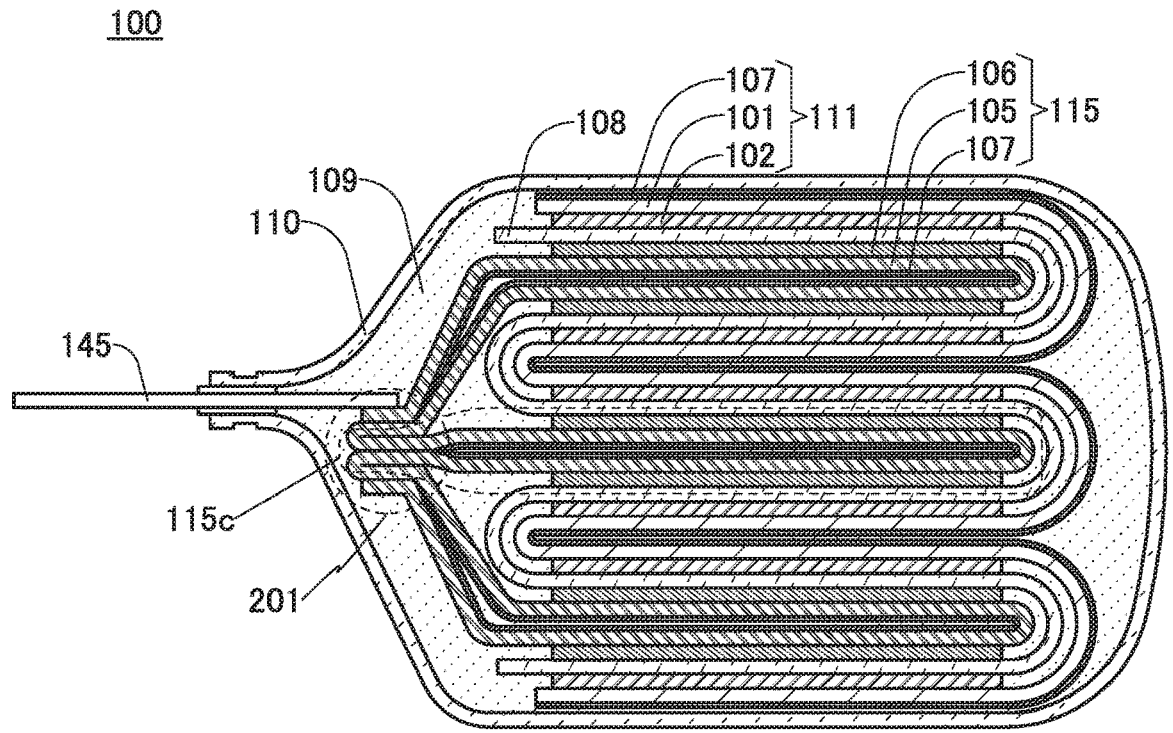
FIGS. 9A to 9D illustrate a power storage device.

For example, in the cross-sectional view of the secondary battery 100 in FIG. 9A, the positive electrode 111 and the negative electrode 115 both include the friction layer 107.

With this structure, both the positive electrode 111 and the negative electrode 115 can be deformed more easily. Thus, when the secondary battery 100 is bent, both the positive electrode current collector 101 and the negative electrode current collector 105 can be easily deformed according to deformation of the whole secondary battery 100.

Figure 9B:
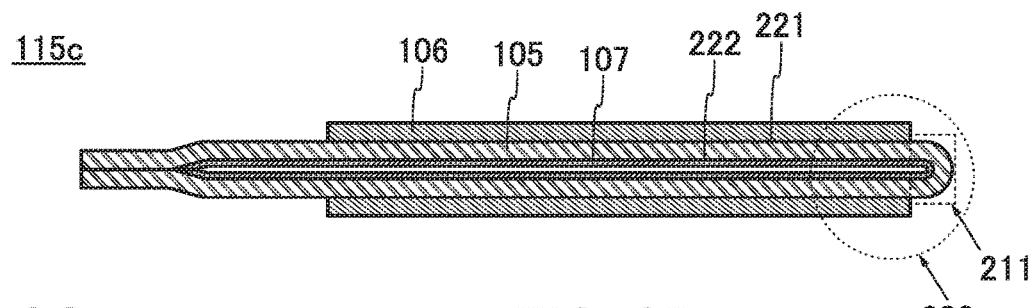
Figure 9C:
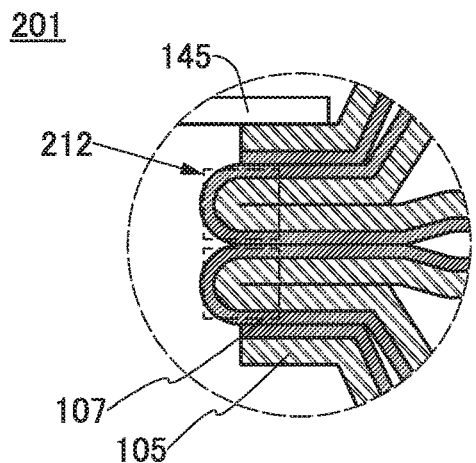

FIG. 9B shows an enlarged view of a portion 115c surrounded by a dotted line in the negative electrode 115 in FIG. 9A. The negative electrode current collector 105 has the first surface 221 and the second surface 222, and is bent with the second surface 222 inside to form the bent portion 211. The negative electrode active material layer 106 is provided on the first surface 221 and the friction layer 107 is provided on the second surface 222.

Figure 9D:
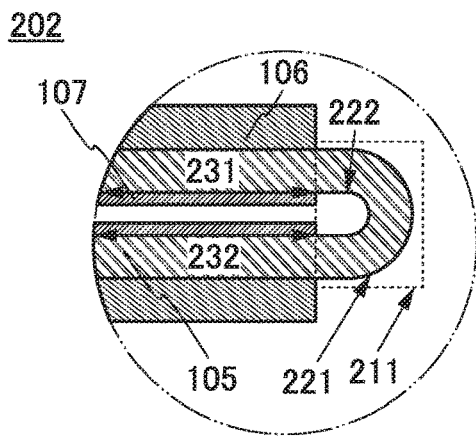

FIG. 9D shows an enlarged view of the portion surrounded by the dotted line in the portion 115c in FIG. 9B. The second surface 222 of the negative electrode current collector 105 includes the first region 231 and the second region 232 which are divided with the bent portion 211 therebetween as a boundary. The first region 231 and the second region 232 face each other. The friction layer 107 is provided on both the first region 231 and the second region 232.

When the coefficient of static friction between the friction layer 107 and the friction layer 107 is lower than the coefficient of static friction between the friction layer 107 and the first region 231 or the second region 232, the above-described structure is preferably employed because the negative electrode current collector 105 can be deformed more easily.

In the case where the friction layer 107 is formed of a material not having conductivity, the friction layer 107 around the bent portion 212 and the welded portion 201 on the negative electrode current collector 105 causes difficulty in connection between the first region 231 and the second region 232 of the negative electrode current collector 105. Thus, as shown in FIGS. 8A and 8B and FIGS. 9A and 9B, it is preferable that the friction layer 107 not be provided around the bent portion 212 and the welded portion 201 on the negative electrode current collector 105.

On the contrary, in the case where the friction layer 107 is formed of a material having conductivity, the first region 231 and the second region 232 of the negative electrode current collector 105 can be connected to each other even when the friction layer 107 is provided around the bent portion 212 and the welded portion 201 on the negative electrode current collector 105. Therefore, as shown in an enlarged view of the welded portion 201 in FIG. 9C, the friction layer 107 may be provided around the bent portion 212 and the welded portion 201.

4. Modification Example 3

Next, another structure of the secondary battery 100 is described with reference to FIG. 10.

Figure 10:
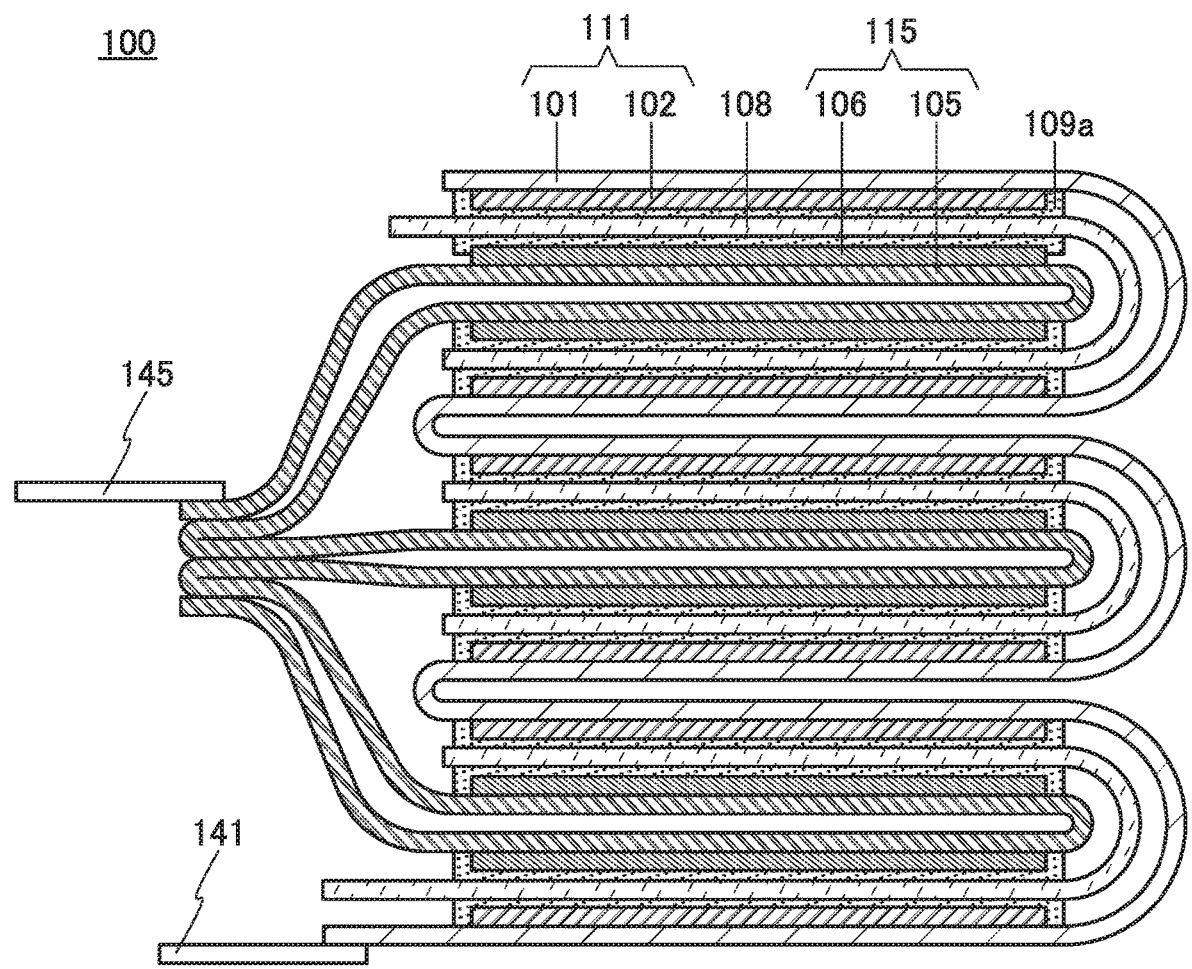
FIG. 10 illustrates a power storage device.

The secondary battery 100 in FIG. 10 includes the positive electrode 111, the negative electrode 115, the separator 108, and a gelled electrolytic solution 109a. The positive electrode 111 includes the positive electrode current collector 101 and the positive electrode active material layer 102. The negative electrode 115 includes the negative electrode current collector 105 and the negative electrode active material layer 106. The positive electrode current collector 101, the negative electrode current collector 105, and the separator 108 are bent in zigzag and includes a plurality of bent portions. The positive electrode active material layer 102 and the negative electrode active material layer 106 face each other with the separator 108 and the gelled electrolytic solution 109a therebetween. The positive electrode current collector 101 is connected to the positive electrode lead 141. The negative electrode current collector 105 is connected to the negative electrode lead 145.

The gelled electrolytic solution 109a between the positive electrode 111 and the negative electrode 115 allows the distance between the positive electrode active material layer 102 and the negative electrode active material layer 106 to be kept constant. Thus, battery reaction rate between the positive electrode 111 and the negative electrode 115 can be kept constant. Therefore, with this structure, the distance between the positive electrode active material layer 102 and the negative electrode active material layer 106 can be kept constant when the secondary battery 100 is curved, so that variation in battery reaction rate between the positive electrode 111 and the negative electrode 115 can be prevented and deterioration in capacity and cycle characteristics of the secondary battery 100 can be suppressed.

5. Modification Example 4

Another modification example of the secondary battery 100 is described with reference to FIGS. 11A and 11B, FIGS. 12A and 12B, FIGS. 13A and 13B, FIG. 14, FIGS. 15A and 15B, FIGS. 16A and 16B, FIG. 17, FIG. 18, FIG. 19, FIG. 20, FIG. 21, FIG. 22, and FIG. 23. Note that for the positive electrode 111, the negative electrode 115, the separator 108, the exterior body 110, the electrolytic solution 109, and the like in FIGS. 11A and 11B, FIGS. 12A and 12B, FIGS. 13A and 13B, FIG. 14, FIGS. 15A and 15B, FIGS. 16A and 16B, FIG. 17, FIG. 18, FIG. 19, FIG. 20, FIG. 21, FIG. 22, and FIG. 23, the description of Modification Examples 1 to 3 can be referred to when they are not particularly mentioned.

Figure 11A:
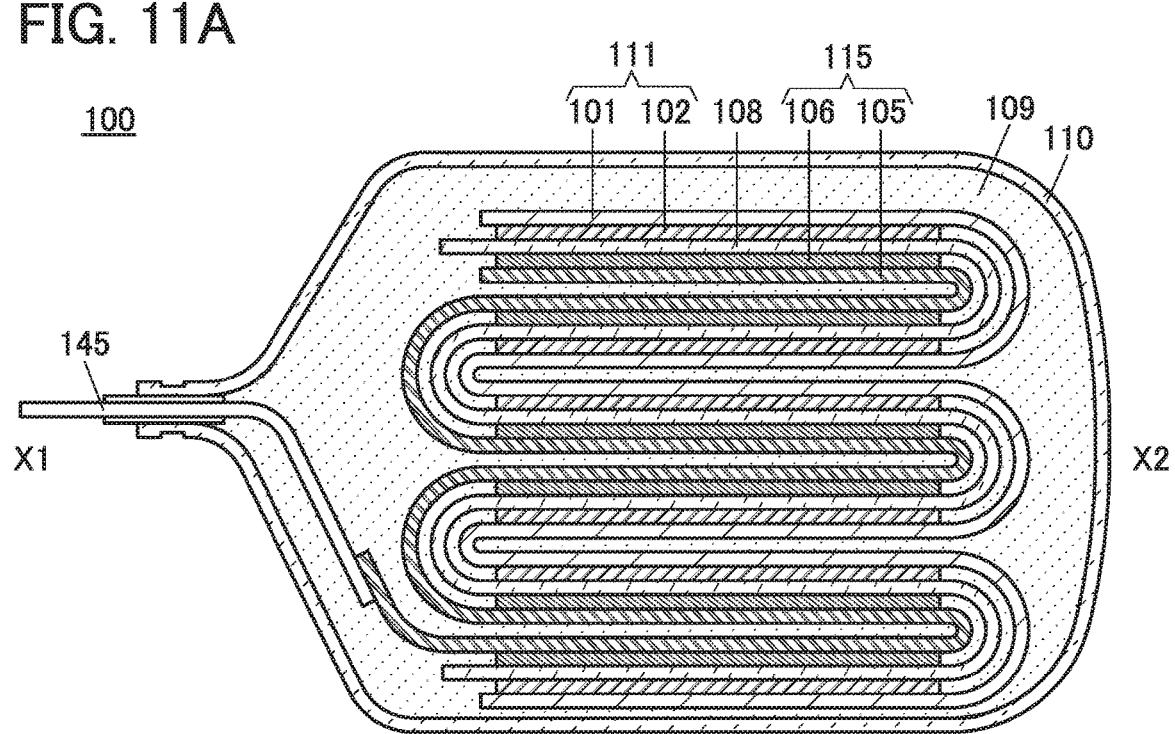
FIGS. 11A and 11B illustrate a power storage device.
Figure 11B:
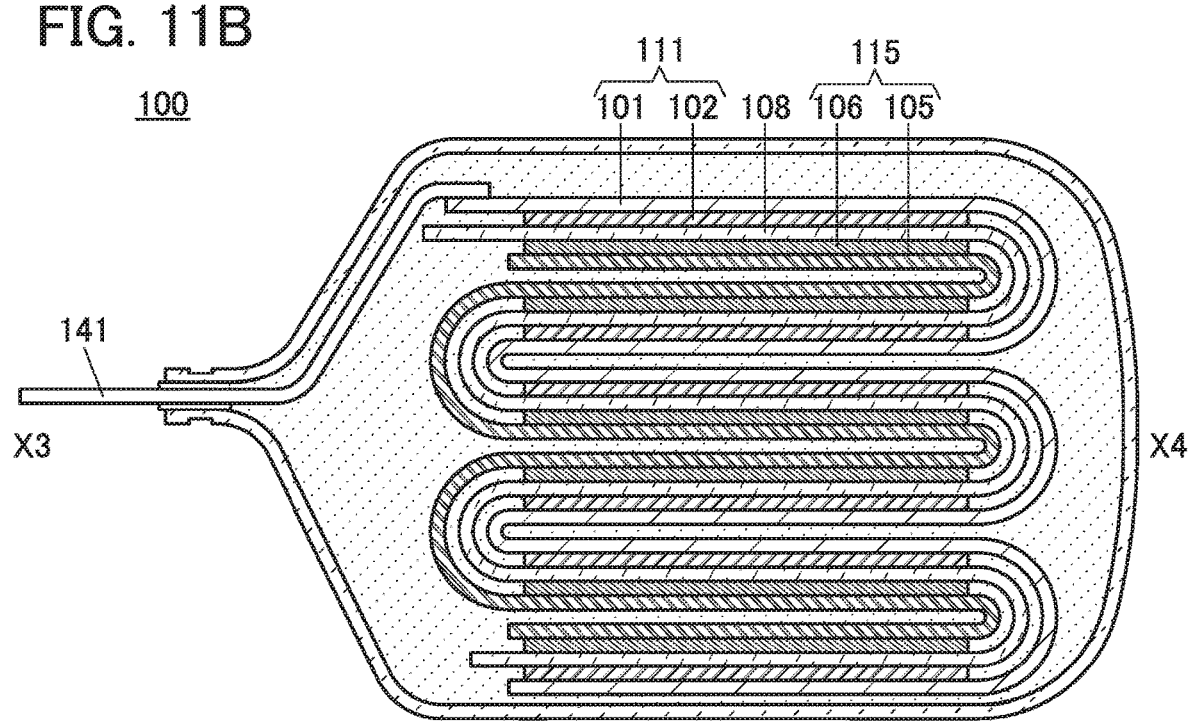

FIG. 11A shows a modification example of the cross-sectional view of the secondary battery 100 along the line X1-X2 in FIG. 1A. FIG. 11B shows a modification example of the cross-sectional view of the secondary battery 100 along the line X3-X4 in FIG. 1A.

As shown in FIGS. 11A and 11B, depending on the situation, the first surface and the second surface of the negative electrode current collector 105 are not necessarily connected by welding in the negative electrode 115. Even when the welded portion 201 is not formed, the negative electrode current collector 105 can be connected to the negative electrode lead 145 in a negative electrode tab.

Note that the negative electrode tab is a portion of the negative electrode, which is electrically connected to the negative electrode lead and in which an active material is not formed. Similarly, a positive electrode tab is a portion of the positive electrode, which is electrically connected to the positive electrode lead and in which an active material is not formed.

Figure 12A:
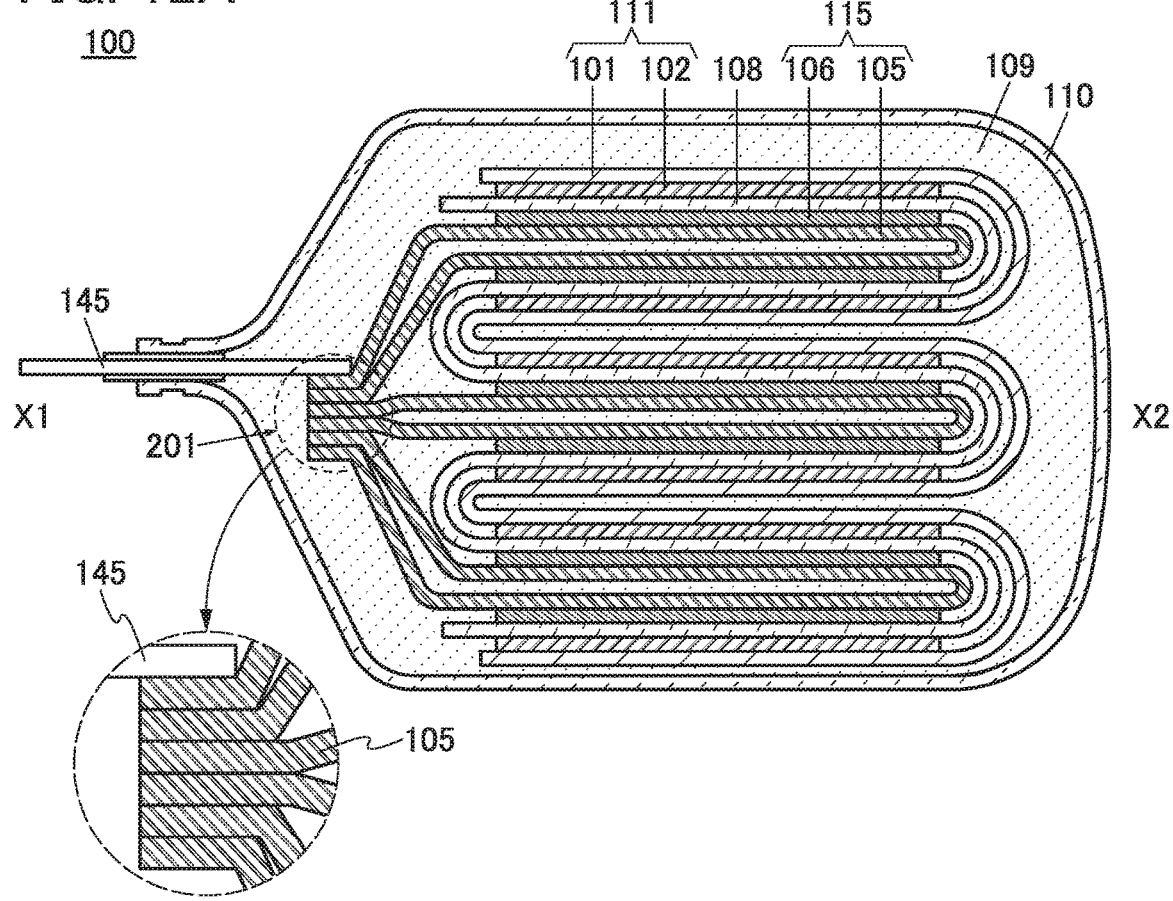
FIGS. 12 A and 12B illustrate a power storage device.
Figure 12B:
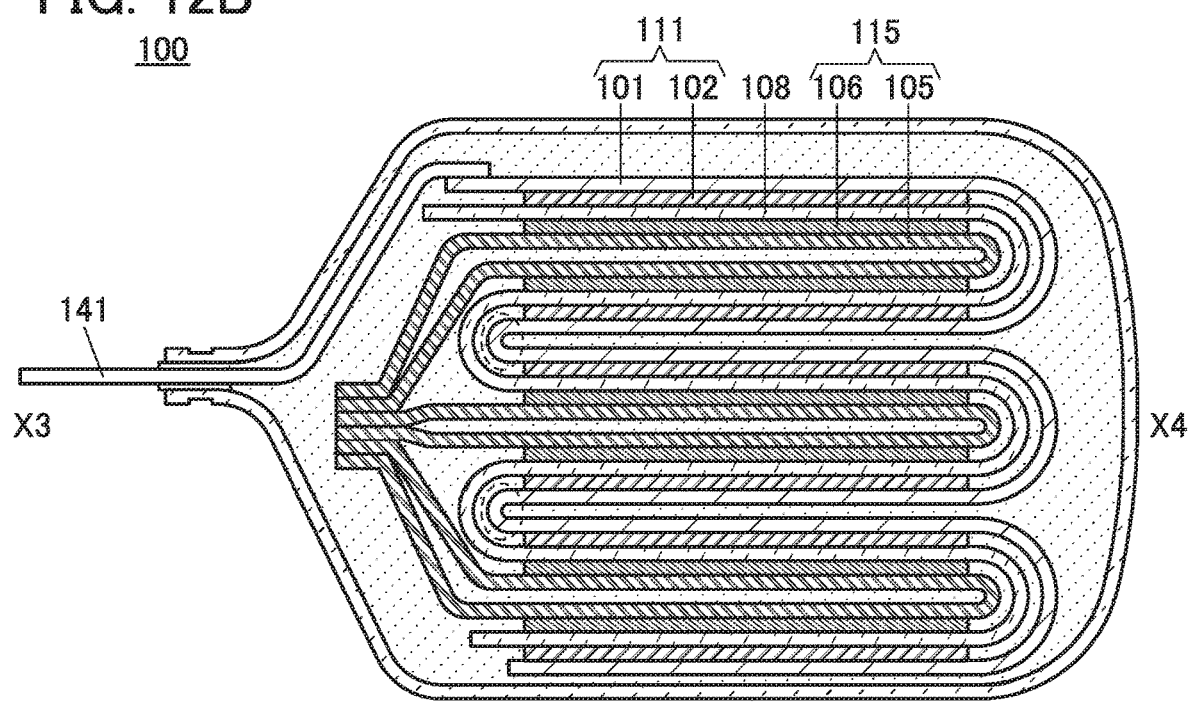

FIG. 12A shows another modification example of the cross-sectional view of the secondary battery 100 along the line X1-X2 in FIG. 1A. FIG. 12B shows another modification example of the cross-sectional view of the secondary battery 100 along the line X3-X4 in FIG. 1A.

As shown in FIGS. 12A and 12B, depending on the situation, the negative electrode current collector 105 in the negative electrode 115 does not necessarily have a bent portion corresponding to the bent portion 212 in FIG. 2D. With a structure in which a plurality of two-folded negative electrode current collectors 105 is connected at the welded portion 201, the negative electrode current collectors 105 can be connected to the negative electrode lead 145 at the welded portion 201.

Figure 13A:
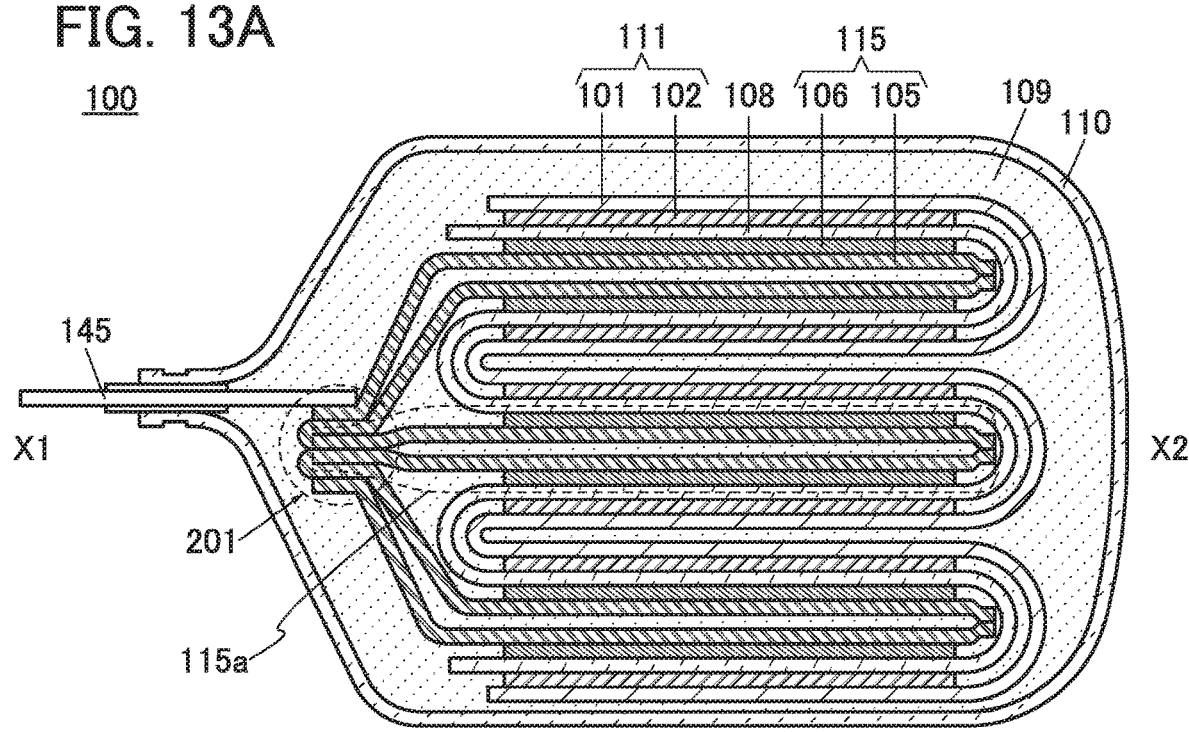
FIGS. 13A and 13B illustrate a power storage device.
Figure 13B:
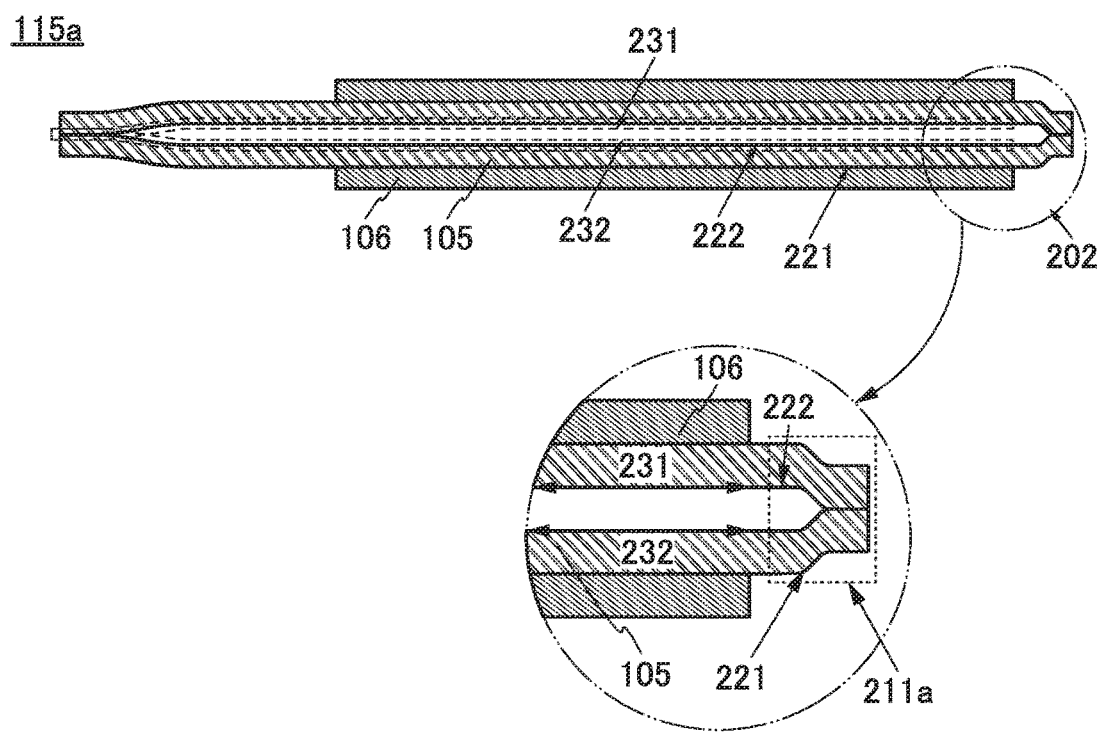

FIG. 13A shows another modification example of the cross-sectional view of the secondary battery 100 along the line X1-X2 in FIG. 1A. FIG. 14 shows another modification example of the cross-sectional view of the secondary battery 100 along the line X3-X4 in FIG. 1A. FIG. 13B shows an enlarged view of the portion 115a surrounded by the dotted line in FIG. 13A.

As shown in FIGS. 13A and 13B and FIG. 14, depending on the situation, the negative electrode current collector 105 in the negative electrode 115 does not necessarily have a bent portion corresponding to the bent portion 211 in FIG. 2E. The surfaces of the two negative electrode current collectors 105 on which the negative electrode active material layer 106 is not formed (the second surface 222 including the first region 231 and the second surface 222 including the second region 232) may be connected at the welded portion 211a.

Figure 15A:
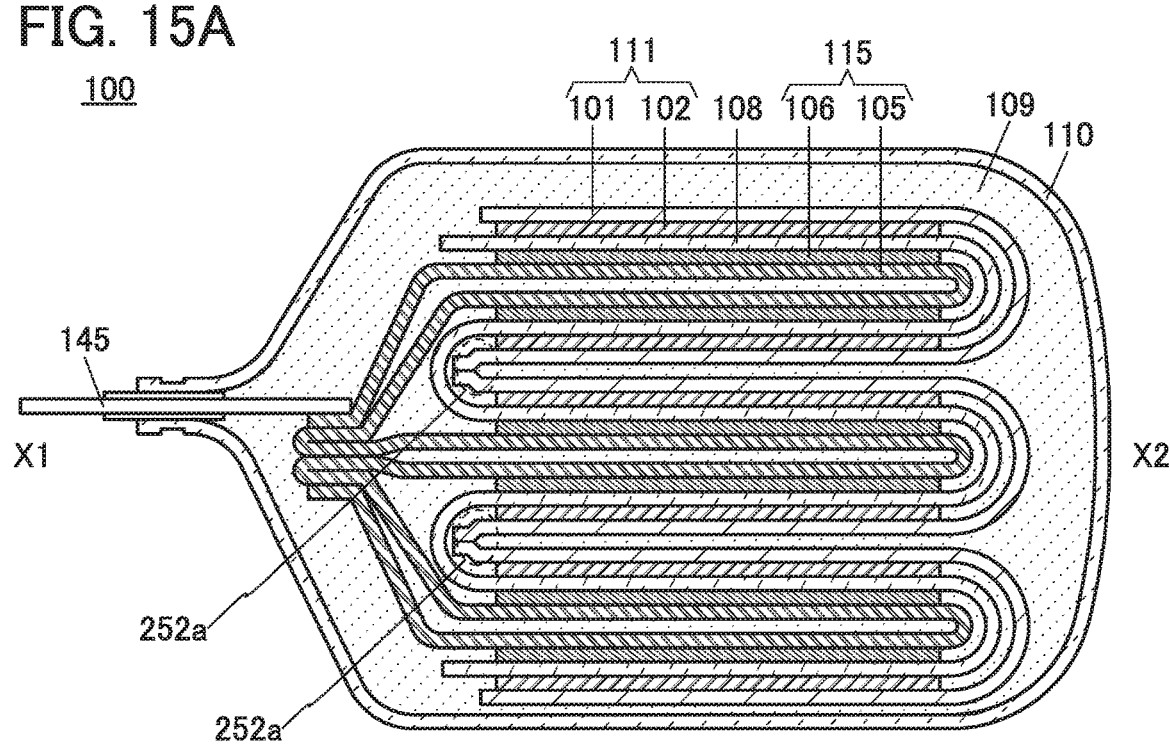
FIGS. 15A and 15B illustrate a power storage device.
Figure 15B:
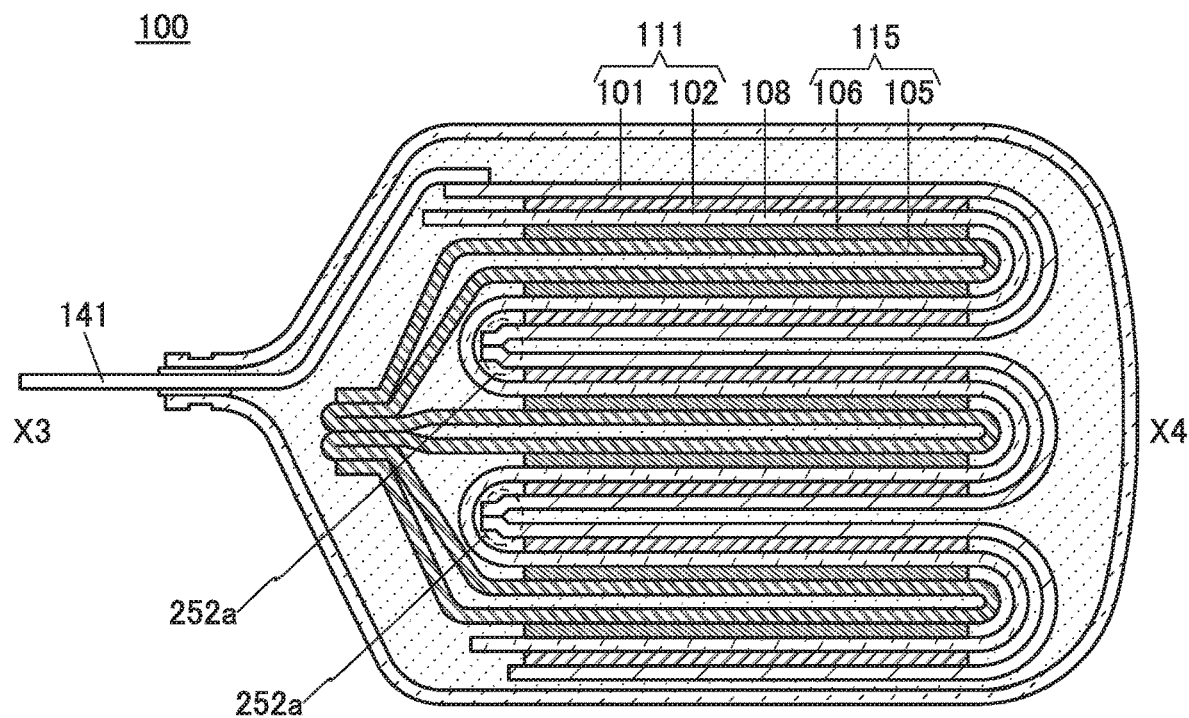

FIG. 15A shows another modification example of the cross-sectional view of the secondary battery 100 along the line X1-X2 in FIG. 1. FIG. 15B shows another modification example of the cross-sectional view of the secondary battery 100 along the line X3-X4 in FIG. 1.

As shown in FIGS. 15A and 15B, depending on the situation, the positive electrode current collector 101 in the positive electrode 111 does not necessarily have a bent portion corresponding to the bent portion 252 in FIG. 3A. The surfaces of the two positive electrode current collectors 101 on which the positive electrode active material layer 102 is not formed may be connected at the welded portion 252a.

Figure 16A:
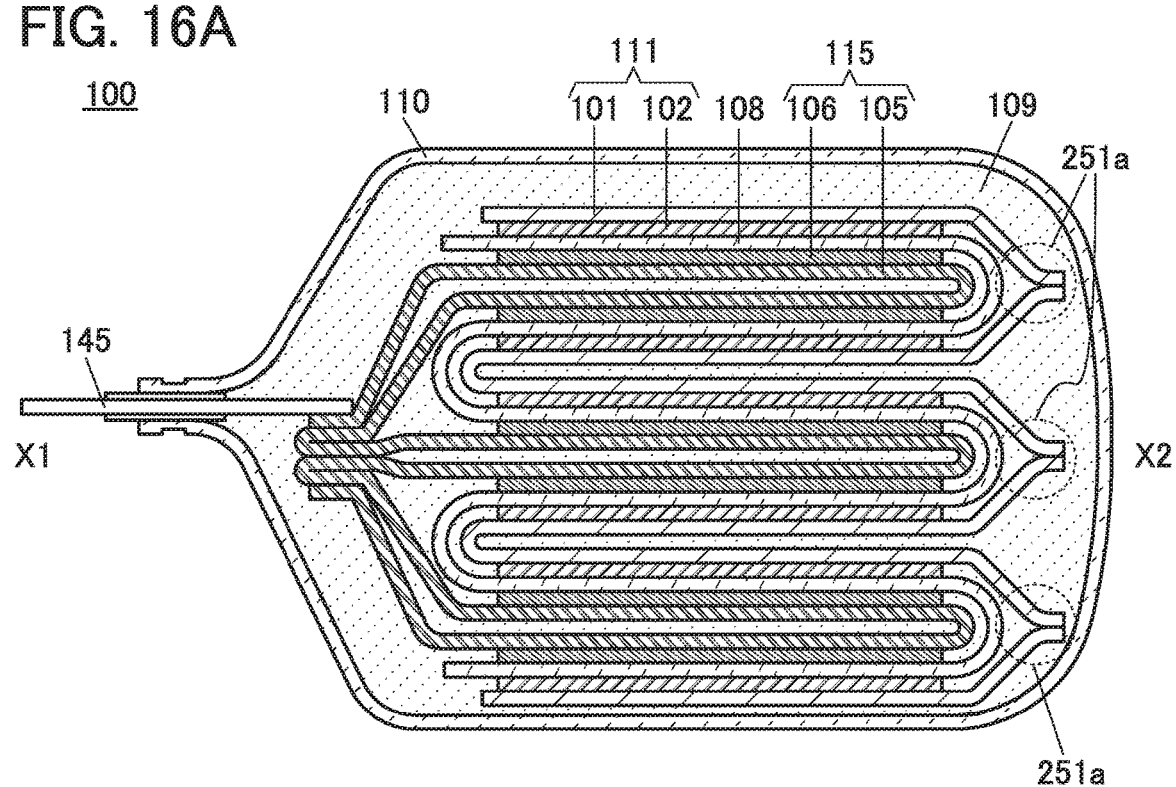
FIGS. 16A and 16B illustrate a power storage device.
Figure 16B:
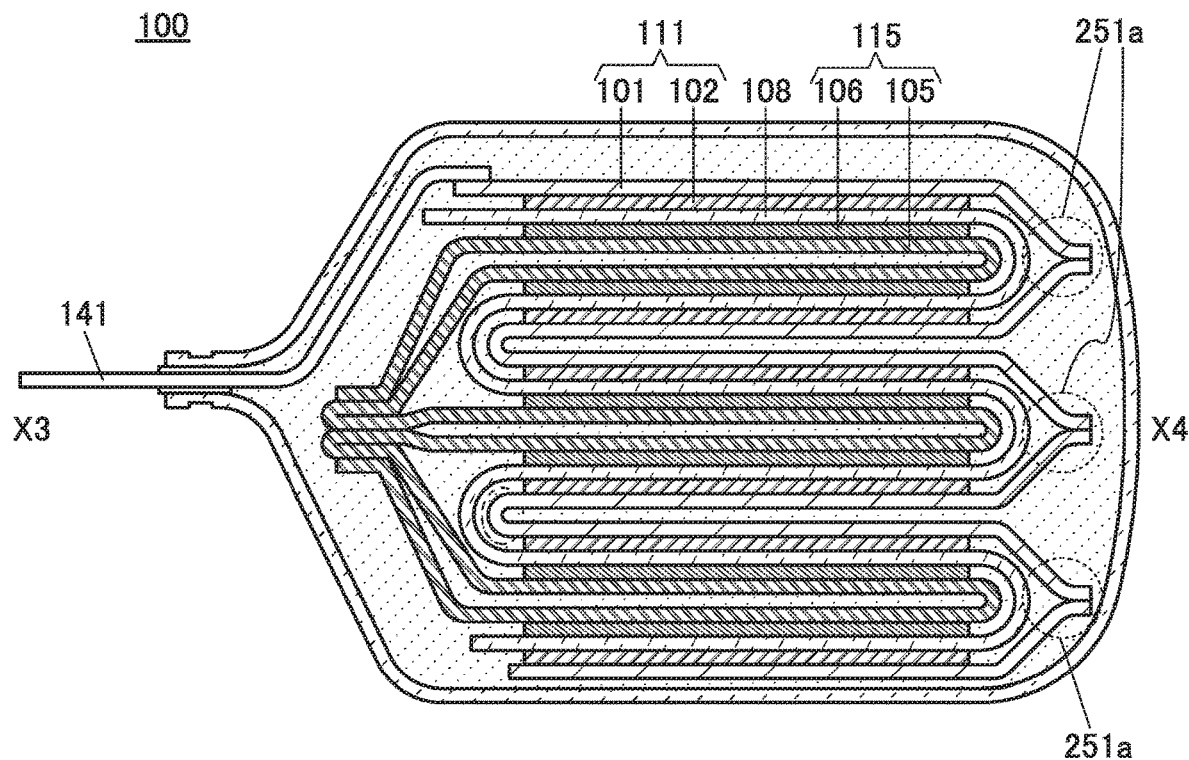

FIG. 16A shows another modification example of the cross-sectional view of the secondary battery 100 along the line X1-X2 in FIG. 1A. FIG. 16B shows another modification example of the cross-sectional view of the secondary battery 100 along the line X3-X4 in FIG. 1A.

As shown in FIGS. 16A and 16B, the positive electrode current collector 101 in the positive electrode 111 does not necessarily have a bent portion corresponding to the bent portion 251 in FIG. 3B. The surfaces of the two positive electrode current collectors 101 on which the positive electrode active material layer 102 is not formed may be connected at the welded portion 251a.

Figure 17:
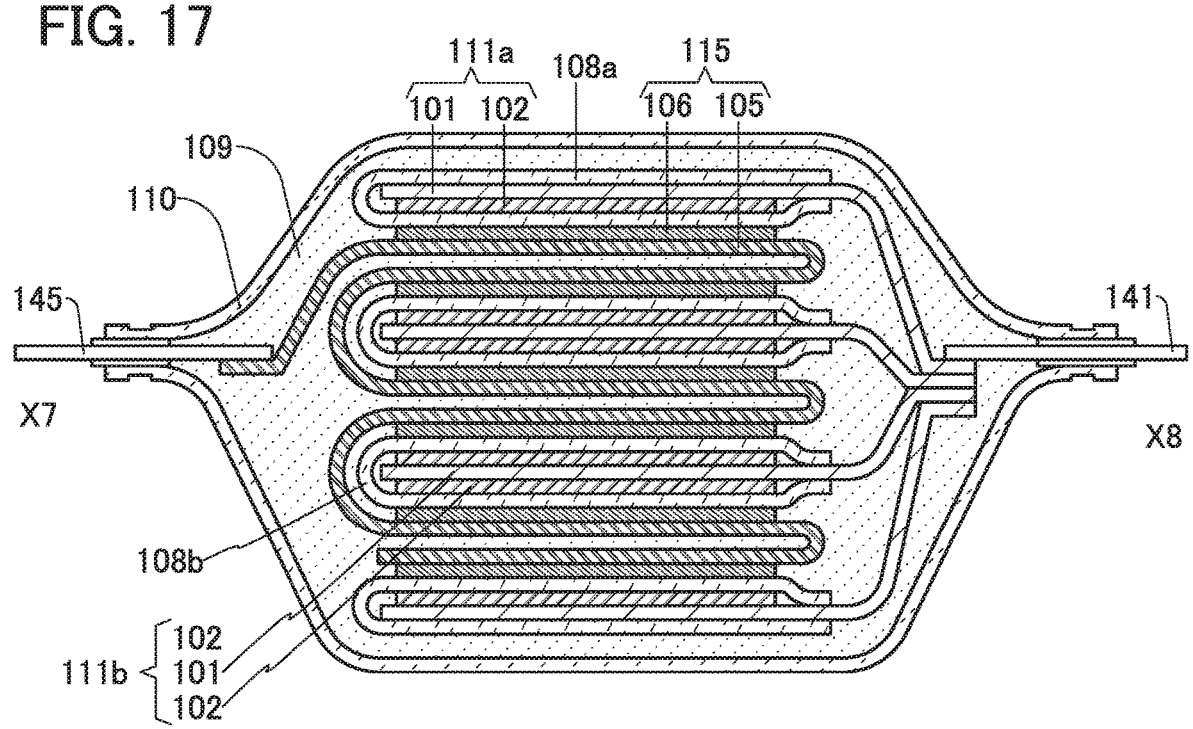
FIG. 17 illustrates a power storage device.

FIG. 17 shows a modification example of the cross-sectional view of the secondary battery 100 along the line X7-X8 in FIG. 6A.

As shown in FIG. 17, when the positive electrode 111a and the positive electrode 111b have a flat plate shape, the first surface and the second surface of the negative electrode current collector 105 is not necessarily connected to each other in the negative electrode 115. An end portion of the negative electrode current collector 105 can be connected to the negative electrode lead 145 at the negative electrode tab even when the welded portion is not formed.

Figure 18:
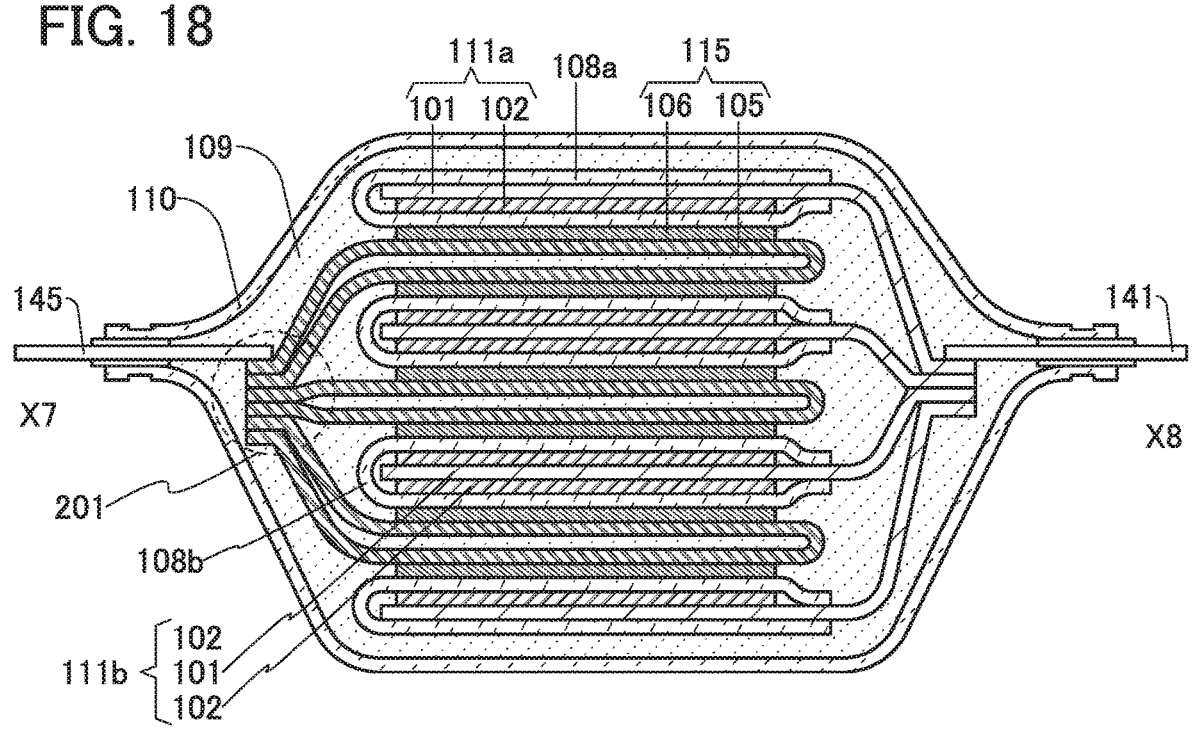
FIG. 18 illustrates a power storage device.

FIG. 18 shows another modification example of the cross-sectional view of the secondary battery 100 along the line X7-X8 in FIG. 6A.

As shown in FIG. 18, when the positive electrode 111a and the positive electrode 111b have a flat plate shape, the negative electrode current collector 105 in the negative electrode 115 does not necessarily have a bent portion corresponding to the bent portion 212 in FIG. 2D. With a structure in which a plurality of two-folded negative electrode current collectors 105 is connected at the welded portion 201, the negative electrode current collectors 105 can be connected to the negative electrode lead 145 at the welded portion 201.

Figure 19:
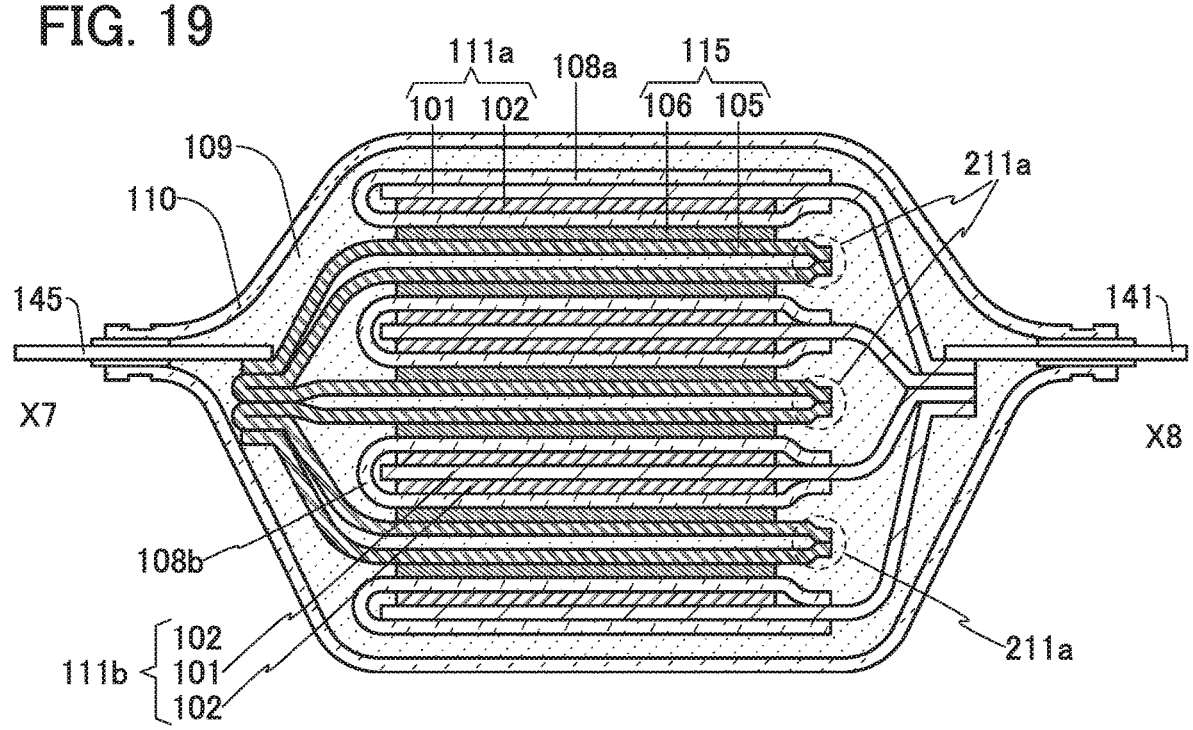
FIG. 19 illustrates a power storage device.

FIG. 19 shows another modification example of the cross-sectional view of the secondary battery 100 along the line X7-X8 in FIG. 6A.

As shown in FIG. 19, even when the positive electrode 111a and the positive electrode 111b have a flat plate shape, in the negative electrode 115, the negative electrode current collector 105 does not necessarily have a bent portion corresponding to the bent portion 211 in FIG. 2E. The surfaces of the two negative electrode current collectors 105 on which the negative electrode active material layer 106 is not formed may be connected at the welded portion 211a.

Figure 20:
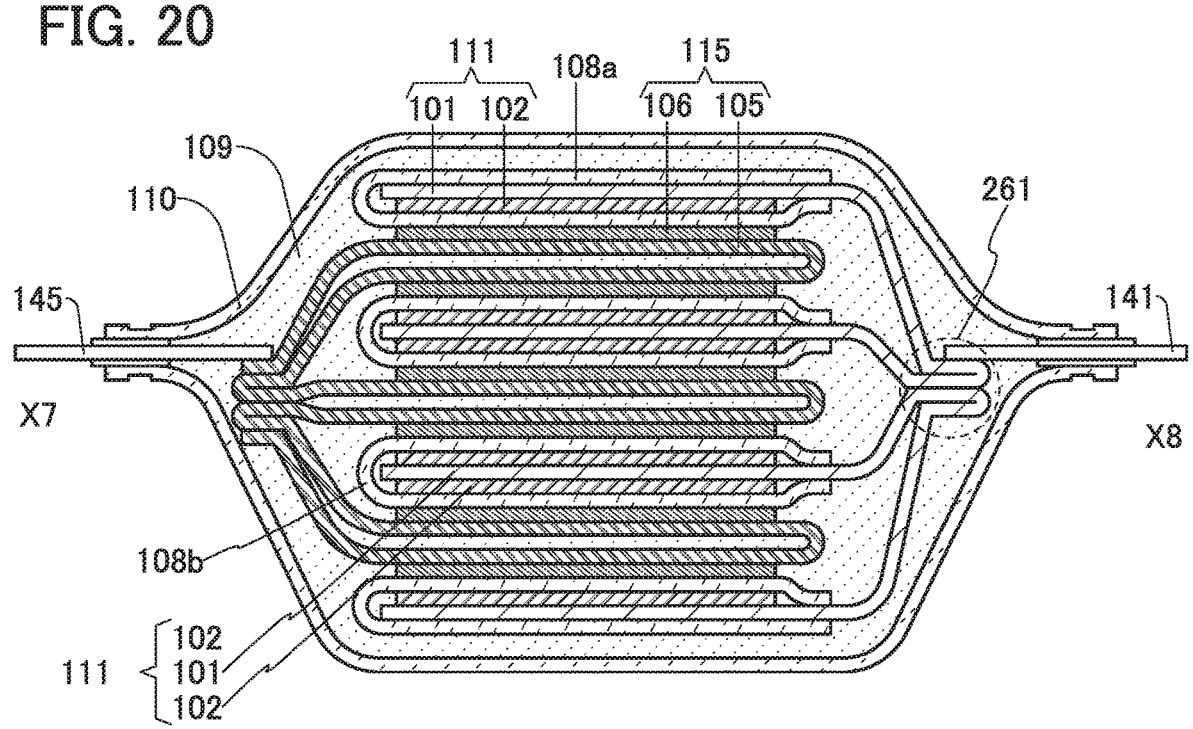
FIG. 20 illustrates a power storage device.

FIG. 20 shows another modification example of the cross-sectional view of the secondary battery 100 along the line X7-X8 in FIG. 6A.

The positive electrode 111 may have a shape which is neither a zigzag shape nor a flat plate shape. In the electrode 111 in FIG. 20, the positive electrode active material layer 102 is provided on both surfaces of part of the positive electrode current collector 101 and also provided on one surface of the other part of the positive electrode current collector 101. Such positive electrodes 111 may be connected at the welded portion 261.

Figure 21:
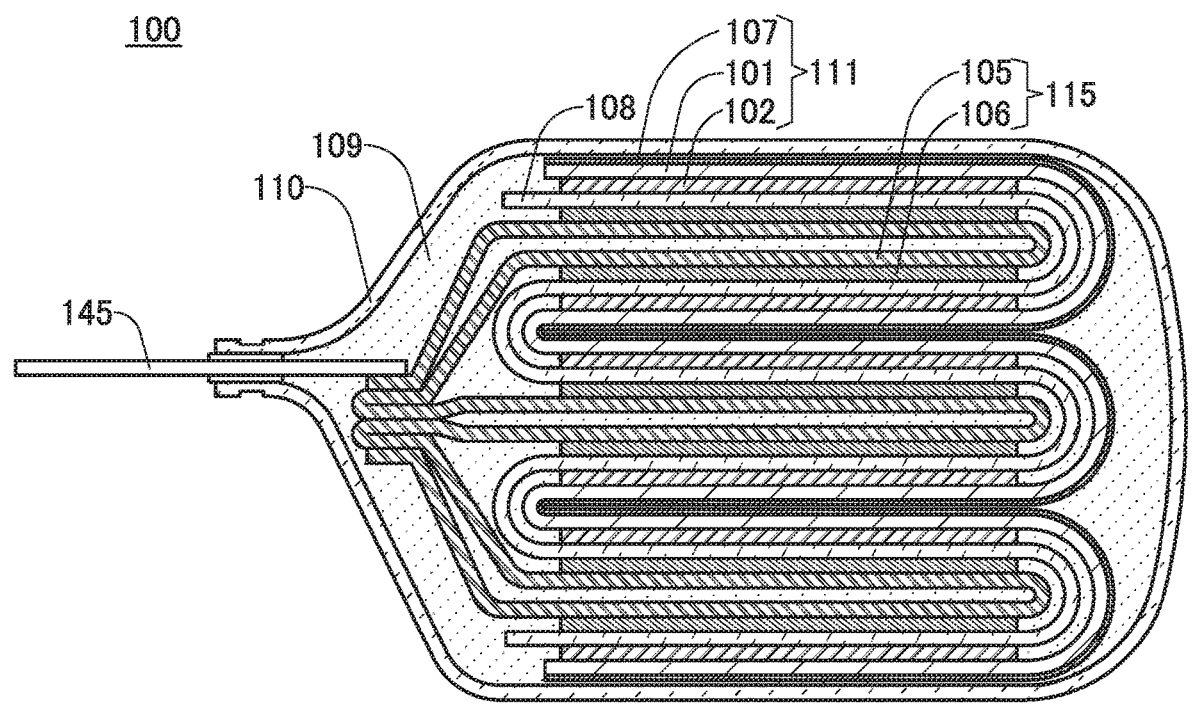
FIG. 21 illustrates a power storage device.
Figure 22:
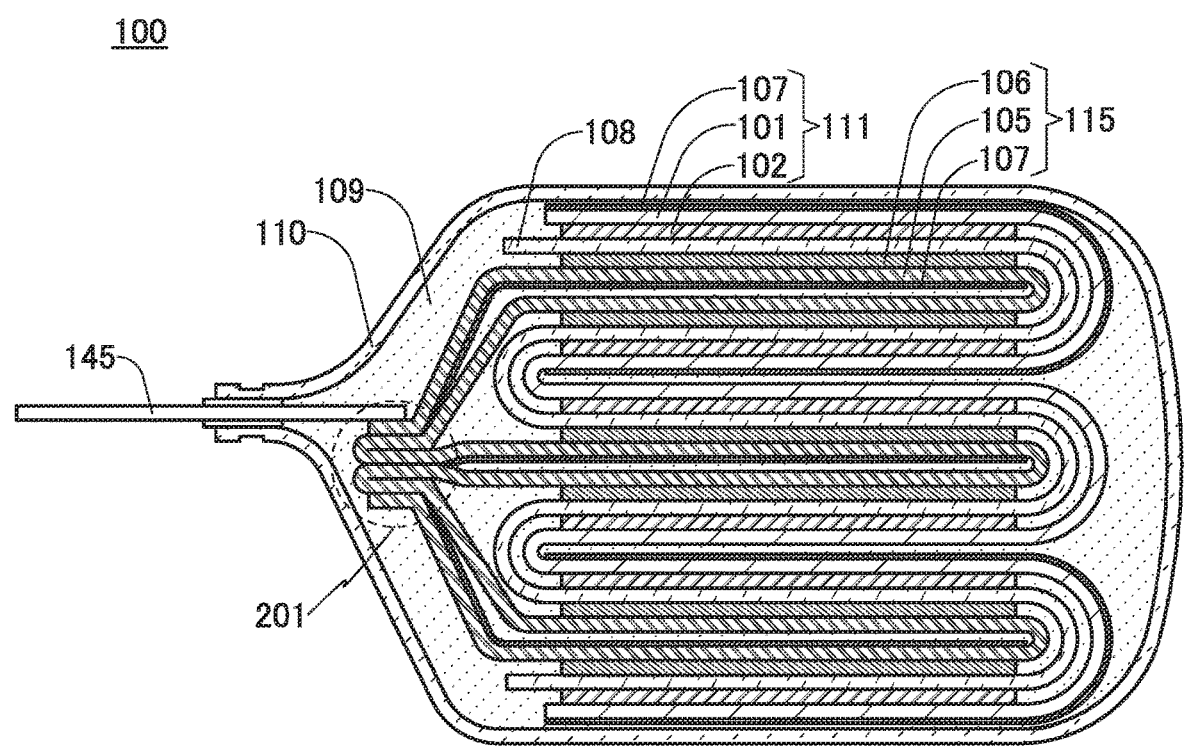
FIG. 22 illustrates a power storage device.
Figure 23:
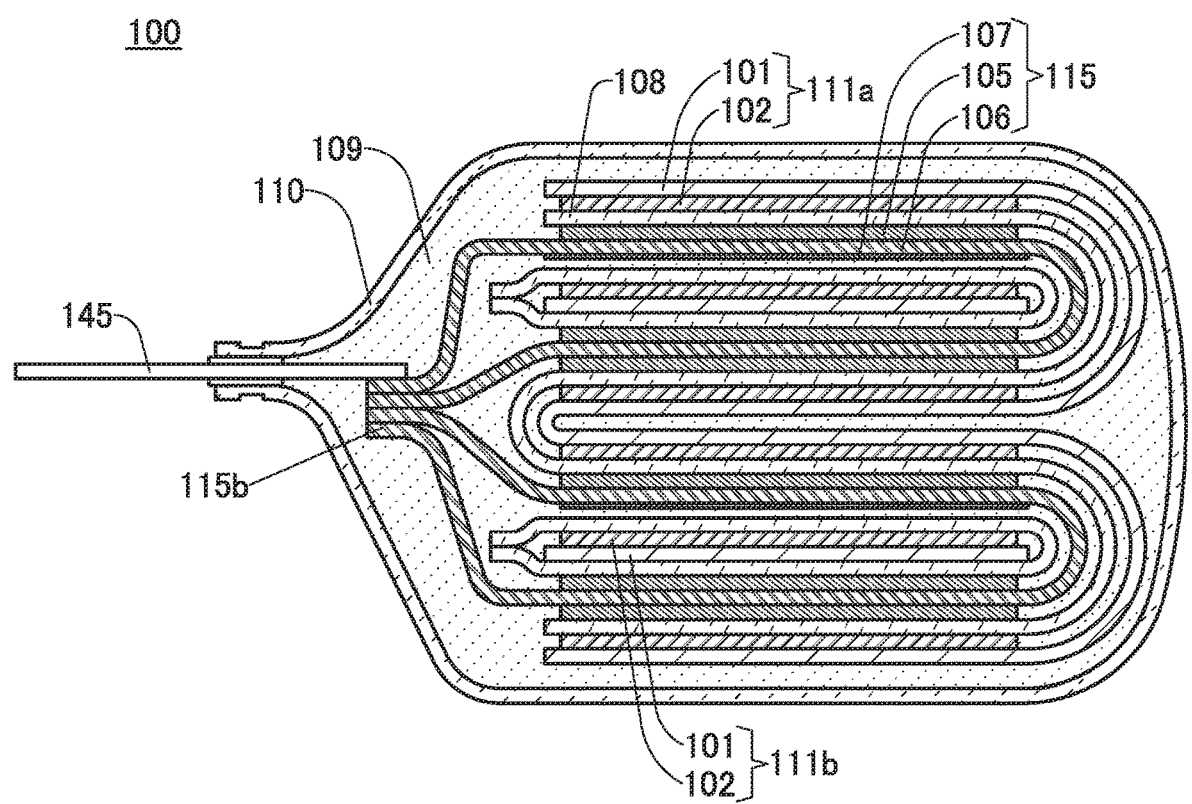
FIG. 23 illustrates a power storage device.

Modification examples of the secondary battery 100 including the friction layer 107 are illustrated in FIG. 21, FIG. 22, and FIG. 23.

As shown in FIG. 21, only the positive electrode 111 may include the friction layer 107.

As shown in FIG. 22, a structure in which both the positive electrode 111 and the negative electrode 115 include the friction layer 107, and the friction layer 107 is provided over only part of the positive electrode current collector 101 and part of the negative electrode current collector 105 may be employed.

Also as shown in FIG. 23, the secondary battery 100 may have a structure which includes the negative electrode 115 including the friction layer 107, the positive electrode 111a having a zigzag shape, and the positive electrode 111b having a flat plate shape.

6. Material

Next, a material for forming the secondary battery 100 is described.

The positive electrode current collector 101 and the negative electrode current collector 105 can be each formed using a material that has high conductivity and is not alloyed with a carrier ion of lithium or the like, such as a metal typified by stainless steel, gold, platinum, zinc, iron, copper, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a punching-metal shape, an expanded-metal shape, or the like as appropriate. The current collectors each preferably have a thickness of 5 μm to 30 μm inclusive. The surface of the electrode current collector may be provided with an undercoat layer using graphite or the like.

A friction layer may be a conductive film or an insulating film, and an organic film, an inorganic film, a metal film, or the like can be used.

Examples of an organic film include a resin film and a film formed of a low-molecular compound.

A resin film can be formed using one or more of thermal curable resin materials such as an epoxy resin, an acrylic resin, a silicone resin, a phenol resin, and a polyester resin, or one or more of thermoplastic resin materials such as polypropylene, polyethylene, polycarbonate, polystyrene, polyamide, polyetherketone, fluororesin, and polyethylenenaphthalate. Polyoxymethylene may also be used. Fluororesin, typified by polytetrafluoroethylene whose coefficient of static friction between the same members is approximately 0.04, is particularly preferable because slidability is high and slidability of the friction layer can be improved. Furthermore, it is preferable that the friction layer be free from decomposition due to a battery reaction potential. For example, when the battery reaction potential of the negative electrode is low, fluororesin may be subjected to reduction decomposition. For this reason, it is preferable to use fluororesin for the friction layer in a positive electrode. Polyetherketone, of which the typical example is polyetheretherketone (PEEK), is preferable because it is excellent in slidability, heat resistance, fatigue resistance, and chemical resistance and can improve slidability of the friction layer. Alternatively, a polyparaxylylene resin may be formed by chemical vapor deposition (CVD) method. A polyparaxylylene is preferable because it is excellent in slidability, heat resistance, and chemical resistance and can improve slidability of the friction layer.

As a film formed of a low-molecular compound, a self-assembled monolayer (SAM) may be used. Formation of a SAM on the surface of the current collector can improve the lubricity of the surface of the current collector and the lubricity of the electrode, which is preferable. Alternatively, a liquid repellent SAM may be used. As a liquid repellent SAM, a silane coupling agent having a fluoroalkyl group (i.e., fluoroalkyl silane, hereinafter referred to as FAS) may be used. The current collector which is heated and FAS are confined so as to form a FAS SAM on the surface of the current collector by gas-phase reaction. Alternatively, the friction layer may be formed on the current collector by depositing a solid lubricant such as melamine cyanurate (MCA).

As an inorganic film and a metal film, materials that can be attached to the current collector can be used. The use of materials that do not allow lithium ions to be inserted or extracted and are not alloyed or dealloyed with lithium is particularly preferable. For example, the use of a metal sulfide such as molybdenum disulfide ($MoS_2$) or tungsten disulfide ($WS_2$) or boron nitride (BN), each of which is a typical example of a solid lubricant, as the inorganic film can improve slidability of the electrode. The inorganic film may have an insulating property, and can be an oxide insulating film such as a silicon oxide film, a silicon oxynitride film, a gallium oxide film, a gallium oxynitride film, an yttrium oxide film, an yttrium oxynitride film, a hafnium oxide film, or a hafnium oxynitride film, or a nitride insulating film such as a silicon nitride film or an aluminum nitride film.

For the metal film, for example, a metal material such as aluminum, gold, platinum, silver, nickel, tungsten, chromium, molybdenum, iron, cobalt, copper, or palladium, or an alloy containing any of these metal materials can be used. Lanthanum, neodymium, germanium, or the like may be added to the metal material or the alloy. Furthermore, an alloy containing aluminum (an aluminum alloy) such as an alloy of aluminum and titanium, an alloy of aluminum and nickel, an alloy of aluminum and neodymium, or an alloy of aluminum, nickel, and lanthanum (Al—Ni—La), or an alloy containing silver such as an alloy of silver and copper, an alloy of silver, palladium, and copper (Ag—Pd—Cu, also referred to as APC), or an alloy of silver and magnesium can be used for the metal film. An alloy of silver and copper is preferable because of its high heat resistance.

The friction layer may be a multilayer film that includes two or more of the above-listed organic films, inorganic films, and metal films.

It is preferable to reduce the surface roughness of the friction layer, in which case friction force acting on the contact surface between the surface of the friction layer and the surface in contact with the friction layer can be reduced. Specifically, the arithmetic average roughness Ra of at least part of the surface of the friction layer is preferably less than or equal to 1 μm, and more preferably less than or equal to 0.5 μm. The arithmetic average roughness Ra of the friction layer can be determined by measurement using a stylus surface profiler, an atomic force microscope (AFM), or the like.

It is preferable that the friction layer be hard to rupture. For example, it is preferable to use as the friction layer a material achieving a coefficient of expansion right before rupturing of greater than or equal to 5%, more preferably greater than or equal to 10%, when subjected to a test in which tensile stress is applied to the material until its rupture.

Depending on circumstances, a cleavable material may be used as the friction layer such that the surface of the current collector is lubricated.

The positive electrode active material layer 102 and the negative electrode active material layer 106 each with a thickness of greater than or equal to 10 μm and less than or equal to 200 μm are preferably used. The positive electrode active material layer 102 and the negative electrode active material layer 106 contain at least an active material that can reversibly react with carrier ions such as lithium ions. The average diameter or diameter distribution of the active material particles can be controlled through crushing, granulation, and classification by an appropriate means. The average particle diameter of the active material is less than or equal to 500 nm, preferably greater than or equal to 50 nm and less than or equal to 500 nm.

As a positive electrode active material used for the positive electrode active material layer 102, a material into/from which lithium ions can be inserted and extracted can be used. For example, a lithium-containing material with an olivine crystal structure, a layered rock-salt crystal structure, or a spinel crystal structure can be used.

As an example of the lithium-containing material with an olivine crystal structure, a composite oxide represented by a general formula $LiMPO_4$ (M is one or more of Fe(II), Mn(II), Co(II), and Ni(II)) can be given. Typical examples of $LiMPO_4$ include lithium-containing complex phosphates such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$, ($a+b \leq 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e$ 1, $0<c<1$, $0<d<1$, and $0<e<1$), and $LiFe_fNi_gCo_hMn_iPO_4$ ($f+g+h+i \leq 1$, $0<f<1$, $0<g<1$, $0<h<1$, and $0<i<1$).

Examples of the lithium-containing material with a layered rock-salt crystal structure include $LiCoO_2$, $LiNiO_2$, $LiMnO_2$, $Li_2MnO_3$, a NiCo-based compound such as $LiNi_{0.8}Co_{0.2}O_2$ (general formula: $LiNi_xCo_{1-x}O_2$ ($0<x<1$)), a NiMn-based compound such as $LiNi_{0.5}Mn_{0.5}O_2$ (general formula: $LiNi_xMn_{1-x}O_2$ (0<x<1)), a NiMnCo-based compound such as $LiNi_{1/3}Mn_{1/3}Co_{1/3}O_2$ (also referred to as NMC, general formula: $LiNi_xMn_yCo_{1-x-y}O_2$ (x>0, y>0, x+y<1)), $Li(Ni_{0.8}Co_{0.15}Al_{0.05})O_2$, and $Li_2MnO_3$-$LiMO_2$ (M=Co, Ni, or Mn).

Examples of the lithium-containing material with a spinel crystal structure include lithium-manganese composite oxides such as $LiMn_2O_4$, $Li_{1+x}Mn_{2-x}O_4$ (0<x<2), $LiMn_{2-x}Al_xO_4$ (0<x<2), and $LiMn_{1.5}Ni_{0.5}O_4$.

It is preferable to add a small amount of lithium nickel oxide ($LiNiO_2$ or $LiNi_{1-x}M_xO_2$ (0<x<1, M=Co, Al, or the like)) to the lithium-manganese composite oxide with a spinel crystal structure (e.g., $LiMn_2O_4$), which contains manganese, in which case the dissolution of manganese and the decomposition of an electrolytic solution can be suppressed, for example.

A lithium-containing material represented by a general formula $Li_{(2-j)}MSiO_4$ (M is one or more of Fe(II), Mn(II), Co(II), and Ni(II), 0≤j≤2) can also be used as the positive electrode active material. Typical examples of $Li_{(2-j)}MSiO_4$ (general formula) are $Li_{(2-j)}FeSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

A nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used as the positive electrode active material. Examples of the nasicon compound include $Fe_2(MnO_4)_3$, $Fe_2(SO_4)_3$, and $Li_3Fe_2(PO_4)_3$. A compound represented by a general formula $Li_2MPO_4F$, $Li_2MP_2O_7$, or $Li_5MO_4$ (M=Fe or Mn), a perovskite fluoride such as $FeF_3$, a metal chalcogenide (a sulfide, a selenide, or a telluride) such as $TiS_2$ or $MoS_2$, a lithium-vanadium-containing composite oxide with an inverse spinel structure such as $LiMVO_4$, a vanadium oxide-based compound (such as $V_2O_5$, $V_6O_{13}$, or $LiV_3O_8$), a manganese oxide, an organic sulfur compound, or the like can be used as the positive electrode active material.

The particle size of the positive electrode active material is preferably, for example, greater than or equal to 5 nm and less than or equal to 100

A lithium-manganese composite oxide that is represented by a composition formula $Li_xMn_yM_zO_w$ can be used as the positive electrode active material. Here, the element M is preferably silicon, phosphorus, or a metal element other than lithium and manganese, and further preferably nickel. In addition, x/(y+z) is preferably larger than or equal to 0 and smaller than 2, z is larger than 0, and (y+z)/w is preferably larger than or equal to 0.26 and smaller than 0.5. Note that the lithium-manganese composite oxide is an oxide containing at least lithium and manganese, and may contain at least one selected from a group consisting of chromium, cobalt, aluminum, nickel, iron, magnesium, molybdenum, zinc, indium, gallium, copper, titanium, niobium, silicon, phosphorus, and the like. The lithium-manganese composite oxide preferably has a layered rock-salt crystal structure. The lithium-manganese composite oxide may have a layered rock-salt crystal structure and a spinel crystal structure. The average particle diameter of the lithium-manganese composite oxides is preferably greater than or equal to 5 nm and less than or equal to 50 μm, for example.

In the case where carrier ions are alkali metal ions other than lithium ions, or alkaline-earth metal ions, the positive electrode active material may contain, instead of lithium in the lithium compound or the lithium-manganese composite oxide, an alkali metal (e.g., sodium or potassium) or an alkaline-earth metal (e.g., calcium, strontium, barium, beryllium, or magnesium).

As a negative electrode active material included in the negative electrode active material layer 106, a material which enables charge-discharge reaction by alloying and dealloying reaction with lithium can be used.

As an example of the material that enables charge-discharge reactions by an alloying reaction and a dealloying reaction with lithium, a carbon-based material can be given. Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (higher than or equal to 0.1 V and lower than or equal to 0.3 V vs. $Li/Li^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

As the material that enables charge-discharge reactions by an alloying reaction and a dealloying reaction with lithium, a material containing at least one of Ga, Si, Al, Ge, Sn, Pb, Sb, Bi, Ag, Zn, Cd, In, and the like can also be given, for example. Such elements have higher capacity than carbon. In particular, silicon has a high theoretical capacity of 4200 mAh/g. Examples of the material containing such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, and $SbSn$.

As the negative electrode active material, an oxide such as SiO, SnO, $SnO_2$, titanium dioxide, a lithium titanium oxide, a lithium-graphite intercalation compound, niobium pentoxide, tungsten oxide, or molybdenum oxide can be used.

Alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case where a material containing lithium ions is used as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material. For example, a transition metal oxide which is not alloyed with lithium, such as cobalt oxide, nickel oxide, or iron oxide may be used as the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The positive electrode active material layer 102 and the negative electrode active material layer 106 may further contain a binder for increasing adhesion of active materials, a conductive additive for increasing the conductivity of the active materials, and the like in addition to the above-described active material.

Examples of the binder include polyimide, polytetrafluoroethylene, polyvinyl chloride, an ethylene-propylene-diene polymer, styrene-butadiene rubber, acrylonitrile-butadiene rubber, fluorine rubber, polyvinyl acetate, polymethyl methacrylate, polyethylene, and nitrocellulose, in addition to polyvinylidene fluoride (PVdF) which is a typical example.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (acetylene black (AB)) and graphene. Alternatively, metal powder or metal fibers of copper, nickel, aluminum, silver, gold, or the like, a conductive ceramic material, or the like can be used.

Next, a separator will be described. A separator is provided between a positive electrode and a negative electrode to prevent them from touching each other. The separator includes pores so as not to prevent the transfer of ions between the positive electrode and the negative electrode. The state of the separator is preferably unlikely to change with a usage environment of the power storage device, even in a high-temperature environment. The change in state is acceptable as long as the positive electrode and the negative electrode are not in contact with each other.

As the separator, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used. The thickness of the separator is preferably greater than or equal to 10 μm and less than or equal to 70 μm.

The separator is preferably processed into a bag-like shape to enclose one of the positive electrode 111 and the negative electrode 115. For example, the separator 108 is folded in half such that the negative electrode 115 is sandwiched, and sealed in a region outside the region overlapping with the negative electrode 115; thus, the negative electrode 115 can be reliably supported inside the separator 108. Then, the negative electrodes 115 surrounded by the separators 108 and the positive electrodes 115 are alternately stacked and provided so as to be surrounded by the exterior body 110, whereby the secondary battery 100 can be formed.

The electrolytic solution 109 will be described. As the electrolytic solution 109, at least a material in which carrier ions can be transferred is used. In the case where carrier ions are lithium ions, for example, a material containing lithium ions is used. Typical examples of the material in which carrier ions can be transferred include lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, $LiN(C_2F_5SO_2)_2$, and the like. One of these materials may be used alone or two or more of them may be used in an appropriate combination and in an appropriate ratio.

In the case where carrier ions are alkali metal ions other than lithium ions, or alkaline-earth metal ions, a compound containing carriers such as an alkali metal (e.g., sodium and potassium) or an alkaline-earth metal (e.g., calcium, strontium, barium, beryllium, and magnesium) instead of lithium of the lithium compound, the lithium-containing complex phosphate, or the lithium-containing complex silicate may be used as the positive electrode active material.

As the solvent of the electrolytic solution 109, a material in which carrier ions can be transferred is used. As the solvent, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Polymer may be added to the electrolytic solution 109 so that the electrolytic solution 109 becomes gelled. The electrolytic solution 109 being gelled has higher safety against liquid leakage or the like. Furthermore, a secondary battery can be thinner and more lightweight. As the polymer capable of making the electrolytic solution 109 gelled, a polyalkylene oxide-based polymer, a polyacrylonitrile-based polymer, a polyvinylidene fluoride-based polymer, a polyacrylate based polymer, or a polymethacrylate-based polymer can be used. Note that in this specification and the like, the term polyvinylidene fluoride-based polymer, for example, refers to a polymer containing polyvinylidene fluoride, and includes a poly(vinylidene fluoride-hexafluoropropylene) copolymer and the like in its category. The formed polymer may be porous.

The above polymer can be qualitatively analyzed using a Fourier transform infrared (FT-IR) spectrometer or the like. For example, the polyvinylidene fluoride-based polymer has an absorption peak showing a C—F bond in a spectrum obtained by the FT-IR spectrometer. The polyacrylonitrile-based polymer has an absorption peak showing a C≡N bond in a spectrum obtained by the FT-IR spectrometer.

Alternatively, the use of one or more ionic liquids (room temperature molten salts) which are less likely to burn and volatilize as the solvent of the electrolytic solution 109 can prevent the secondary battery from exploding or catching fire even when the secondary battery internally shorts out or the internal temperature increases due to overcharging or the like. An ionic liquid includes a cation and an anion, specifically, an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, tetrafluoroborate, perfluoroalkylborate, hexafluorophosphate, and perfluoroalkylphosphate.

The electrolytic solution 109 is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

An additive agent such as vinylene carbonate, propane sultone (PS), tert-butylbenzene (TBB), fluoroethylene carbonate (FEC), or lithium bis(oxalato)borate (LiBOB) may be added to the electrolytic solution 109. The concentration of such an additive agent in the whole solvent is, for example, higher than or equal to 0.1 wt % and lower than or equal to 5 wt %.

As the electrolytic solution 109, a solid electrolyte containing an inorganic material such as a sulfide-based inorganic material or an oxide-based inorganic material may be used. In the case where the solid electrolyte is used, a separator or a spacer is not necessary. Furthermore, in the case where a solid electrolyte or a gelled electrolyte is used, the battery can be entirely solidified or gelled; therefore, there is no possibility of liquid leakage and thus the safety of the battery is dramatically increased.

As the exterior body 110, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film can be used. In that case, the insulating synthetic resin film preferably covers the surface of the secondary battery 100. With such a three-layer structure, permeation of an electrolytic solution and a gas can be blocked and an insulating property and resistance to the electrolytic solution can be obtained.

With the above-described structure, a small power storage device that can be easily mass-produced and that can be curved is provided. The power storage device with the above-described structure can be placed along a curved shape of an electronic device such as a wearable device, or bent to be disposed in a limited space, thereby capable of being provided in a variety of electronic devices such as a wearable device. Thus, the power storage device with the above-described structure contributes to the wide use of wearable devices with a variety of shapes and economic development which is encouraged by the wide use of the wearable devices.

In this embodiment, one embodiment of the present invention has been described. Other embodiments of the present invention are described in other embodiments. Note that one embodiment of the present invention is not limited thereto. That is, various embodiments of the invention are described in this embodiment and the other embodiments, and one embodiment of the present invention is not limited to a particular embodiment. For example, although an example of use in a secondary battery or a lithium-ion secondary battery is described in this embodiment, one embodiment of the present invention is not limited thereto. Depending on circumstances or conditions, application of one embodiment of the present invention to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a zinc air battery, a lithium air battery, a primary battery, a capacitor, an ultracapacitor, a supercapacitor, and a lithium ion capacitor is also possible. Alternatively, for example, depending on circumstances or conditions, one embodiment of the present invention is not necessarily applied to a secondary battery or a lithium-ion secondary battery. Although an example in which one embodiment of the present invention is applied to a curved power storage device, a flexible power storage device, or a power storage device which can be deformed is described, one embodiment of the present invention is not limited thereto. Depending on circumstances or conditions, one embodiment of the present invention may be applied to a power storage device that can have any of a variety of shapes or a power storage device that can have any level of hardness. Depending on circumstances or conditions, one embodiment of the present invention may be applied to a power storage device that is not curved and has a flat plate shape or a power storage device that has a cylindrical shape. Depending on circumstances or conditions, one embodiment of the present invention may be applied to a power storage device which does not have flexibility and is not able to be deformed.

This embodiment can be implemented in appropriate combination with any of the structures described in the other embodiments.

Embodiment 2

In this embodiment, a method for fabricating the secondary battery 100 described in Embodiment 1 is described with reference to FIGS. 24A to 24D, FIGS. 25A to 25C, FIGS. 26A to 26C, and FIGS. 27A and 27B.

1. Fabrication of Electrode

Figure 24A:
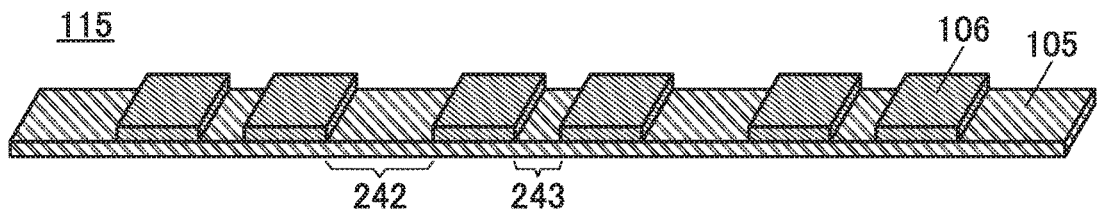
FIGS. 24A to 24D illustrate a method for fabricating a power storage device.

First, paste containing at least a negative electrode active material and a solvent is applied to one surface of the negative electrode current collector 105 with a belt shape. At this time, as shown in FIG. 24A, the paste is applied to the negative electrode current collector 105 with a relatively large gap 242 and a relatively narrow gap 243 which are alternately arranged. After that, the solvent contained in the paste is heated to volatilize, so that the negative electrode active material layer 106 is formed on the one surface of the negative electrode current collector 105.

Figure 24B:
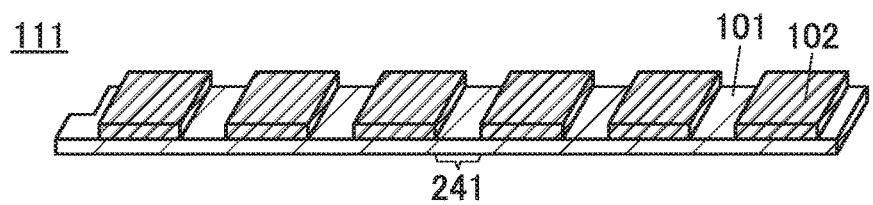

Then, paste containing at least a positive electrode active material and a solvent is applied to one surface of the positive electrode current collector 101 with a belt shape. At this time, as shown in FIG. 24B, the paste is applied to the positive electrode current collector 101 with a gap 241. After that, the solvent contained in the paste is heated to volatilize, so that the positive electrode active material layer 102 is formed on the one surface of the positive electrode current collector 101.

2. Formation of Stack

Figure 24C:
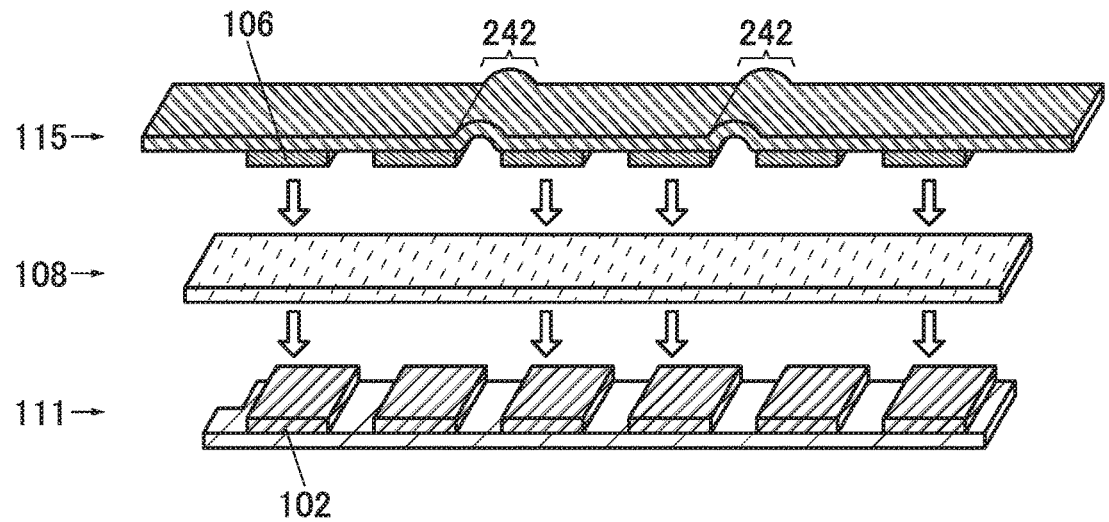
Figure 24D:
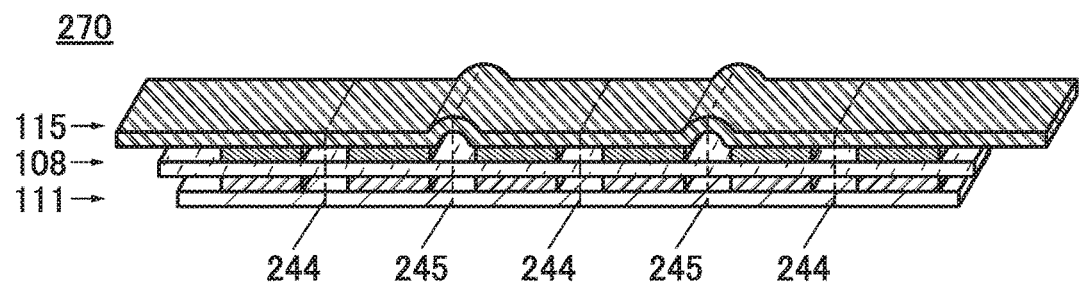

The positive electrode 111, the separator 108, and the negative electrode 115 are stacked to form a stack 270. As shown in FIG. 24C, a portion of the relatively large gap 242 where the negative electrode active material layer 106 is not formed on the negative electrode current collector 105, is slackened so that the positive electrode active material layer 102 and the negative electrode active material layer 106 overlap to face each other.

Note that the separator 108 may have a bag-like shape so that the positive electrode 111 is enclosed by the separator 108, in which case, a short-circuit caused by contact between the positive electrode 111 and the negative electrode 115 can be prevented more surely.

For example, the positive electrode 111 is sandwiched between the separator 108 folded in two and the outer edges of the separator 108 are bonded to form the bag-like separator 108. The bonding of the outer edges of the separator 108 can be performed with the use of an adhesive or the like, by ultrasonic welding, or by heating.

Note that although an example of folding the separator 108 is illustrated, one embodiment of the present invention is not limited thereto. For example, the positive electrode 111 may be sandwiched between two separators. In that case, a bonding portion may be formed to surround almost all of the four sides of the positive electrode 111.

Figure 25A:
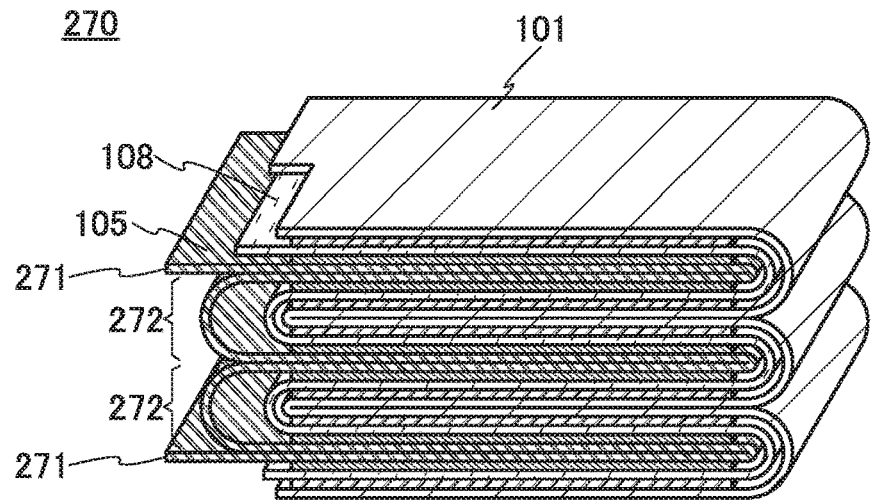
FIGS. 25A to 25C illustrate a method for fabricating a power storage device.

Next, the stack 270 containing the positive electrode 111, the separator 108, and the negative electrode 115 is bent in zigzag. The positive electrode current collector 101, the negative electrode current collector 105, and the separator 108 can be bent in zigzag as shown in FIG. 25A by mountain-folding and valley-folding the stack 270 along a dotted line 244 and a dotted line 245 in FIG. 24D, respectively. At this time, the portion of the relatively large gap 242 where the negative electrode active material layer 106 is not formed on the negative electrode current collector 105 serves as a bent portion 272 with slack by being bent.

As described above, the belt-shaped positive electrode 111 and the belt-shaped negative electrode 115 are stacked and bent in zigzag, whereby the stack 270 can be easily downsized. Although it is difficult to form the small stack 270 by stacking a small strip-shaped positive electrode 111 and a small strip-shaped negative electrode 115, the stack 270 that is required to be small can be easily formed by the above-described method in which the belt-shaped positive electrode 111 and the belt-shaped negative electrode 115 are bent in zigzag.

3. Installation of Lead

Figure 25B:
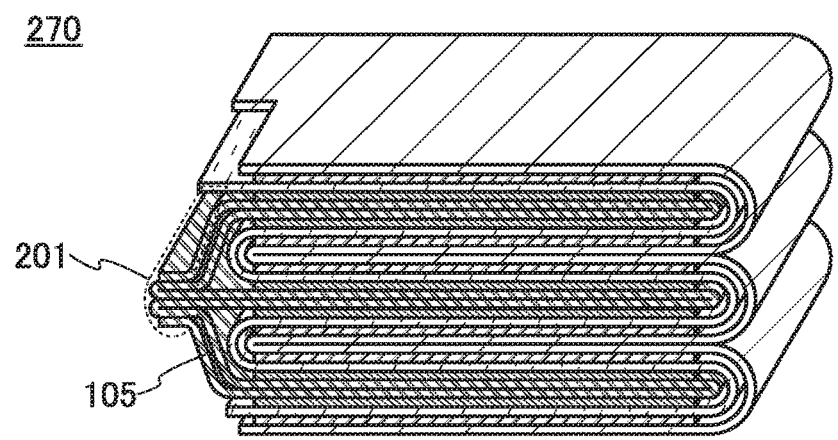
Figure 25C:
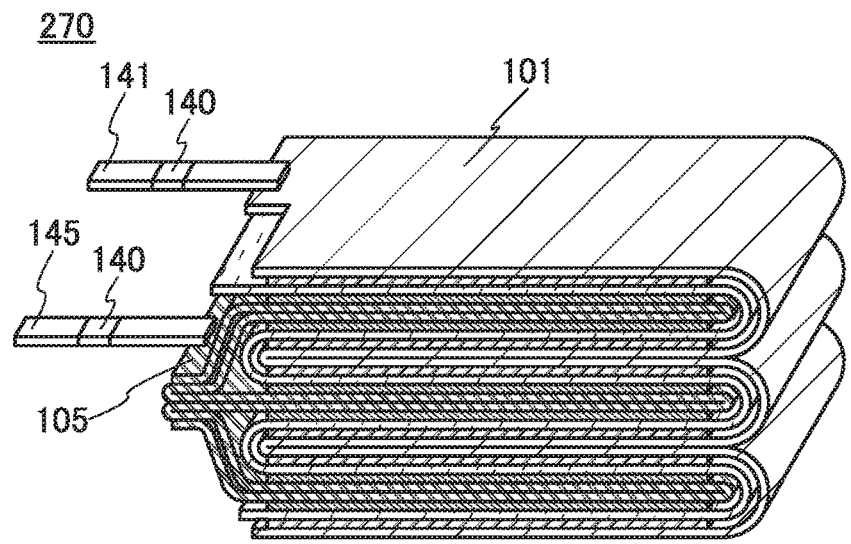

As shown in FIGS. 25A and 25B, a portion around an end portion 271 of the negative electrode current collector 105 and the bent portion 272 with slack are stacked and connected by irradiation with ultrasonic waves with pressure applied (ultrasonic welding), so that the welded portion 201 is formed. Furthermore, as shown in FIG. 25C, the negative electrode lead 145 including the sealing layer 140 is welded to the welded portion 201. The step of welding the negative electrode lead 145 to the welded portion 201 may be performed at the same time as the formation of the welded portion 201.

Next, as shown in FIG. 25C, the positive electrode tab of the positive electrode current collector 101 and the positive electrode lead 141 including the sealing layer 140 are electrically connected by irradiation with ultrasonic waves with pressure applied.

The lead electrode is likely to be cracked or cut by stress due to external force applied after manufacture of the secondary battery 100.

When subjected to ultrasonic welding, the positive electrode lead 141 and the positive electrode tab of the positive electrode current collector 101 are placed between bonding dies provided with projections, whereby a bent portion can be formed in the positive electrode tab. This bent portion can relieve stress due to external force applied after fabrication of the secondary battery 100. Therefore, the secondary battery 100 can have high reliability.

The bent portion is not necessarily formed in the positive electrode tab. The positive electrode current collector may be formed using a high-strength material such as stainless steel to a thickness of 10 μm or less, in order to easily relieve stress due to external force applied after fabrication of a secondary battery.

4. Preparation of Exterior Body

A film used as an exterior body is bent along a dotted line (see FIG. 26A), and thermocompression bonding is performed along one side of the folded exterior body. A portion where thermocompression bonding is performed along one side of the exterior body 110 is shown as a bonding portion 110a in FIG. 26B.

5. Sealing of Electrolytic Solution

The stack 270 to which the leads are connected is covered with the exterior body 110 (see FIG. 26C). Then, one side of the exterior body 110, which overlaps with the sealing layer 140 included in the positive electrode lead 141 and the sealing layer 140 included in the negative electrode lead 145, is thermally welded (see FIG. 27A).

Figure 27A:
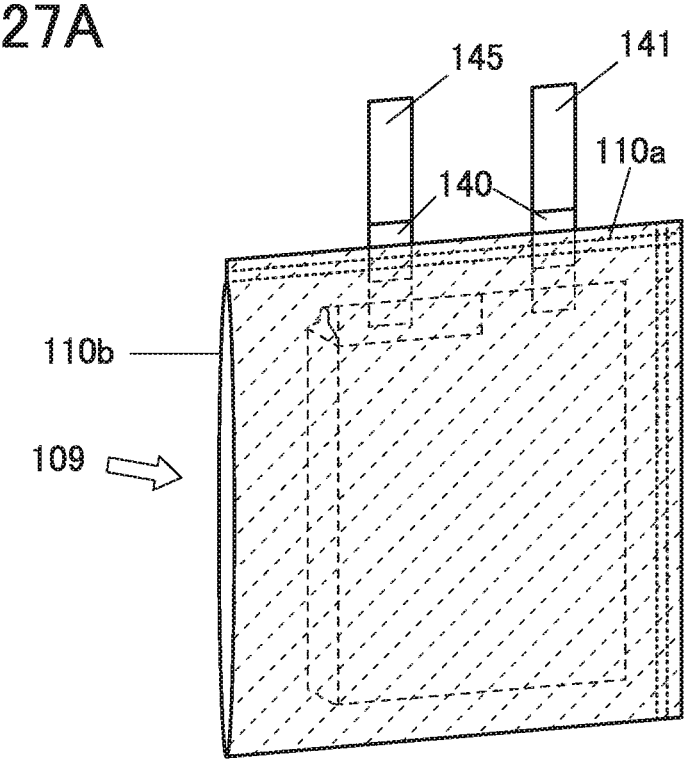
FIGS. 27A and 27B illustrate a method for fabricating a power storage device.
Figure 27B:
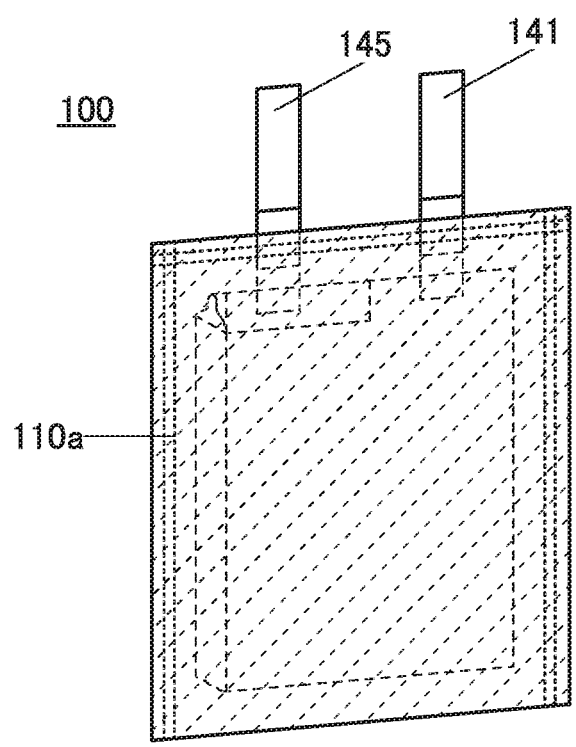

Then, an electrolytic solution 109 is injected from an unsealed side 110b of the exterior body 110 shown in FIG. 27A into a region covered with the exterior body 110. Then, the remaining open side of the exterior body 110 is sealed under vacuum, heat, and pressure, whereby the secondary battery 100 can be formed (see FIG. 27B). This process is performed in an environment from which oxygen and moisture are eliminated, for example, in a glove box. The evacuation to a vacuum may be performed with a vacuum sealer, a liquid pouring sealer, or the like. Heating and pressing can be performed by setting the exterior body 110 between two heatable bars provided in the sealer. An example of the conditions is as follows: the degree of vacuum is 60 kPa, the heating temperature is 190° C., the pressure is 0.1 MPa, and the time is three seconds.

6. Modification Example

Here, modification examples of the fabrication method of an electrode, the fabrication method of a stack, and the installation of a lead will be described.

Figure 28A:
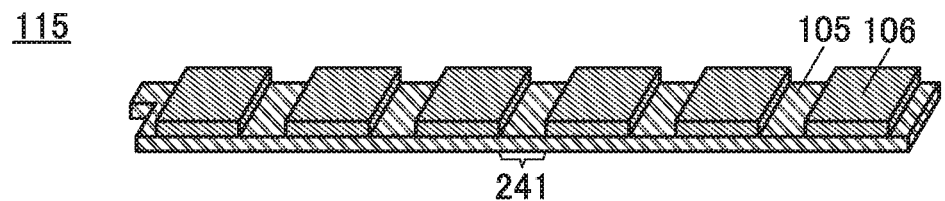
FIGS. 28A to 28D illustrate a method for fabricating a power storage device.

First, paste containing at least a negative electrode active material and a solvent is applied to one surface of the belt-shaped negative electrode current collector 105. At this time, as shown in FIG. 28A, the paste is applied to the negative electrode current collector 105 with a gap 241. After that, the solvent contained in the paste is heated to volatilize, so that the negative electrode active material layer 106 is formed on the surface of the negative electrode current collector 105. In such a manner, the negative electrode 115 is formed.

Figure 28B:
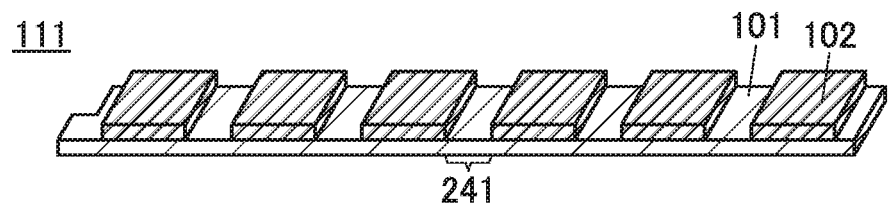

In a manner similar to that of the negative electrode 115, paste containing at least the positive electrode active material and a solvent is applied to one surface of the strip-shaped positive electrode current collector 101, whereby the positive electrode 111 is formed (see FIG. 28B).

Figure 28C:
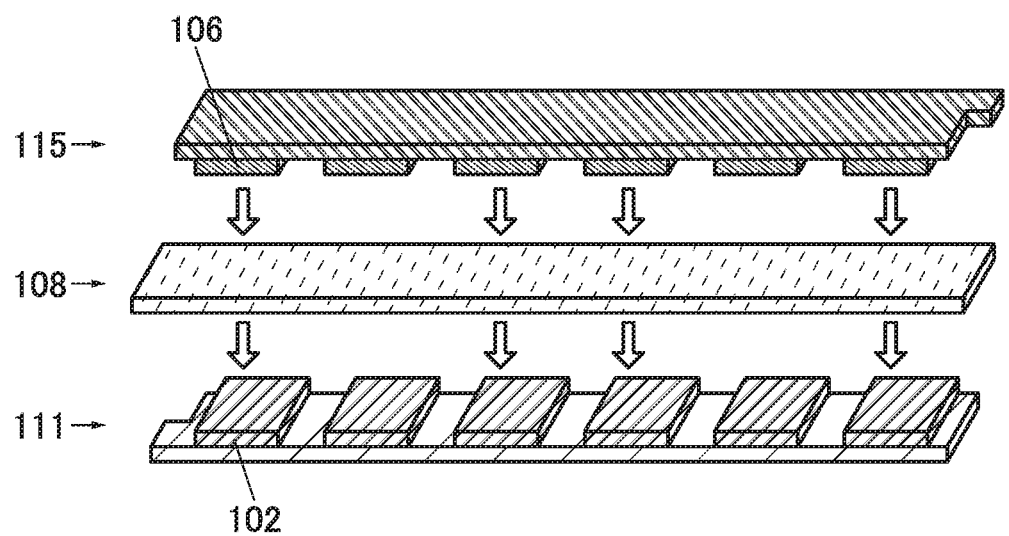

Next, the positive electrode 111, the separator 108, and the negative electrode 115 are stacked to form a stack 270. As shown in FIG. 28C, the positive electrode active material layer 102 and the negative electrode active material layer 106 face each other.

Figure 28D:
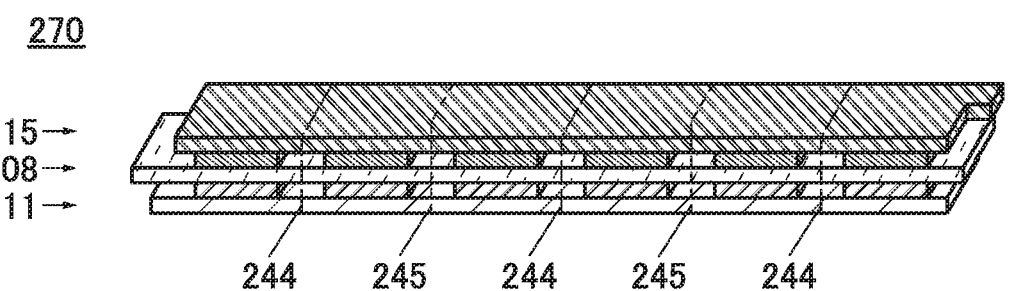
Figure 29A:
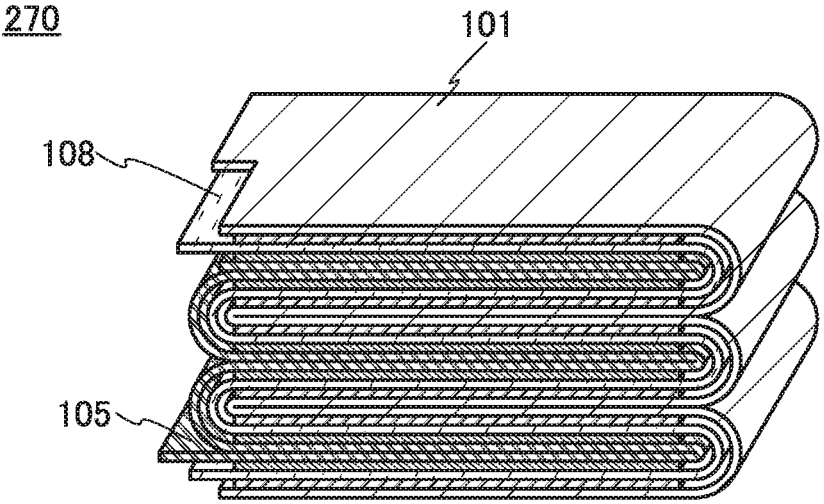
FIGS. 29A and 29B illustrate a method for fabricating a power storage device.

Next, the stack 270 including the positive electrode 111, the separator 108, and the negative electrode 115 is bent in zigzag. The positive electrode current collector 101, the negative electrode current collector 105, and the separator 108 can be collectively bent in zigzag as shown in FIG. 29A by valley-folding and mountain-folding the stack 270 along the dotted line 244 and the dotted line 245 in FIG. 28D, respectively.

Figure 29B:
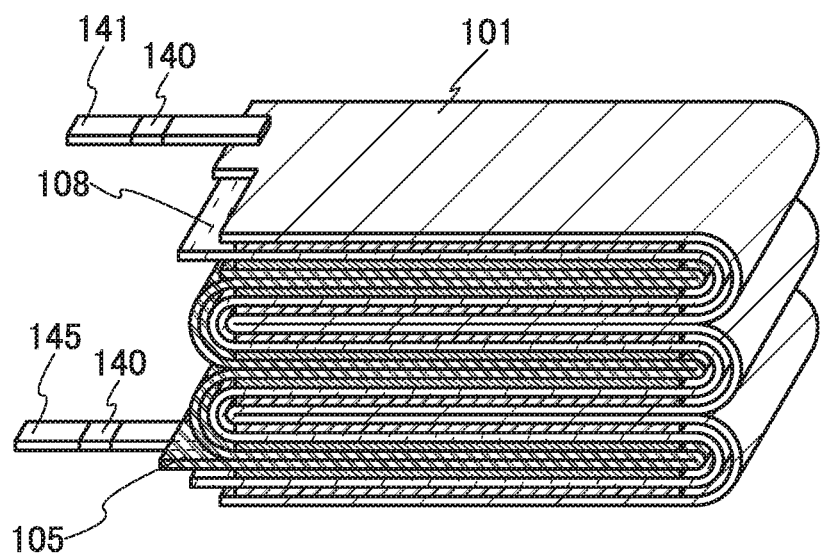

Next, as shown in FIG. 29B, the positive electrode tab of the positive electrode current collector 101 and the positive electrode lead 141 including the sealing layer 140 are electrically connected by irradiation with ultrasonic waves with pressure applied.

In a manner similar to that of the positive electrode lead 141, the negative electrode lead 145 including the sealing layer 140 is connected to the negative electrode tab of the negative electrode current collector 105.

The stack 270 including the positive electrode lead 141 and the negative electrode lead 145 may be formed as described in this modification example.

This embodiment can be implemented in appropriate combination with any of the structures described in the other embodiments.

Embodiment 3

In this embodiment, a structure and a fabrication method of the exterior body 110 which can be applied to the power storage device of one embodiment of the present invention will be described with reference to FIGS. 30A to 30C, FIGS. 31A to 31D, FIGS. 32A to 32D, FIGS. 33A and 33B, and FIGS. 34A and 34B.

Figure 30A:
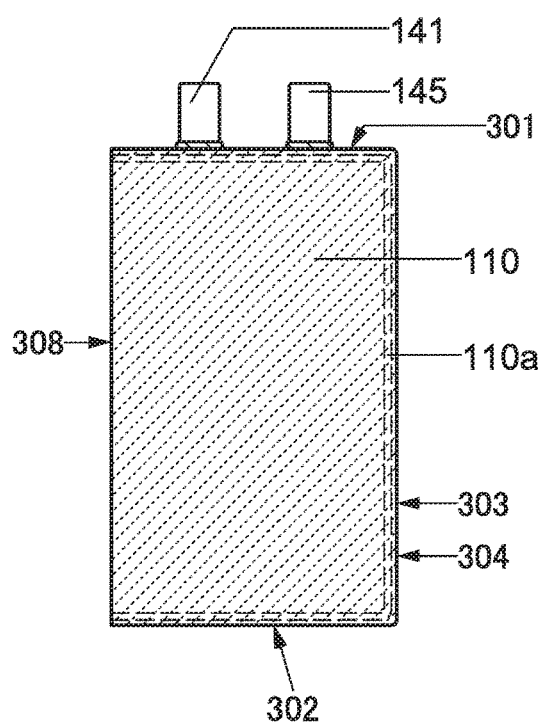
FIGS. 30A to 30D illustrate a power storage device.
Figure 30B:
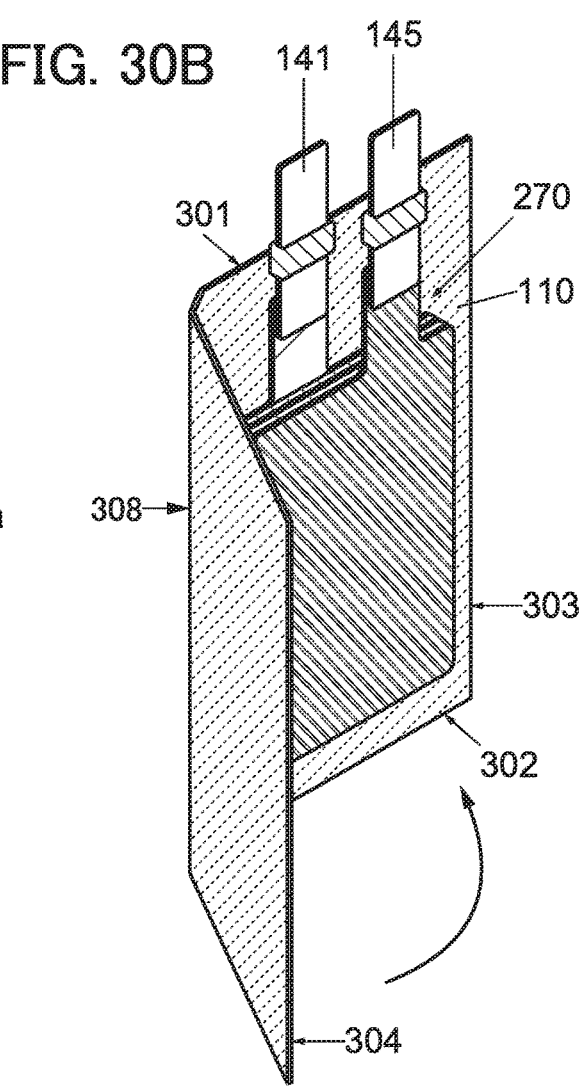
Figure 30C:
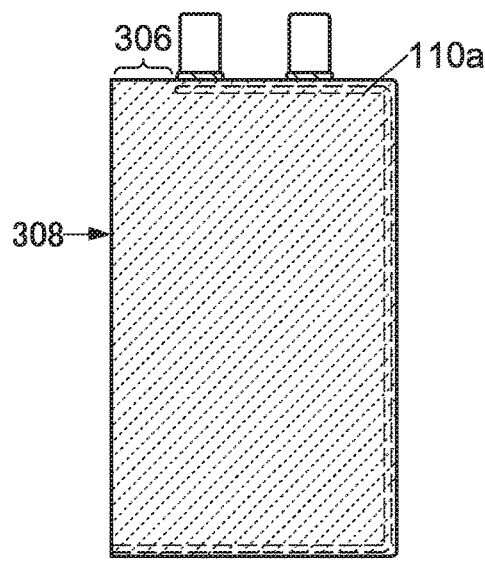
Figure 30D:
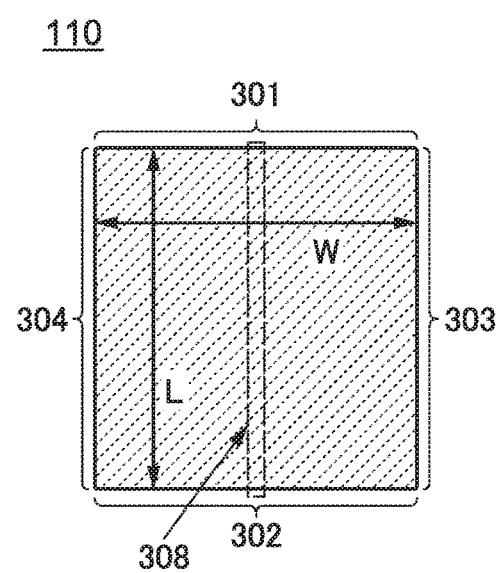

FIG. 30A is a front view of the secondary battery 100A including the exterior body 110. FIGS. 30B and 30C illustrate an example of a method for fabricating the secondary battery 100A. FIG. 30D is a development view of the exterior body 110.

The exterior body 110 has a rectangular shape including a side 301, a side 302, a side 303, and a side 304, and is folded along a bent portion 308, so that the sides 303 and 304 overlap one another. Furthermore, the bent portion 308 includes the sides 301 and 302, and the sides 302 and 302 overlap one another (FIG. 30A).

The stack 270 including the positive electrode 111, the separator 108, and the negative electrode 115 is placed in a region surrounded by the exterior body 110 including the bent portion 308. At this time, the stack 270 is placed so that the positive electrode lead 141 connected to the positive electrode 111 and the negative electrode lead 145 connected to the negative electrode 115 overlap the side 301 of the exterior body 110 (see FIG. 30B). Next, the outer edges of the exterior body 110 except an inlet 306 for introducing the electrolytic solution 109 are bonded by thermocompression bonding (see FIG. 30C). The thermocompression bonding portion in the outer edges of the exterior body 110 is illustrated as the bonding portion 110a.

After that, in a reduced-pressure atmosphere or an inert atmosphere, the electrolytic solution 109 is introduced to the region surrounded by the exterior body 110 through the inlet 306. Lastly, the inlet 306 is sealed by thermocompression bonding. Through the above steps, the secondary battery 100A can be fabricated (see FIG. 30A).

When the secondary battery 100A has an elongated shape, the exterior body 110 with the above-structure is preferably used because the secondary battery 100A can be downsized. Specifically, when the length of the side 301 of the rectangular exterior body 110 is denoted by W, the length of each of the sides 303 and 304 is denoted by L, and the relation of L≥W is satisfied, the structure of the exterior body 110 included in the secondary battery 100A shown in FIG. 30A is preferably employed. Accordingly, the proportion of the bonding portion 110a in the secondary battery 100A can be reduced. Thus, the secondary battery 100A can be downsized.

In the case where the size of the secondary battery is specified, the structure of the secondary battery 100A is preferably employed because the capacity of the secondary battery 100A is increased. More specifically, when the secondary battery 100A is formed using the exterior body 110 with L W, the proportion of the bonding portion 110a in the secondary battery 100A can be reduced. Thus, the positive electrode 111 and the negative electrode 115 can be made large, whereby the capacity of the secondary battery 100A can be increased.

Figure 33A:
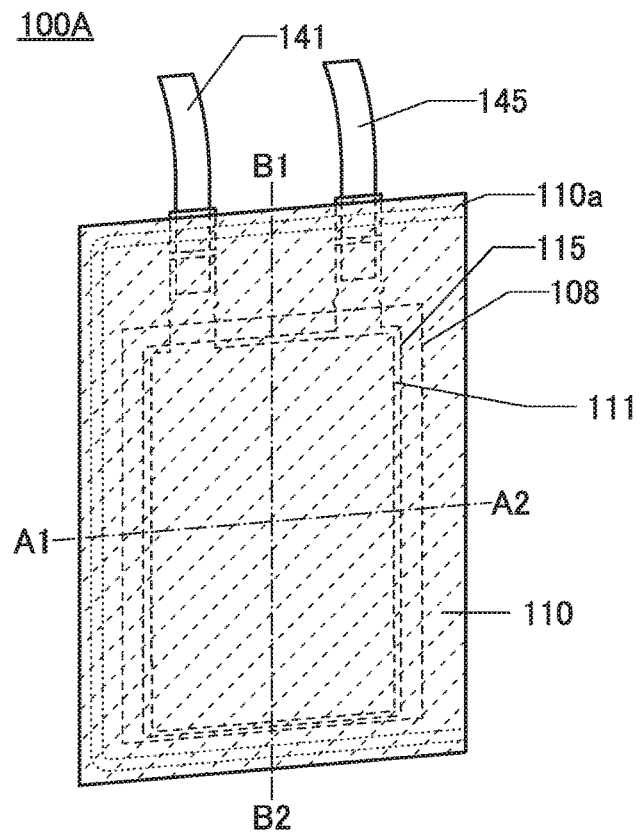
FIGS. 33A and 33B illustrate a power storage device.
Figure 33B:
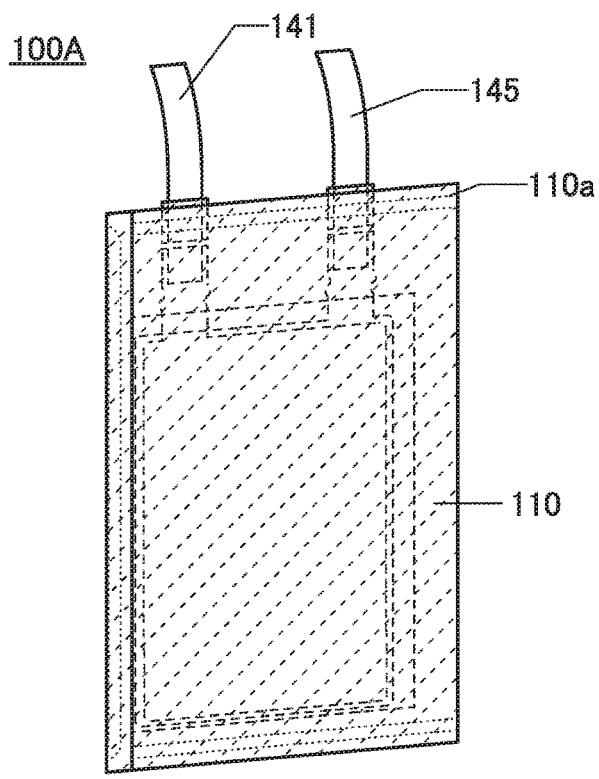

FIGS. 33A and 33B show external views of the secondary battery 100A.

As shown in FIG. 33B, the secondary battery 100A may be further downsized by folding the bonding portion 110a of the exterior body 110.

Other examples of the exterior body 110 will be described below.

Figure 31A:
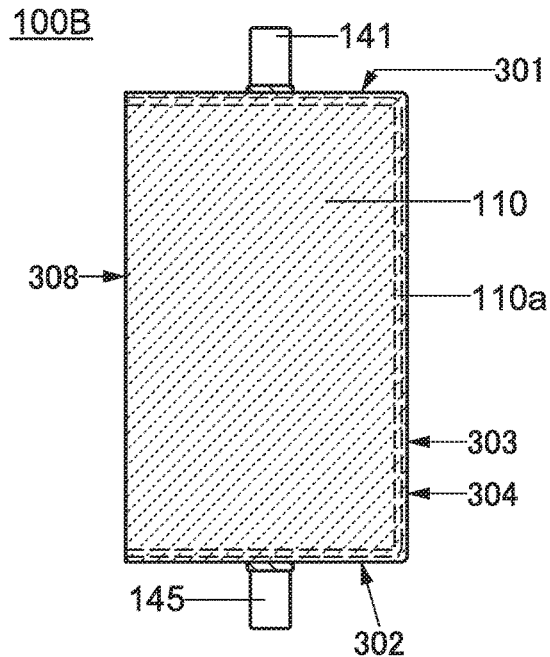
FIGS. 31A to 31D illustrate a power storage device.
Figure 31B:
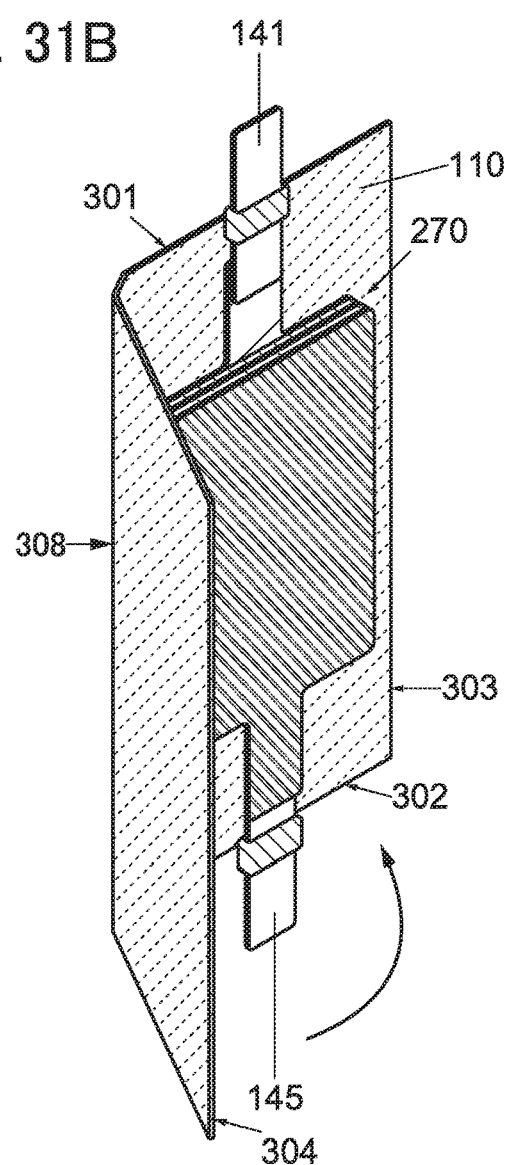
Figure 31C:
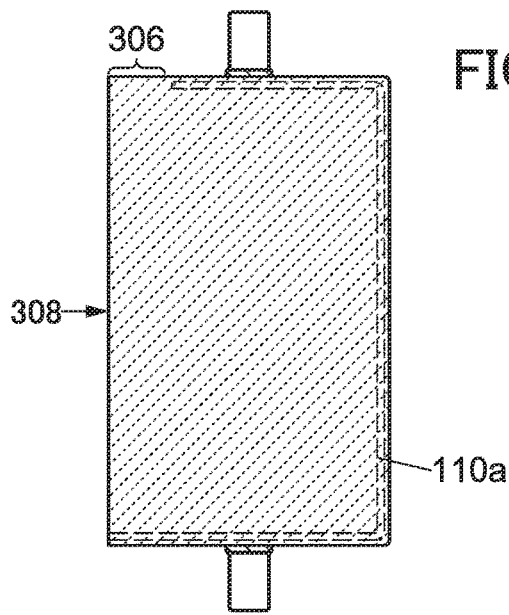
Figure 31D:
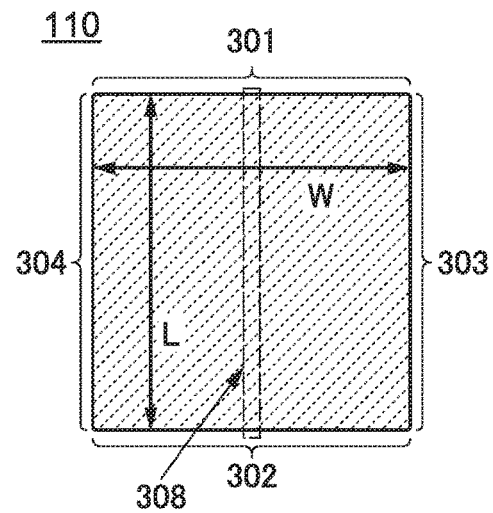

FIG. 31A shows a front view of a secondary battery 100B including the exterior body 110. FIGS. 31B and 31C illustrate an example of a method for fabricating the secondary battery 100B. As in the exterior body 110 included in the secondary battery 100A, the exterior body 110 in the secondary battery 100B has a rectangular shape including the side 301, the side 302, the side 303, and the side 304, and is folded along the bent portion 308, so that the sides 303 and 304 overlap one another. Furthermore, the bent portion 308 includes the sides 301 and 302, and the sides 302 and 302 overlap one another.

The stack 270 including the positive electrode 111, the separator 108, and the negative electrode 115 is placed in a region surrounded by the exterior body 110 including the bent portion 308. At this time, the positive electrode lead 141 is placed to overlap the side 301 of the exterior body 110, and the negative electrode lead 145 is placed to overlap the side 302 of the exterior body 110.

The following manufacturing steps are similar to the steps of the secondary battery 100A. In this manner, the secondary battery 100B can be fabricated.

FIG. 32A is a front view of a secondary battery 100C including the exterior body 110. FIGS. 32B and 32C illustrate an example of a method for fabricating the secondary battery 100C. In the secondary battery 100C, the exterior body 110 has two openings and a tube shape.

After the positive electrode 111, the separator 108, and the negative electrode 115 are placed inside the tube-shaped exterior body 110, the openings of the tube-shaped exterior body 110 except the inlet 306 for introducing the electrolytic solution 109 to part of one of the openings are sealed by thermocompression bonding (see FIG. 32C).

The secondary battery 100C can be fabricated through the subsequent steps similar to those described in fabricating the secondary battery 100A and the secondary battery 100B.

When the secondary battery 100 has an elongated shape, the exterior body 110 included in the secondary battery 100A, the secondary battery 100B, or the secondary battery 100C is preferably used because the capacity of the secondary battery 100 per volume can be increased.

Furthermore, in the secondary battery 100 including the positive electrode current collector 101 or the negative electrode current collector 105 which is bent in zigzag described in Embodiments 1 and 2, the use of the exterior body 110 included in the secondary battery 100A, the secondary battery 100B, or the secondary battery 100C is further preferable because the secondary battery can be easily bent and have high capacity in a small size.

Note that the positive electrode current collector 101 and the negative electrode current collector 105 do not necessarily have a bent portion. The positive electrode current collector 101 and the negative electrode current collector 105 each may have a strip shape or a flat plate shape. Alternatively, the belt-shaped positive electrode 111, the belt-shaped negative electrode 115, and the separator 108 may be wound.

Figure 34A:
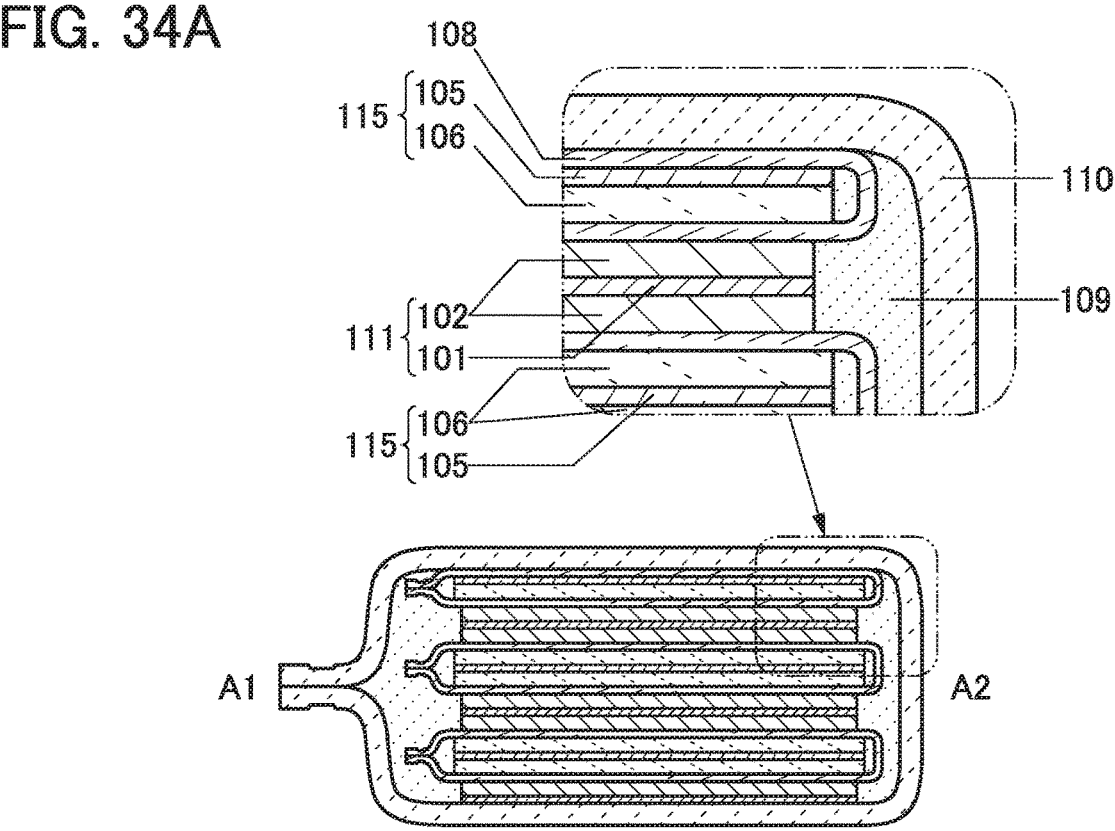
FIGS. 34A and 34B illustrate a power storage device.
Figure 34B:
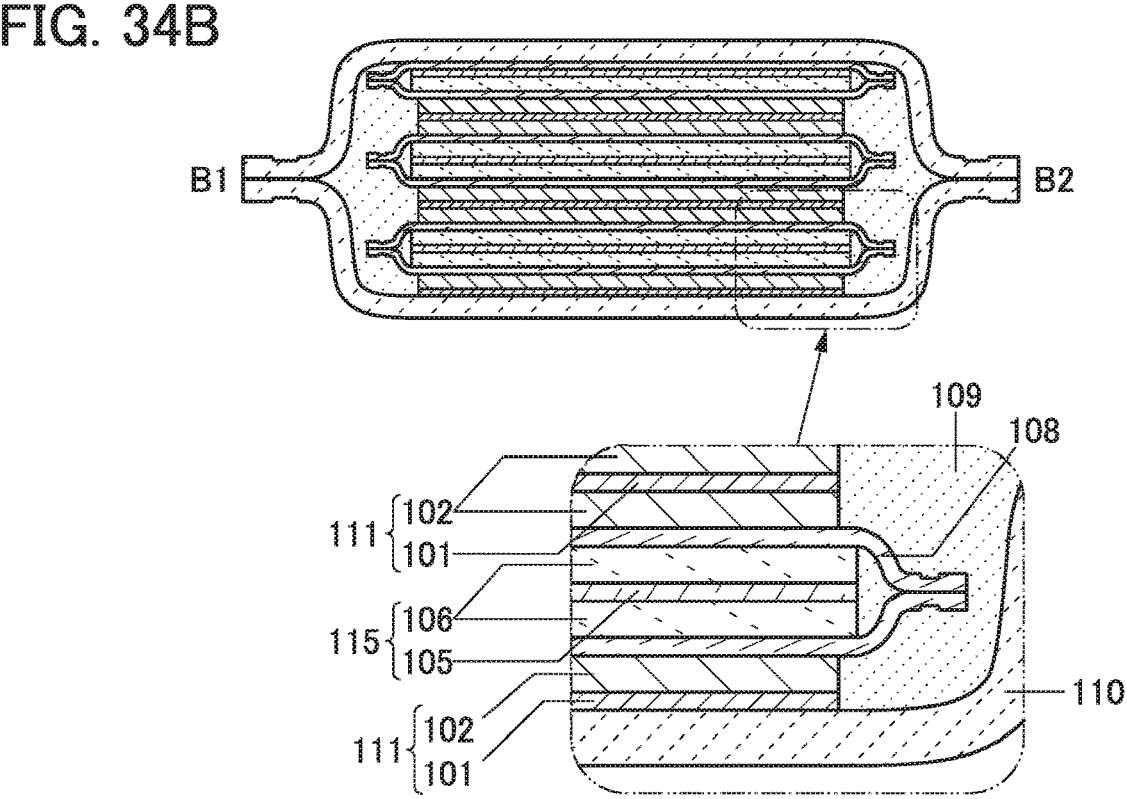

As an example of the secondary battery 100 including the strip-shaped positive electrode 101 and the strip-shaped negative electrode 105, FIGS. 34A and 34B show cross-sectional views along the dashed-dotted lines A1-A2 and B1-B2 of the secondary battery 100, respectively, in FIG. 33A.

The secondary battery 100A includes the positive electrode 111 with a flat plate shape, the negative electrode 115 with a flat plate shape, the separator 108, the electrolytic solution 109, the exterior body 110, the positive electrode lead 141, and the negative electrode lead 145. The separator 108 is provided between the positive electrode 111 and the negative electrode 115 that are placed in a region surrounded by the exterior body 110. The electrolytic solution 109 is provided in the region surrounded by the exterior body 110. The positive electrode 111 includes the positive electrode current collector 101 and the positive electrode active material layer 102. The negative electrode 115 includes the negative electrode current collector 105 and the negative electrode active material layer 106.

The lead electrodes of the secondary battery of one embodiment of the present invention can be freely positioned as described above; therefore, the degree of freedom in design is high. Accordingly, a product including the secondary battery of one embodiment of the present invention can have a high degree of freedom in design. Furthermore, a yield of products each including the secondary battery of one embodiment of the present invention can be increased.

This embodiment can be implemented in appropriate combination with any of the structures described in the other embodiments.

Embodiment 4

In this embodiment, an electronic device in which the power storage device of one embodiment of the present invention can be provided is described with reference to FIGS. 35A and 35B. The secondary battery 100 is used as an example of the power storage device.

The secondary battery 100 of one embodiment of the present invention is suitable for a wearable device because the secondary battery 100 is flexible.

Figure 35A:
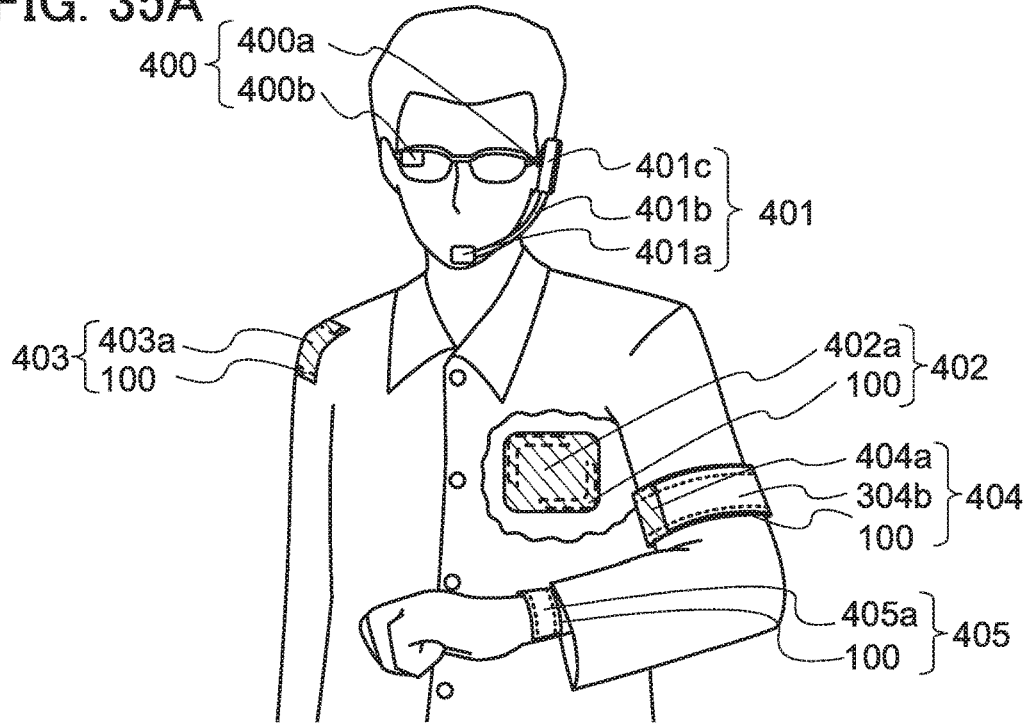
FIGS. 35A and 35B illustrate electronic devices.
Figure 35B:
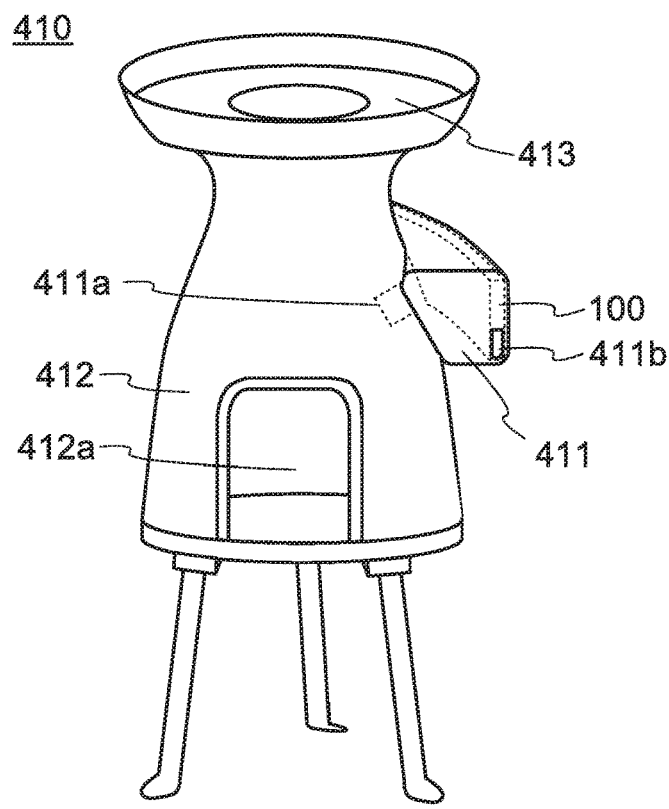

For example, the secondary battery 100 can be provided in a glasses-type device 400 illustrated in FIG. 35A. The glasses-type device 400 includes a frame 400a and a display part 400b. The secondary battery is provided in a temple of the frame 400a having a curved shape, whereby the glasses-type device 400 can have a well-balanced weight and can be used continuously for a long time.

The secondary battery 100 can be provided in a headset-type device 401. The headset-type device 401 includes at least a microphone part 401a, a flexible pipe 401b, and an earphone part 401c. The plurality of secondary batteries 100 can be provided in the flexible pipe 401b and the earphone part 401c.

Furthermore, the secondary battery 100 can be provided in a device 402 that can be attached directly to a body. The plurality of secondary batteries 100 are provided in a thin flexible housing 402a of the device 402.

Furthermore, the secondary battery 100 can be provided in a device 403 that can be attached to clothes. The plurality of the secondary batteries 100 are provided in a thin flexible housing 403a of the device 403.

Furthermore, the secondary battery 100 can be provided in an armband device 404. In the armband device 404, a display part 404b is provided over a housing 404a and the plurality of secondary batteries 100 can be provided in the housing 404a that has a curved portion.

Furthermore, the secondary battery 100 can be provided in a watch-type device 405. The watch-type device 405 includes a display part 405a, and the plurality of secondary batteries 100 can be provided in the watch-type device 405.

Since the secondary battery 100 of one embodiment of the present invention is bendable, it can be provided with high space efficiency in any of a variety of electronic devices. For example, in a stove 410 illustrated in FIG. 35B, a module 411 is attached to a main body 412. The module 411 includes the secondary battery 100, a motor, a fan, an air outlet 411a, and a thermoelectric generation device. In the stove 410, after a fuel is injected through an opening 412a and ignited, outside air can be sent through the air outlet 411a to the inside of the stove 410 by rotating the motor and the fan which are included in the module 411 using power of the secondary battery 100. In this manner, the stove 410 can have strong heating power because outside air can be taken into the inside of the stove 410 efficiently. In addition, cooking can be performed on an upper grill 413 with thermal energy generated by the combustion of fuel. The thermal energy is converted into power with the thermoelectric generation device of the module 411, and the secondary battery 100 is charged with the power. The power charged into the secondary battery 100 can be output through an external terminal 411b.

This embodiment can be implemented in appropriate combination with any of the structures described in the other embodiments.

Embodiment 5

An example of a moving object which is an example of an electronic device will be described with reference to FIGS. 36A and 36B.

The secondary battery described in the above embodiment can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 36A:
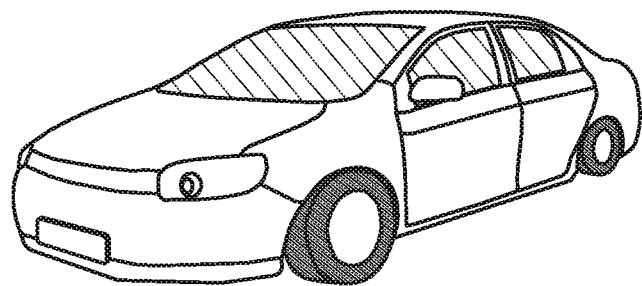
FIGS. 36A and 36B illustrate an electronic device.
Figure 36B:
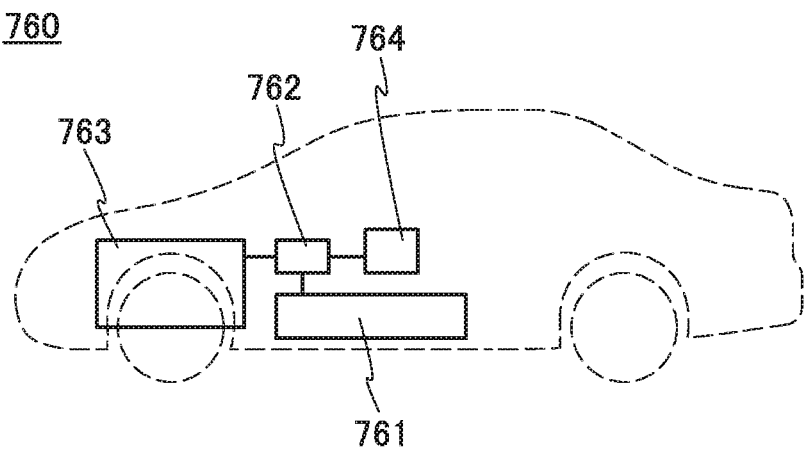

FIGS. 36A and 36B illustrate an example of an electric vehicle. An electric vehicle 760 is equipped with a battery 761. The output of the electric power of the battery 761 is adjusted by a control circuit 762 and the electric power is supplied to a driving device 763. The control circuit 762 is controlled by a processing unit 764 including a ROM, a RAM, a CPU, or the like which is not illustrated.

The driving device 763 includes a DC motor or an AC motor either alone or in combination with an internal-combustion engine. The processing unit 764 outputs a control signal to the control circuit 762 based on input data such as data of operation (e.g., acceleration, deceleration, or stop) by a driver or data during driving (e.g., data on an upgrade or a downgrade, or data on a load on a driving wheel) of the electric vehicle 760. The control circuit 762 adjusts the electric energy supplied from the battery 761 in response to the control signal of the processing unit 764 to control the output of the driving device 763. In the case where the AC motor is mounted, although not illustrated, an inverter which converts direct current into alternate current is also incorporated.

The battery 761 can be charged by external electric power supply using a plug-in technique. For example, the battery 761 is charged through a power plug from a commercial power supply. The battery 761 can be charged by converting the supplied power into DC constant voltage having a predetermined voltage level through a converter such as an AC-DC converter. The use of the secondary battery including the secondary battery electrode of one embodiment of the present invention as the battery 761 can be conductive to an increase in battery capacity, leading to an improvement in convenience. When the battery 761 itself can be more compact and more lightweight as a result of improved characteristics of the battery 761, the vehicle can be lightweight, leading to an increase in fuel efficiency.

Note that it is needless to say that one embodiment of the present invention is not limited to the electronic device described above as long as the secondary battery of one embodiment of the present invention is included.

This embodiment can be implemented in appropriate combination with any of the structures described in the other embodiments.

Embodiment 6

In this embodiment, wireless sensors in each of which the power storage device is incorporated will be described with reference to FIGS. 37A and 37B and FIG. 38. The secondary battery 100 is used as an example of the power storage device.

Structural Example 1 of Wireless Sensor

Figure 37A:
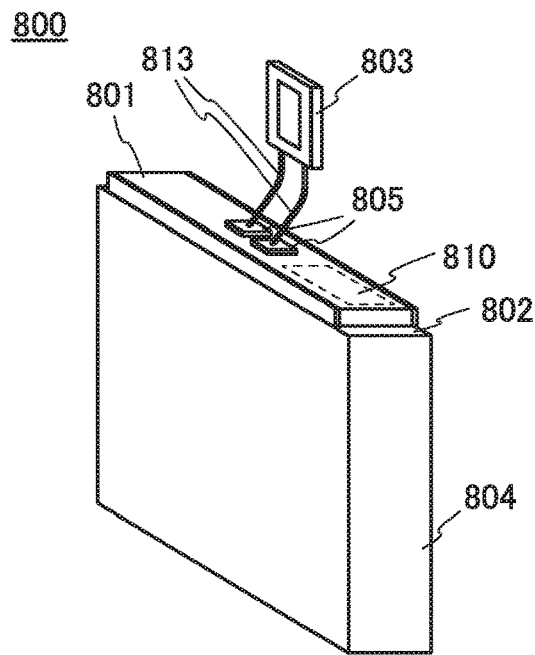
FIGS. 37A and 37B illustrate an electronic device.
Figure 37B:
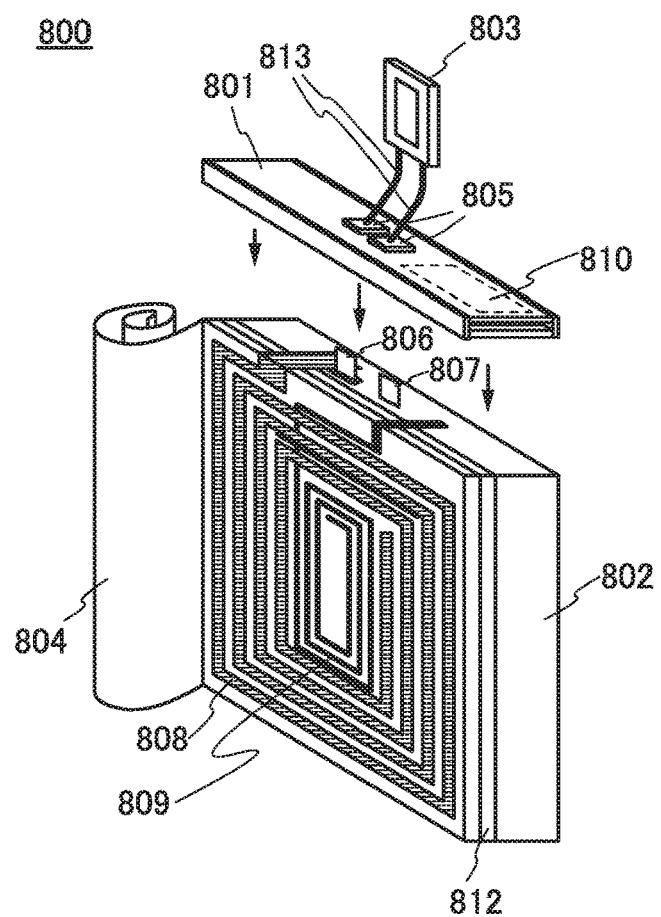

FIGS. 37A and 37B are external views illustrating a structural example of a wireless sensor 800. The wireless sensor 800 includes a circuit board 801, a battery 802, and a sensor 803. A label 804 is attached to the battery 802. Furthermore, as illustrated in FIG. 37B, the wireless sensor 800 includes a terminal 806, a terminal 807, an antenna 808, and an antenna 809. As the battery 802, the secondary battery 100 can be used.

The circuit board 801 is provided with terminals 805 and an integrated circuit 810. The terminals 805 are connected to the sensor 803 via wirings 813. Note that the number of the terminals 805 is not limited to two and determined in accordance with the need.

Furthermore, the circuit board 801 may be provided with a semiconductor element such as a transistor or a diode, a resistor, a wiring, or the like.

In the case where heat generated by the battery 802 or an electromagnetic field generated by the antennas 808 and 809 adversely affects the operation of the sensor 803, the length of each of the wirings 813 is extended so that the sensor 803 is apart from the battery 802 or the antennas 808 and 809. The length of the wiring 813 is, for example, longer than or equal to 1 cm and shorter than or equal to 1 m, preferably longer than or equal to 1 cm and shorter than or equal to 50 cm, more preferably longer than or equal to 1 cm and shorter than or equal to 30 cm.

The sensor 803 may be placed over the circuit board 801.

The integrated circuit 810 may be provided on a surface of the circuit board 801 which is in contact with the battery 802.

The shape of each of the antennas 808 and 809 is not limited to a coil shape and may be a linear shape or a plate shape. Furthermore, a planar antenna, an aperture antenna, a traveling-wave antenna, an EH antenna, a magnetic-field antenna, or a dielectric antenna may be used. Alternatively, the antenna 808 or 809 may be a flat-plate conductor. The flat-plate conductor can serve as one of conductors for electric field coupling. That is, the antenna 808 or 809 can serve as one of two conductors of a capacitor. Thus, power can be transmitted and received not only by an electromagnetic field or a magnetic field but also by an electric field.

The integrated circuit 810 includes a circuit formed using a Si transistor or an oxide semiconductor transistor (OS transistor).

The line width of the antenna 808 is preferably larger than that of the antenna 809. This makes it possible to increase the amount of power that is received by the antenna 808.

The sensor 803 is a circuit having a function of outputting various kinds of data such as thermal data, mechanical data, and electromagnetic data, as analog data.

The wireless sensor 800 includes a layer 812 between the battery 802 and the antennas 808 and 809. The layer 812 has, for example, a function of blocking an electromagnetic field that is generated by the battery 802. A magnetic body can be used as the layer 812, for example.

Structural Example 2 of Wireless Sensor

Figure 38:
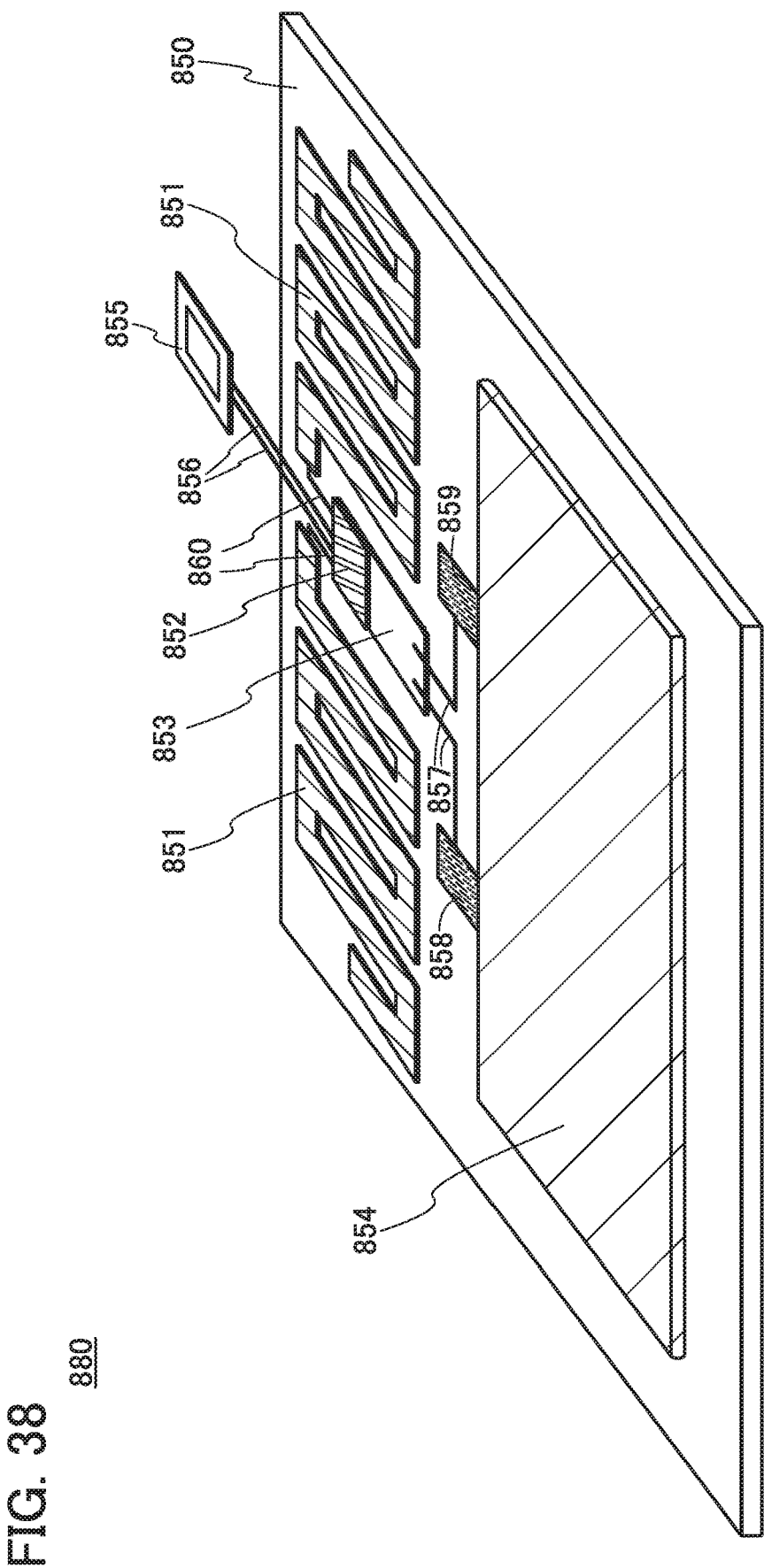
FIG. 38 illustrates an electronic device.

FIG. 38 is an external view illustrating a structural example of a wireless sensor 880. The wireless sensor 880 includes a support 850, an antenna 851, an integrated circuit 852, a circuit board 853, a sensor 855, and a battery 854. As the battery 854, the secondary battery 100 can be used.

The circuit board 853 is provided with the integrated circuit 852. Furthermore, the circuit board 853 may also be provided with a semiconductor element such as a transistor or a diode, a resistor, a wiring, or the like.

The integrated circuit 852 includes a circuit formed using a Si transistor or an OS transistor.

The antenna 851 is connected to the integrated circuit 852 through the wiring 860. For the details of the antenna 851, the description of the antenna 808 or 809 of the wireless sensor 800 can be referred to.

The sensor 855 is connected to the integrated circuit 852 through the wiring 856. Furthermore, the sensor 855 is formed either outside the support 850 or over the support 850.

The sensor 855 is a circuit having a function of outputting various kinds of data such as thermal data, mechanical data, and electromagnetic data, as analog data.

The battery 854 includes a terminal 858 having a function of one of a positive electrode and a negative electrode and a terminal 859 having a function of the other of the positive electrode and the negative electrode. Each of the terminals is connected to the integrated circuit 852 via a wiring 857 and the circuit board 853.

The support 850 can be formed using glass, quartz, plastic, metal, stainless steel foil, tungsten foil, a flexible substrate, a laminate film, a substrate film, paper including a fibrous material, or wood, for example. Examples of a flexible substrate include a flexible synthetic resin such as plastics typified by polyethylene terephthalate (PET), polyethylene naphthalate (PEN), and polyether sulfone (PES), and acrylic. Examples of the material of a laminate film include polypropylene, polyester, polyvinyl fluoride, and polyvinyl chloride. Examples of the material of a substrate film include polyester, polyamide, polyimide, aramid, epoxy, an inorganic vapor deposition film, and paper.

The wireless sensor 800 is preferably thin. In particular, the thickness of the wireless sensor 800 including the thicknesses of the battery 854 and the support 850 is preferably larger than or equal to 0.1 mm and smaller than or equal to 5 mm, more preferably larger than or equal to 0.1 mm and smaller than or equal to 3 mm, still more preferably larger than or equal to 0.1 mm and smaller than or equal to 1 mm. The wireless sensor 800 having the above thickness can be embedded in paper such as a poster or corrugated cardboard.

Furthermore, the wireless sensor 800 is preferably flexible. In particular, it is preferable that the support 850 and the battery 854 can be changed in their forms with a curvature radius of 30 mm or less, preferably 10 mm or less. The wireless sensor 800 having the above structure can, when attached to clothes or a human body, follow movements of the clothes or the human body.

In order to obtain the above structure, the battery 854 is preferably thin and flexible. As an exterior body of the battery 854, for example, a film having a three-layer structure including a first thin film, a second thin film, and a third thin film formed in this order may be used. Note that the third thin film has a function of the outer surface of the exterior body. Examples of the material for the first thin film include polyethylene, polypropylene, polycarbonate, ionomer, and polyamide. Examples of the material for the second thin film include a highly flexible thin metal film of aluminum, stainless steel, copper, nickel, or the like. Examples of the material for the third thin film include an insulating synthetic resin film of a polyamide-based resin, a polyester-based resin, or the like.

This embodiment can be implemented in appropriate combination with any of the other embodiments.

Embodiment 7

In this embodiment, application examples of the wireless sensor described in Embodiment 6 will be described with reference to FIG. 39, FIGS. 40A and 40B, and FIG. 41. As a wireless sensor 900 shown in FIG. 39, FIGS. 40A and 40B, and FIG. 41, the wireless sensor 800 or the wireless sensor 880 described in Embodiment 6 can be used.

Figure 39:
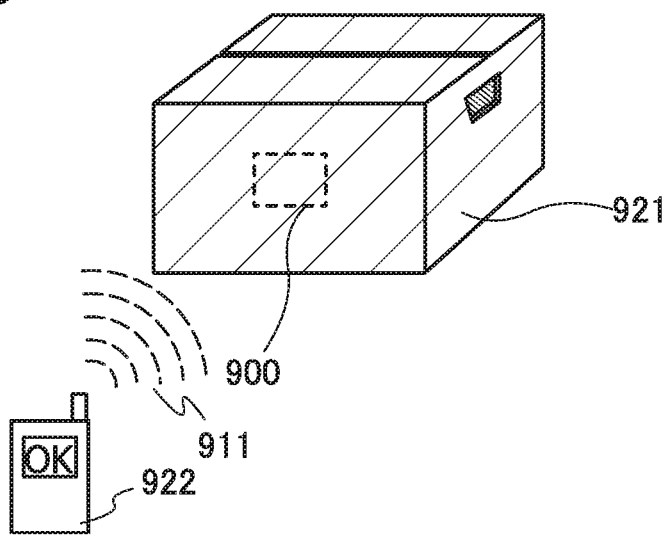
FIG. 39 illustrates an electronic device.

As shown in FIG. 39, the wireless sensor 900 is attached to or incorporated in an article 921, and a radio signal 911 is sent from an external reader 922, for example. The wireless sensor 900 having received the radio signal 911 can obtain data of a temperature or the like without touching the article 921, owing to the sensor, and send the data to the reader 922.

Figure 40A:
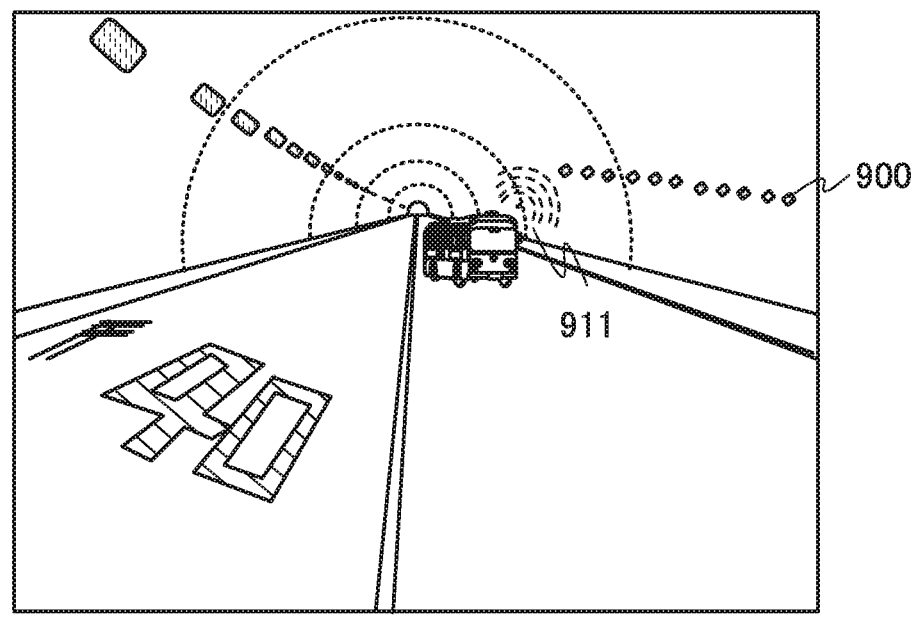
FIGS. 40A and 40B each illustrate an electronic device.

Another application form of the wireless sensor can be described with reference to the schematic diagram in FIG. 40A. For example, the wireless sensor 900 is embedded in a tunnel wall surface, and a radio signal 911 is sent externally. The wireless sensor 900 having received the radio signal 911 can obtain data on the tunnel wall surface by the sensor and send the data.

Figure 40B:
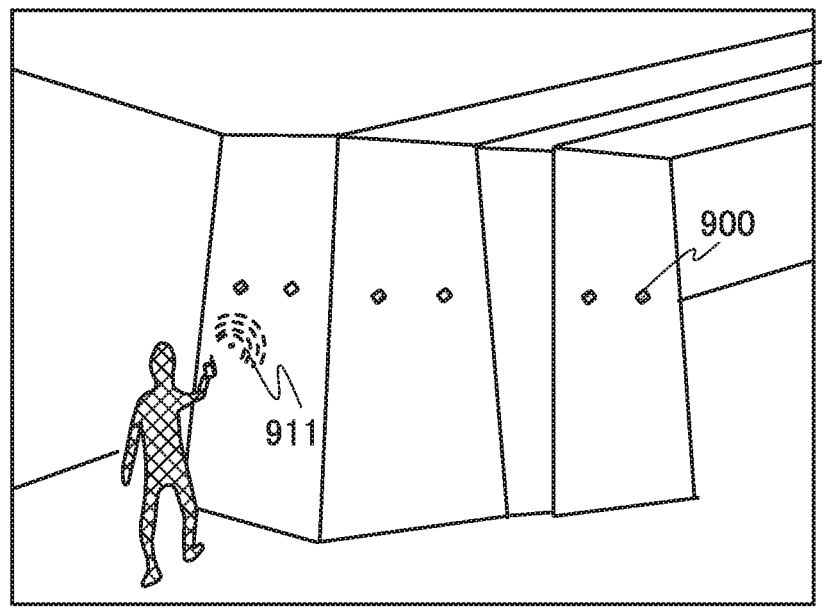

Another application form of the wireless sensor can be described with reference to the schematic diagram in FIG. 40B. For example, the wireless sensor 900 is embedded in a wall surface of a pillar of a bridge, and a radio signal 911 is sent externally. The wireless sensor 900 having received the radio signal 911 can obtain data in the pillar of the bridge by the sensor and send the data.

Figure 41:
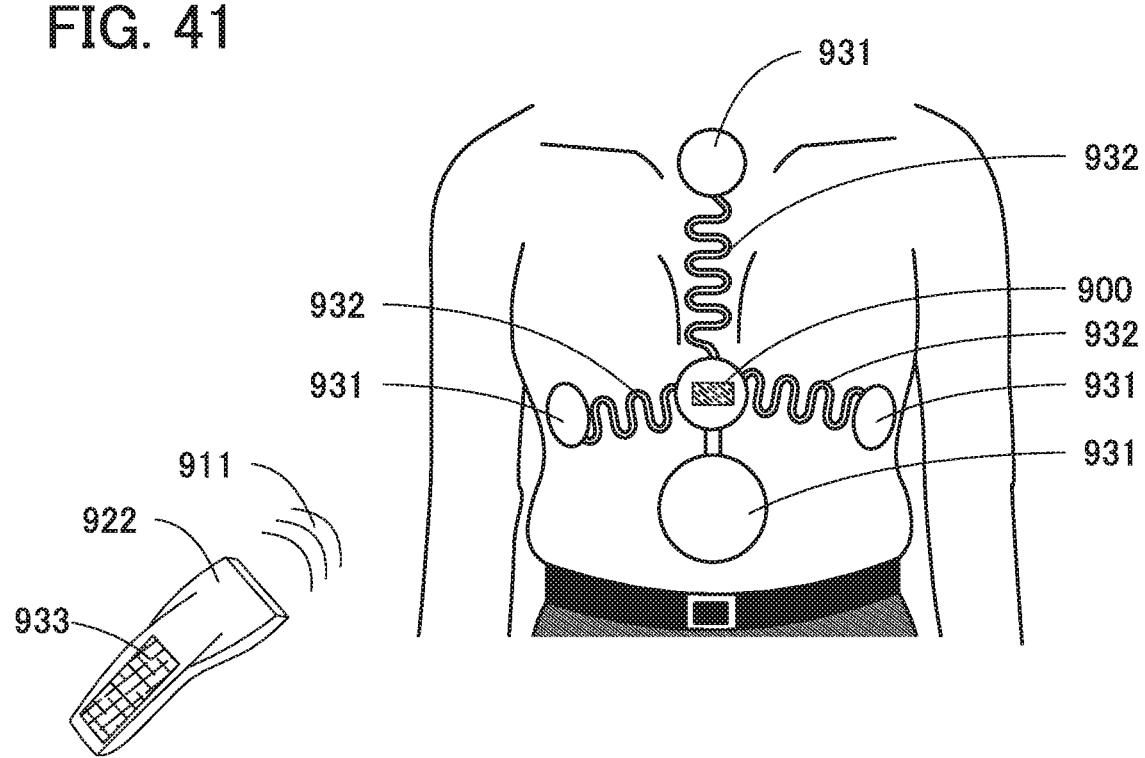
FIG. 41 illustrates an electronic device.

Another application form of the wireless sensor can be described with reference to the schematic diagram in FIG. 41. For example, the wireless sensor 900 is attached to a human body with the use of a bond pad or the like, and a radio signal 911 is sent from a reader 922. The wireless sensor 900 having received the radio signal 911 can obtain data such as biological data by supplying a signal to an electrode 931 or the like attached to the human body through a wiring 932, and send the data. The obtained data can be checked on a display part 933 of the reader 922.

This embodiment can be implemented in appropriate combination with any of the other embodiments.

Example 1

Figure 42A:
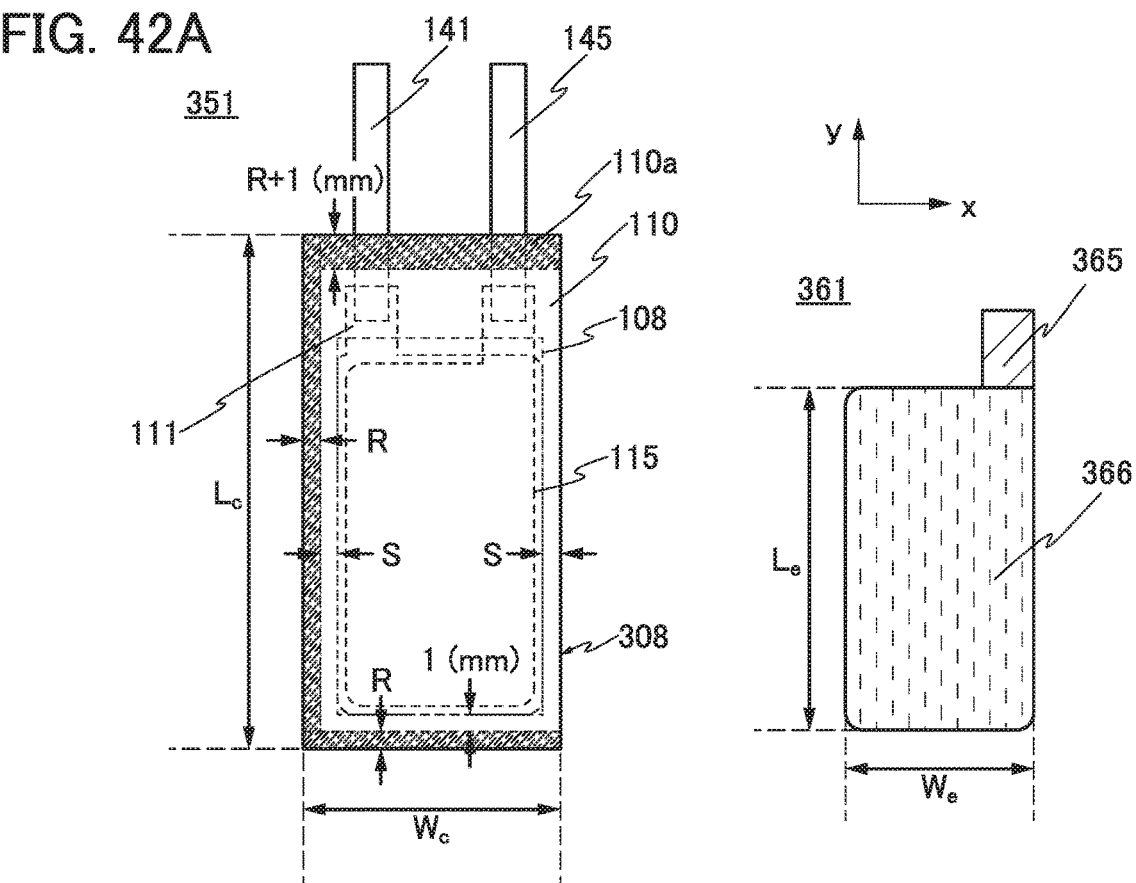
FIGS. 42A and 42B each illustrate a power storage device.
Figure 42B:
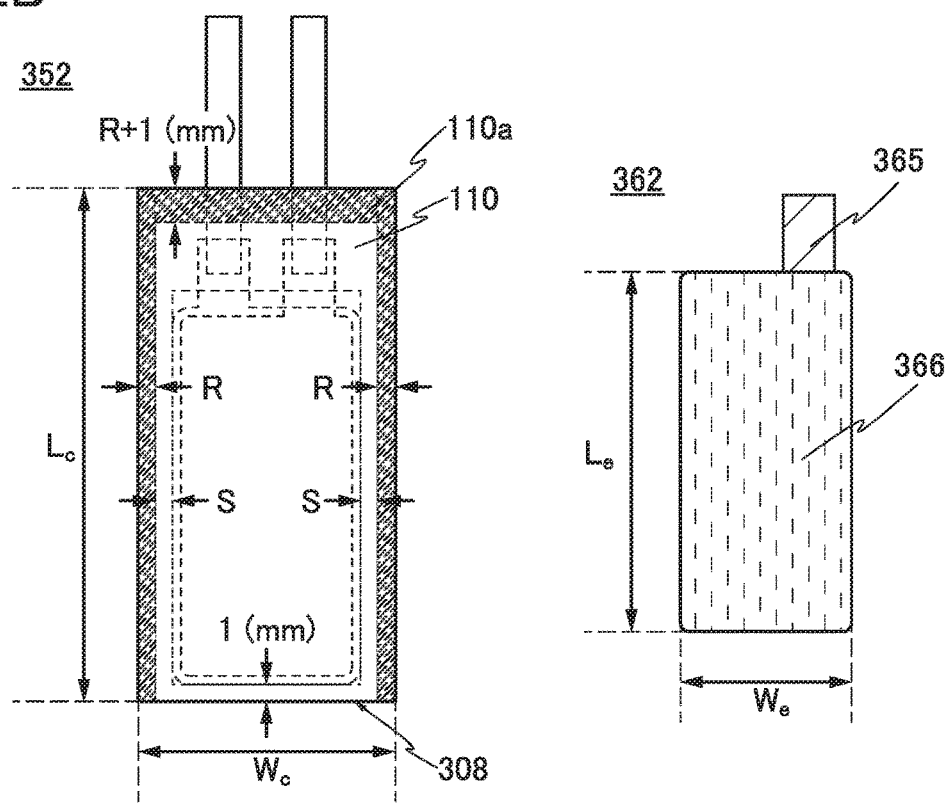

This example shows results of estimation of the capacity of the secondary battery 100A described in Embodiment 3. FIG. 42A shows a secondary battery 351 including an exterior body whose shape is similar to that of the secondary battery 100A as an example. FIG. 42B shows a secondary battery 352 including an exterior body whose shape is different from that of the secondary battery 100A as a comparative example.

As shown in FIG. 42A, the secondary battery 351 includes eight sheet-like positive electrodes 111, eight sheet-like negative electrodes 115, the separator 108, and an electrolytic solution in a region surrounded by the exterior body 110. The positive electrode 111 is electrically connected to the positive electrode lead 141. The negative electrode 115 is electrically connected to the negative electrode lead 145. The electrode 361 includes a current collector 365 and an active material layer 366 provided on the current collector 365.

The exterior body 110 included in the secondary battery 351 is described. The height of the exterior body 110 (the length in the y-axis direction) is denoted by $L_c$. The width of the exterior body 110 (the length in the x-axis direction) is denoted by $W_c$. The width of the bonding portion 110a of the exterior body 110 is denoted by R. The distance in the x-axis direction between the bonding portion 110a and the positive electrode 111 or the negative electrode 115, and the distance in the x-axis direction between the bent portion 308 and the positive electrode 111 or the negative electrode 115 are each denoted by S. Furthermore, in the electrode 361, the height and the width of the active material layer 366 are denoted by $L_e$ and $W_e$, respectively. Note that in a portion of the bonding portion 110a to hold the positive electrode lead 141 and the negative electrode lead 145, the width of the bonding portion 110a (the length in the y-axis direction) is R+1 (mm).

Examples 1 to 3 in which the height ($L_c$) and the width ($W_c$) of the exterior body 110 were fixed to 30 mm and 15 mm, respectively, and the width R and the distance S were varied were assumed to calculate the height ($L_e$) and the width ($W_e$) of the active material layer 366.

Note that the distance between the positive electrode 111 or the negative electrode 115 and a portion of the bonding portion 110a not including the positive electrode lead 141 and the negative electrode lead 145 in the y-axis direction were each fixed to 1 mm.

An area A of the active material layer 366 was calculated from the estimated height ($L_e$) and width ($W_e$) of the active material layer 366. Then, the capacity C of the secondary battery in each of Examples 1 to 3 was estimated. Note that the capacity C was calculated on the assumption that the capacity of the secondary battery obtained by using a pair of positive and negative electrodes including a positive electrode active material layer (the area: 1 cm²) and a negative electrode active material layer (the area: 1 cm²) was 3.5 mAh.

As shown in FIG. 42B, the position of the bent portion of the exterior body included in the secondary battery 352 is different from that of the secondary battery 351.

As the comparative example, the exterior body included in the secondary battery 352 is described. The height of the exterior body 110 (the length in the y-axis direction) is denoted by $L_c$. The width of the exterior body 110 (the length in the x-axis direction) is denoted by $W_c$. The width of the bonding portion 110 of the exterior body 110 is denoted by R. The distance in the x-axis direction between the bonding portion 110a and the positive electrode 111 or the negative electrode 115 is denoted by S. Furthermore, in the electrode 361, the height and the width of the active material layer 366 are denoted by $L_e$ and $W_e$, respectively. Note that in a portion of the bonding portion 110a to hold the positive electrode lead 141 and the negative electrode lead 145, the width of the bonding portion 110a (the length in the y-axis direction) is R+1 (mm).

Comparative examples 1 to 3 in which the height ($L_c$) and the width ($W_c$) of the exterior body 110 were fixed to 30 mm and 15 mm, respectively, and the width R and the distance S were varied were assumed to calculate the height ($L_e$) and the width ($W_e$) of the active material layer 366. Then, the area A of the active material layer 366 was calculated from the estimated height ($L_e$) and width ($W_e$) of the active material layer 366. Then, the capacity C of the secondary battery used in each of Comparative Examples 1 to 3 was estimated from the area A of the active material layer 366.

Note that the distance in the y-axis direction between the bent portion 308 and the positive electrode 111 or the negative electrode 115 was fixed to 1 mm.

In Example 1 and Comparative Example 1, the capacity C was estimated on the assumption that the exterior body had the width R and the distance S of 2 mm and 1 mm, respectively. In Example 2 and Comparative Example 2, the capacity C was estimated on the assumption that the exterior body had the width R and the distance S of 1 mm and 1.5 mm, respectively. In Example 3 and Comparative Example 3, the capacity C was estimated on the assumption that the exterior body had the width R and the distance S of 1 mm and 1 mm, respectively. The results are shown in Table 1.

TABLE 1

| | Shape | R (mm) | S (mm) | $L_e$ (mm) | $W_e$ (mm) | A (cm²) | C (mAh) |
|---|---|---|---|---|---|---|---|
| Example 1 | A | 2 | 1 | 18 | 10 | 1.8 | 50.4 |
| Example 2 | A | 1 | 1.5 | 20 | 10 | 2.0 | 56.0 |
| Example 3 | A | 1 | 1 | 20 | 11 | 2.19 | 61.3 |
| Comparative Example 1 | D | 2 | 1 | 20 | 8 | 1.6 | 45.0 |
| Comparative Example 2 | D | 1 | 1.5 | 21 | 9 | 1.89 | 52.9 |
| Comparative Example 3 | D | 1 | 1 | 21 | 10 | 2.1 | 59.0 |

As shown in Table 1, when the secondary batteries under the same conditions of the width R and the distance S are compared, the sample to which one embodiment of the present invention is applied has a higher capacity C than the secondary battery in Comparative Example.

When Examples 1 and 3 are compared, as the width R is smaller, the capacity C of the secondary battery can be higher. When Examples 2 and 3 are compared, as the distance S is smaller, the capacity C of the secondary battery 100 can be higher.

The results of this example show that in the secondary battery 351 which has a structure of the secondary battery 100A, the area of the bonding portion 110a can be smaller than that in the secondary battery 352 and thus the capacity of the secondary battery can be increased.

This application is based on Japanese Patent Application serial no. 2015-025644 filed with Japan Patent Office on Feb. 12, 2015, the entire contents of which are hereby incorporated by reference.

What is claimed is:

1. A power storage device comprising:
a first electrode;
a second electrode; and
an electrolytic solution,
wherein the first electrode and the second electrode overlap with each other,
wherein the first electrode includes a first current collector and a first active material layer,
wherein the first current collector includes a first surface and a second surface opposite to the first surface,
wherein the first surface includes a first region, a second region, and a third region,
wherein the first active material layer is in direct contact with the first region of the first surface,
wherein the first current collector includes a first bent portion with the first surface inside,
wherein the second region is in direct contact with the third region at the first bent portion,
wherein the first current collector includes a second bent portion with the second surface inside,
wherein the second surface includes a fourth region and a fifth region,
wherein the fourth region faces the fifth region,
wherein the fourth region is in direct contact with the fifth region at a portion different from the second bent portion, and
wherein the second region, the third region, the fourth region, and the fifth region overlap with each other.

2. The power storage device according to claim 1, wherein the first active material layer is not provided on the first bent portion.

3. The power storage device according to claim 2, wherein the second electrode includes a second current collector and a second active material layer,
wherein the second current collector includes a third bent portion, and
wherein the third bent portion is substantially parallel to the second bent portion.

4. The power storage device according to claim 1, wherein the first electrode is one of a positive electrode and a negative electrode, and
wherein the second electrode is the other one of the positive electrode and the negative electrode.

5. The power storage device according to claim 1, further comprising an exterior body surrounding the first electrode, the second electrode, and the electrolytic solution,
wherein the exterior body includes a film.

6. The power storage device according to claim 1, wherein the electrolytic solution is a gel.

7. The power storage device according to claim 1, wherein the first electrode includes a friction layer, and wherein the friction layer is provided on the second surface.

8. The power storage device according to claim 1, wherein the power storage device is flexible.

9. The power storage device according to claim 1, wherein the power storage device is curved.

10. An electronic device comprising the power storage device according to claim 1, and a housing which is flexible.

11. An electronic device comprising the power storage device according to claim 1 and a housing which includes a curved portion.

* * * * *